United States Patent
Kurihara et al.

(10) Patent No.: US 9,189,279 B2
(45) Date of Patent: Nov. 17, 2015

(54) ASSIGNMENT METHOD AND MULTI-CORE PROCESSOR SYSTEM

(71) Applicant: FUJITSU LIMITED, Kawasaki-shi, Kanagawa (JP)

(72) Inventors: Koji Kurihara, Kawasaki (JP); Koichiro Yamashita, Hachioji (JP); Takahisa Suzuki, Yokohama (JP); Hiromasa Yamauchi, Usakos (NA); Toshiya Otomo, Kawasaki (JP); Naoki Odate, Akiruno (JP)

(73) Assignee: FUJITSU LIMITED, Kawasaki (JP)

( * ) Notice: Subject to any disclaimer, the term of this patent is extended or adjusted under 35 U.S.C. 154(b) by 128 days.

(21) Appl. No.: 14/166,164

(22) Filed: Jan. 28, 2014

(65) Prior Publication Data

US 2014/0143788 A1    May 22, 2014

Related U.S. Application Data

(63) Continuation of application No. PCT/JP2011/067555, filed on Jul. 29, 2011.

(51) Int. Cl.
*G06F 9/46*     (2006.01)
*G06F 9/50*     (2006.01)

(52) U.S. Cl.
CPC ............ *G06F 9/5016* (2013.01); *G06F 9/5044* (2013.01)

(58) Field of Classification Search
CPC .......... G06F 9/4881; G06F 9/52; G06F 9/544
USPC ............................ 718/102, 104, 106; 719/312
See application file for complete search history.

(56) References Cited

U.S. PATENT DOCUMENTS

| | | | |
|---|---|---|---|
| 5,535,393 A | 7/1996 | Reeve et al. | |
| 5,787,490 A | 7/1998 | Ozawa | |
| 8,869,154 B1 * | 10/2014 | Hillyard et al. | 718/102 |
| 2005/0273310 A1 | 12/2005 | Newburn | |
| 2009/0031314 A1 * | 1/2009 | Moscibroda et al. | 718/102 |
| 2009/0150893 A1 * | 6/2009 | Johnson et al. | 718/104 |
| 2011/0022817 A1 * | 1/2011 | Gaster et al. | 711/202 |

FOREIGN PATENT DOCUMENTS

| | | |
|---|---|---|
| JP | 4-338837 | 11/1992 |
| JP | 5-298272 | 11/1993 |

(Continued)

OTHER PUBLICATIONS

PCT International Preliminary Report on Patentability mailed Feb. 13, 2014 in corresponding International Application No. PCT/JP2011/067555.

*Primary Examiner* — Andy Ho
(74) *Attorney, Agent, or Firm* — Staas & Halsey LLP

(57) ABSTRACT

An assignment method executed by a given core of a multi-core processor includes identifying for each core, the number of storage areas to be used by a given thread and the number of storage areas used by threads already assigned; detecting for each core, a highest value from the number of storage areas used by the threads already assigned; determining whether a sum of a greater value of the detected highest value of a core selected as a candidate assignment destination and the number of storage areas to be used by the given thread, and the detected highest value of the cores excluding the selected core, is at most the number of storage areas of the shared resource; and assigning the given thread to the selected core, when the sum is at most the number of storage areas of the shared resource.

17 Claims, 34 Drawing Sheets

(56) References Cited

FOREIGN PATENT DOCUMENTS

| JP | 7-141305 | 6/1995 |
| JP | 9-101916 | 4/1997 |
| JP | 10-27167 | 1/1998 |
| JP | 2006-285430 | 10/2006 |
| JP | 2008-542925 | 11/2008 |
| JP | 2009-237858 | 10/2009 |
| JP | 2010-277300 | 12/2010 |

* cited by examiner

FIG.3

| THREAD ID | PROCESSING TIME PERIOD | NUMBER OF BANKS TO BE USED | |
|---|---|---|---|
| ... | ... | ... | ~301-1 |
| ⋮ | ⋮ | ⋮ | ⋮ |

| CPU ID | THREAD ID | |
|---|---|---|
| 201-1 | ... | ~401-1 |
| ⋮ | ⋮ | ⋮ |
| 201-n | ... | |

400

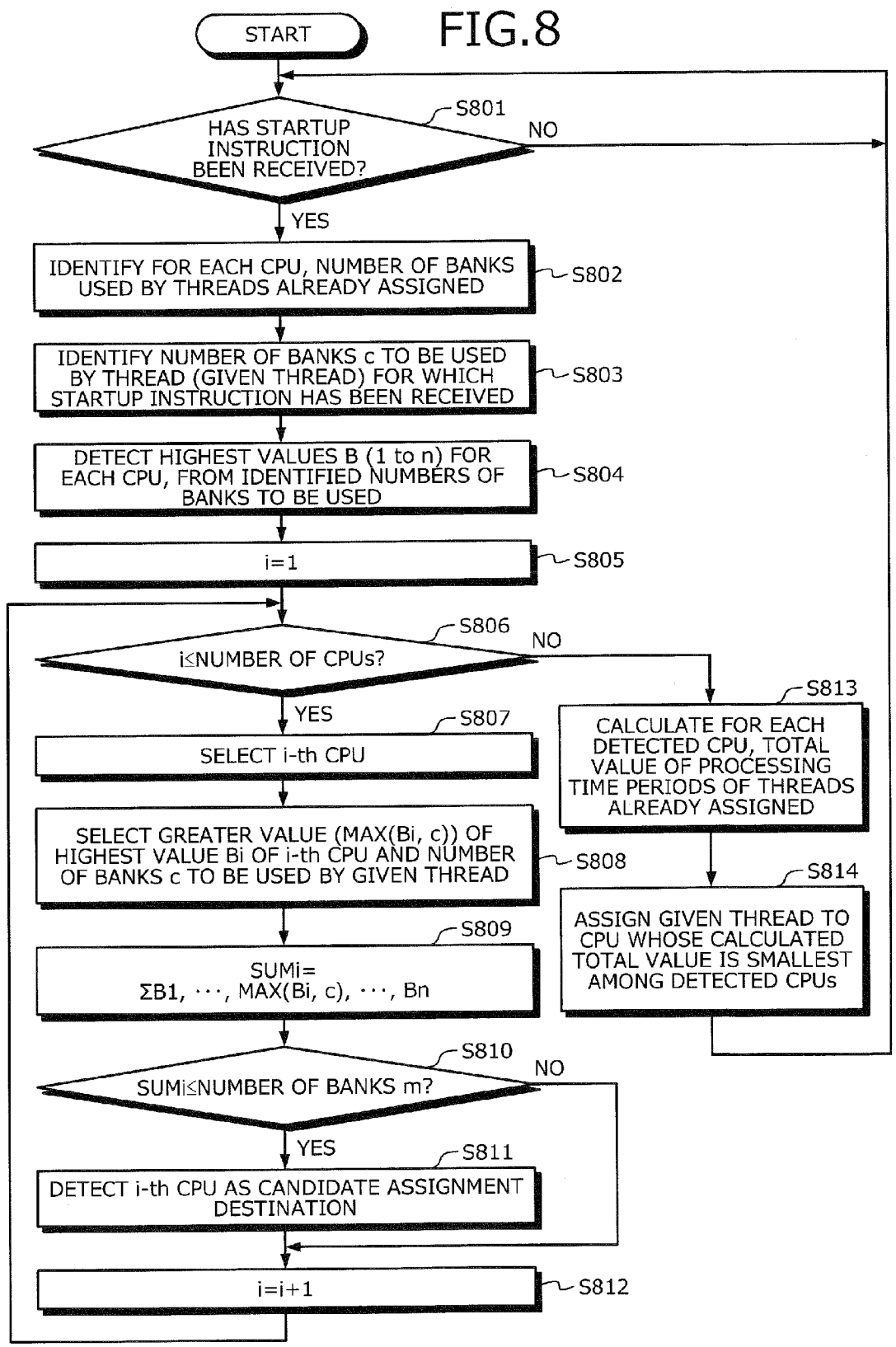

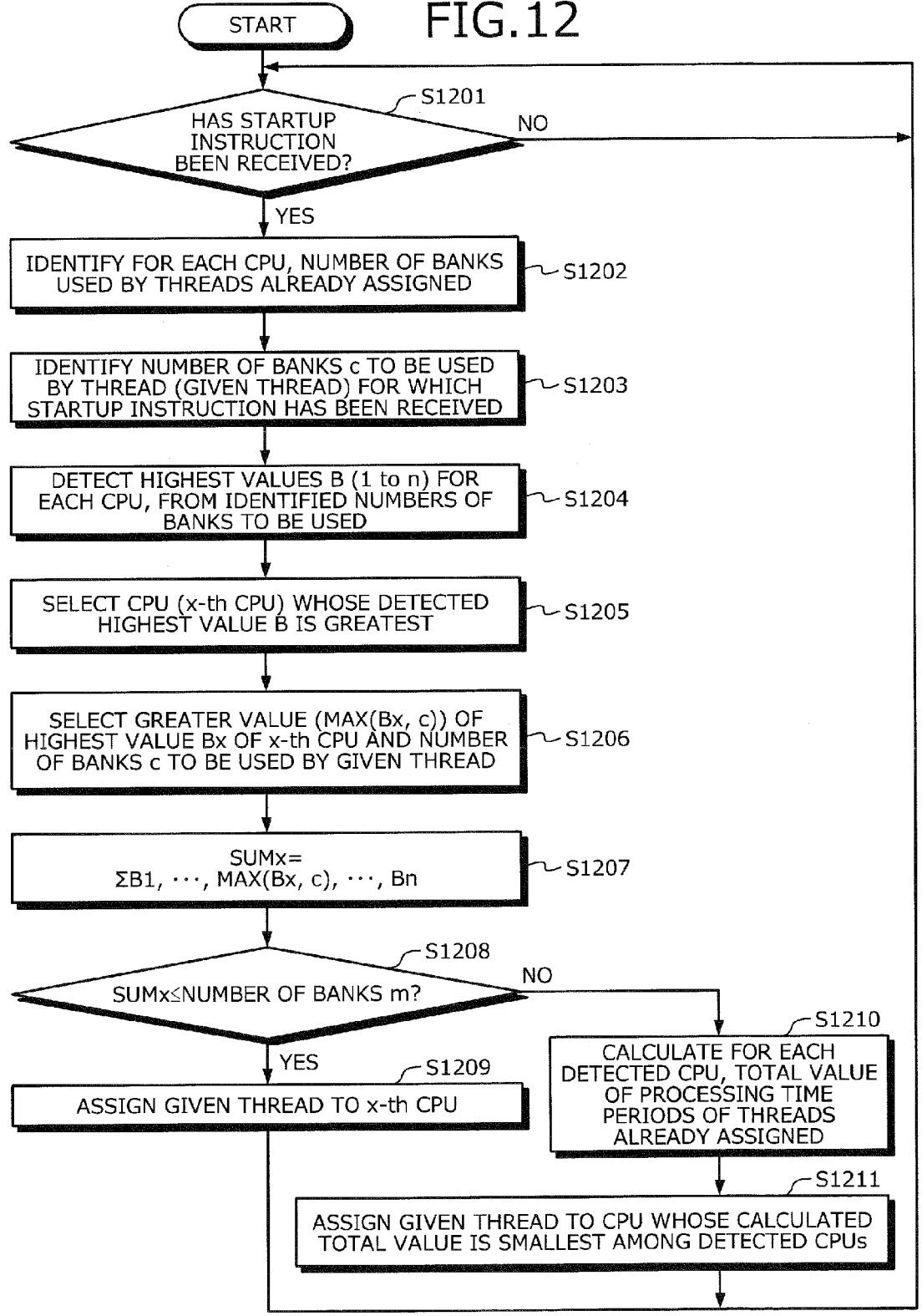

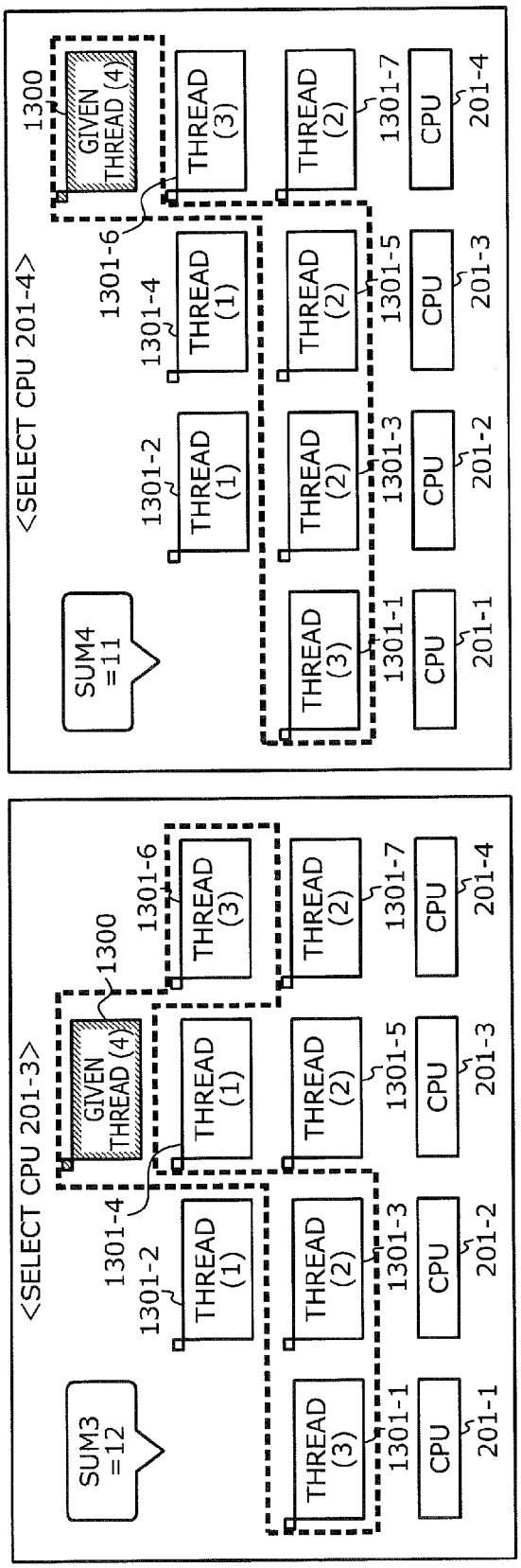

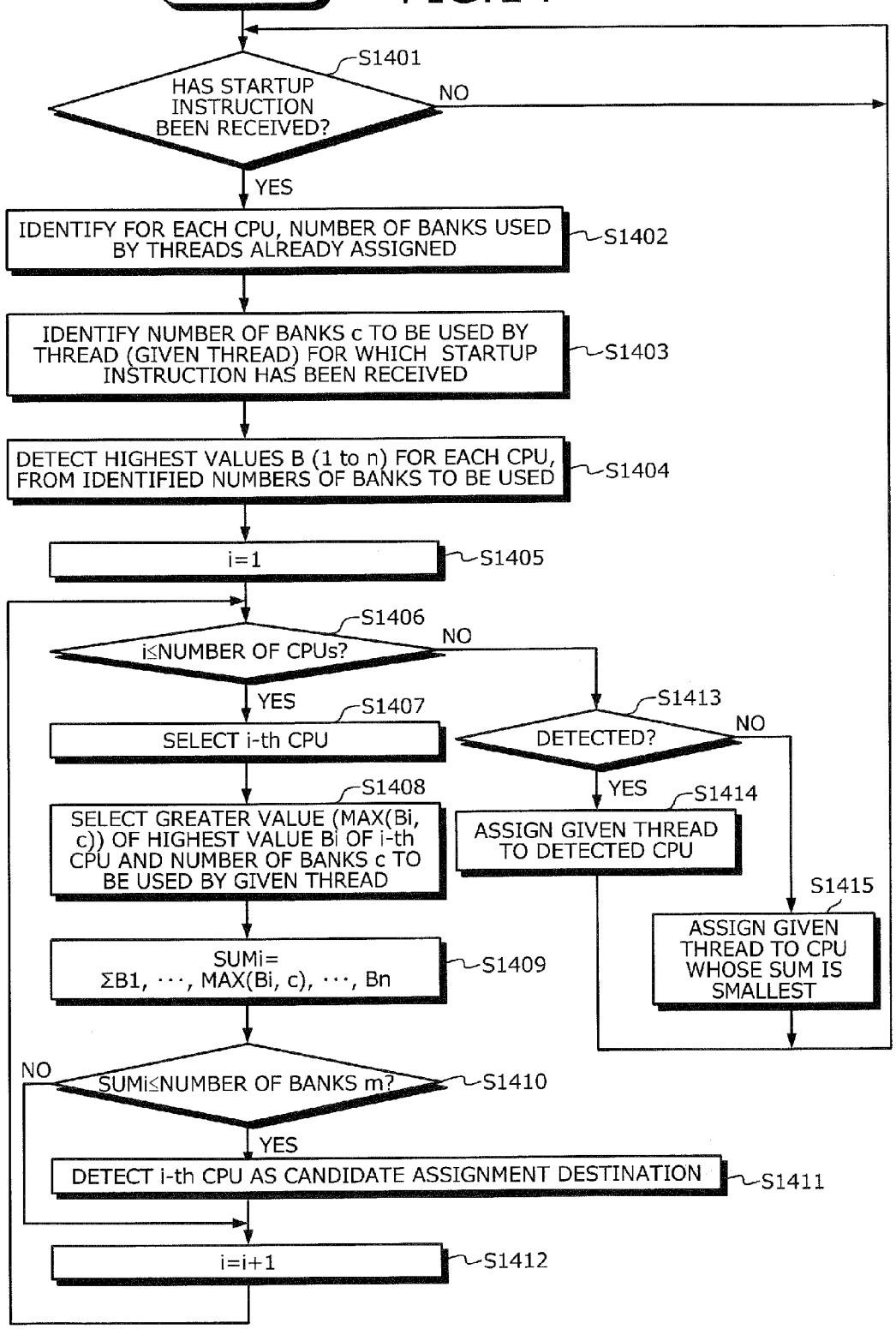

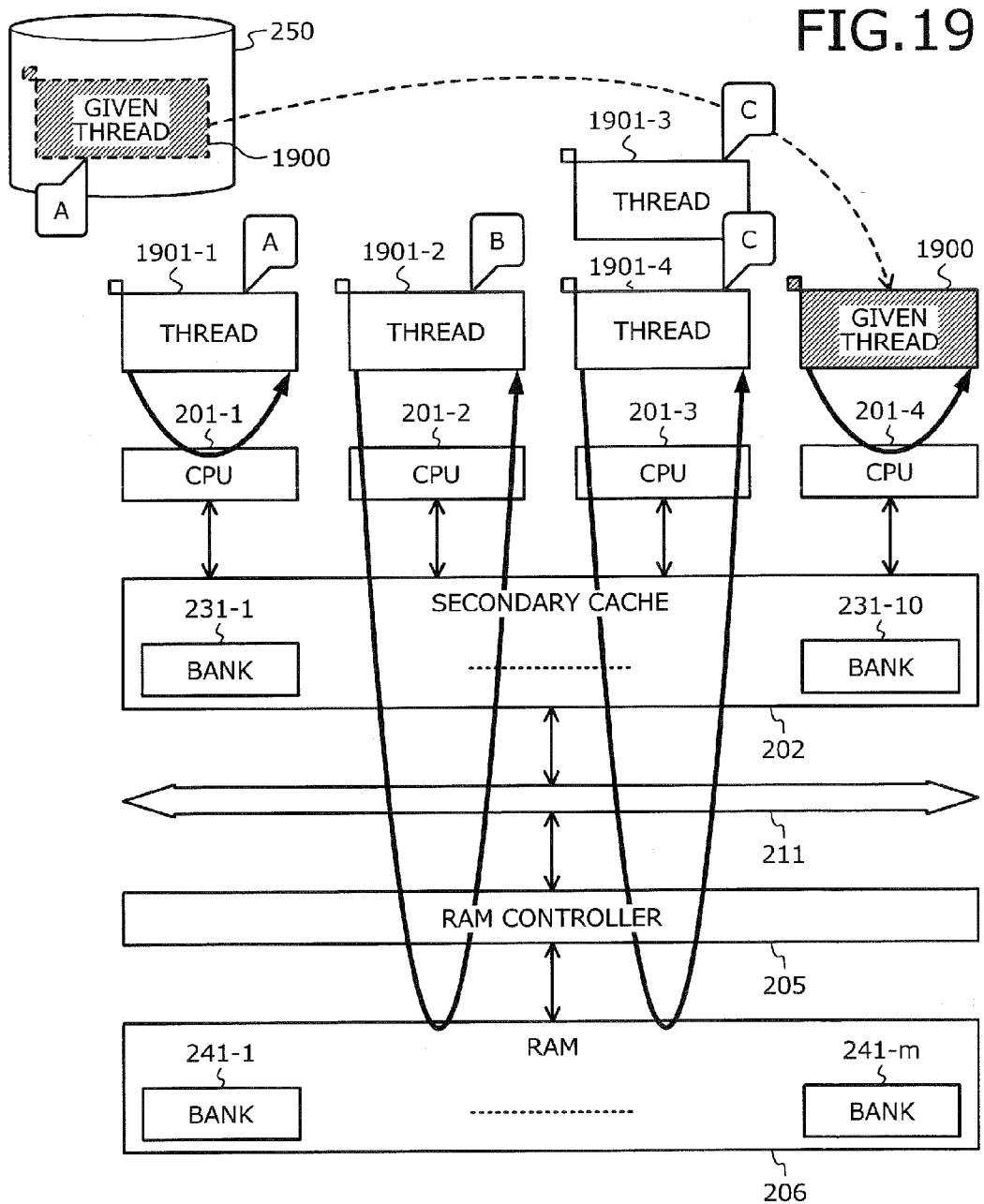

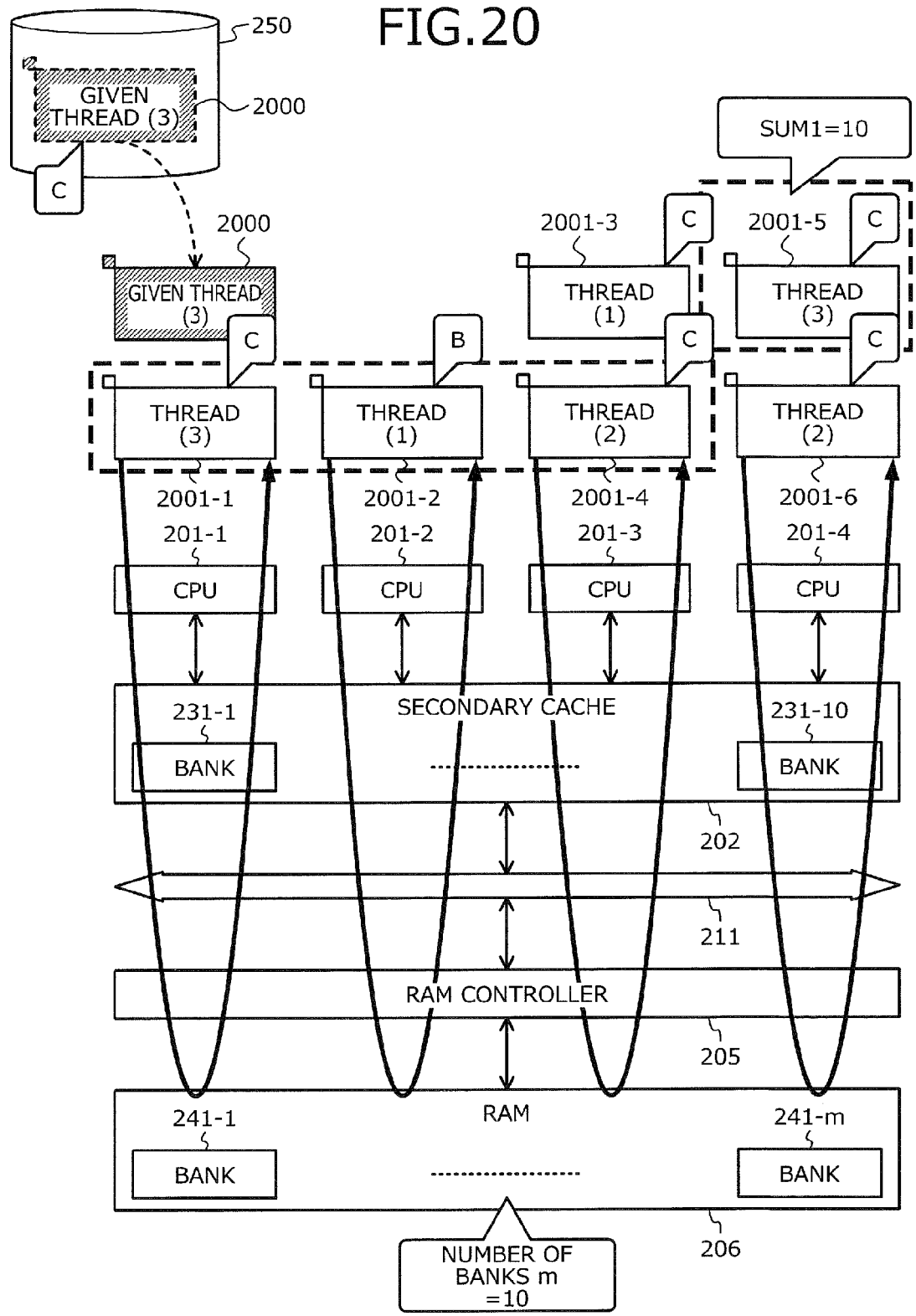

FIG.27

| THREAD ID | CLASS (A - C) | PROCES-SING TIME PERIOD | RATE OF ACCESS TIME PERIOD | NUMBER OF BANKS TO BE USED 1 | NUMBER OF BANKS TO BE USED 2 |
|---|---|---|---|---|---|
| ... | ... | ... | ... | ... | ... |
| ⋮ | ⋮ | ⋮ | ⋮ | ⋮ | ⋮ |

| CPU ID | THREAD ID | ELAPSED TIME PERIOD FOR PROCESSING |
|---|---|---|
| 201-1 | ... | ... |
| ⋮ | ⋮ | ⋮ |

| CONTENTION OCCURRENCE LAYER | OVERHEAD RATE |
|---|---|
| SECONDARY CACHE | RL2 |
| RAM | RM |

2900

2901-1
2901-2

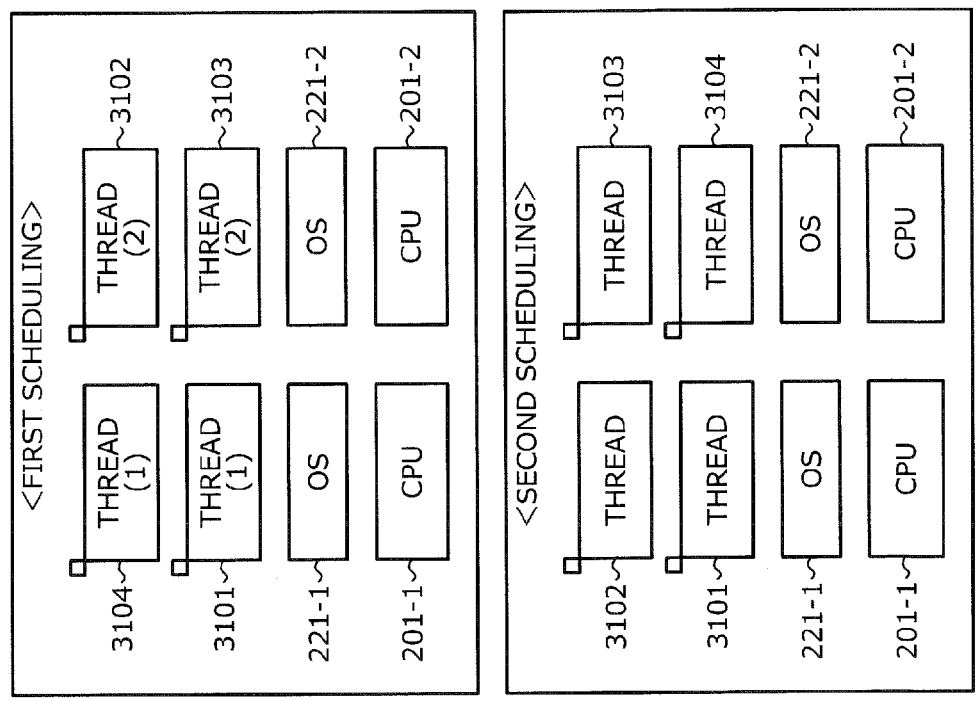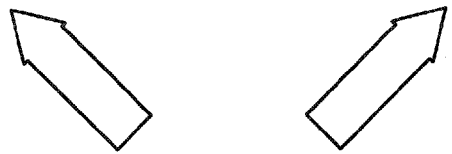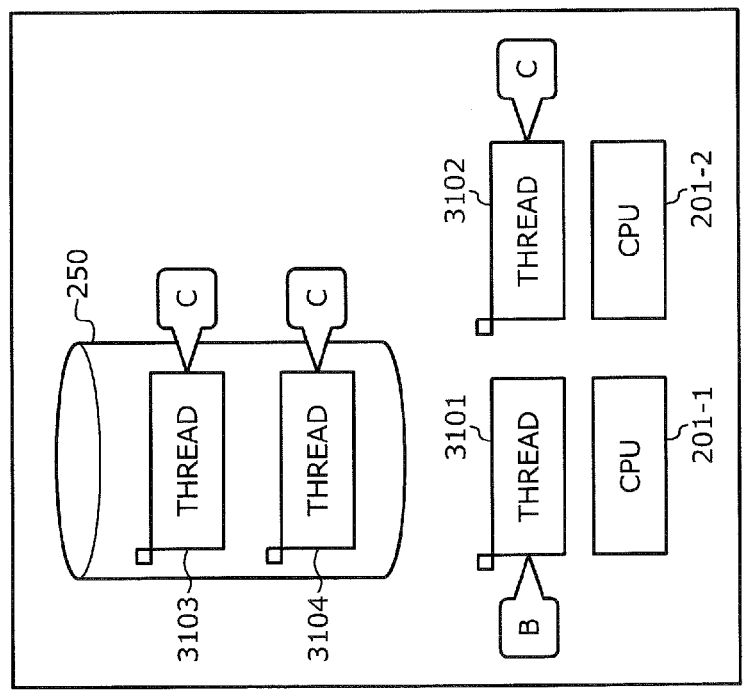
FIG.31

US 9,189,279 B2

ASSIGNMENT METHOD AND MULTI-CORE PROCESSOR SYSTEM

CROSS REFERENCE TO RELATED APPLICATIONS

This application is a continuation application of International Application PCT/JP2011/067555, filed on Jul. 29, 2011 and designating the U.S., the entire contents of which are incorporated herein by reference.

FIELD

The embodiments discussed herein are related to an assignment method and a multi-core processor system that assign threads.

BACKGROUND

According to a conventional technique, cache hit ratios are measured in a multi-core processor system; and threads are scheduled such that the cache hit ratios of each thread increases (see, e.g., Japanese Laid-Open Patent Publication Nos. 2006-285430 and H4-338837 and Published Japanese-Translation of PCT Application, Publication No. 2008-542925).

According to another technique, cache priority is set for each thread; and the amount of cache to be used by threads assigned to the same central processing unit (CPU) is determined according to the cache priority (see, e.g., Japanese Laid-Open Patent Publication No. H9-101916).

However, for example, when a thread whose cache hit ratio is low is concurrently executed by plural CPUs, the access of shared memory by the plural CPUs cause contention and therefore, a problem arises in that a wait period occurs for access of the shared memory.

Consequently, the execution of each thread does not advance and a problem arises in that the execution performance of the thread drops.

SUMMARY

According to an aspect of an embodiment, an assignment method includes identifying from a storage device that stores for each thread of a thread group, number of used storage areas of a shared resource of a multi-core processor and identifying for each core of the multi-core processor, the number of storage areas to be used by a thread to be executed and the number of storage areas used by threads already assigned; detecting for each of the cores, a highest value, from the identified number of storage areas used by the threads already assigned; determining whether a sum of a greater value of the detected highest value of a core selected as a candidate assignment destination of the multi-core processor and the identified number of storage areas to be used by the thread to be executed, and the detected highest value of the cores excluding the selected core, is at most the number of storage areas of the shared resource; and assigning the thread to be executed to the selected core, when the sum is determined to be at most the number of storage areas of the shared resource. The assignment method is executed by a given core of the multi-core processor.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is an explanatory diagram of an example of a thread table according to first to fifth examples;
FIG. 4 is an explanatory diagram of an example of an assignment table according to the first to sixth examples;
FIG. 8 is a flowchart of a process executed by the master OS according to the first example;
FIG. 12 is a flowchart of a process executed by the master OS according to the third example;
FIGS. 13A, 13B, 13C, and 13D are explanatory diagrams of an example of assignment according to the fourth example;
FIG. 14 is a flowchart of a process executed by the master OS according to the fourth example;
FIG. 18 is an explanatory diagram of an example of a thread table according to the sixth example;
FIG. 19 is an explanatory diagram of an example of the case where a thread to be executed is classified as A;
FIG. 20 is an explanatory diagram of an example of a case where a thread to be executed is classified as C;
FIG. 27 is an explanatory diagram of an example of a thread table according to a seventh example;
FIG. 28 is an explanatory diagram of an example of an assignment table according to the seventh example;
FIG. 29 is an explanatory diagram of an example of overhead information concerning access contention;
FIG. 31 is an explanatory diagram of an example of assignment based on first scheduling and second scheduling;

DESCRIPTION OF EMBODIMENTS

In a multi-core processor system, a multi-core processor is a processor that is equipped with plural cores, and may be provided as a single processor equipped with plural cores or a group of single-core processors arranged in parallel. In the present embodiment, for the sake of simplicity, description will be given taking a group of parallel, single-core processors as an example.

When the total number of banks used by threads executed by cores of the multi-core processor exceeds the total number of banks of a shared resource, a bank is accessed by plural threads. Therefore, when any combination of threads is executed in parallel, reductions of the access contention that occurs due to the memory bank shortage is facilitated. A thread that is to be executed is assigned such that the sum of the banks used by the threads executed in parallel does not exceed the number of memory banks of the shared resource. In this manner, even when the threads each using the greatest number of banks in each core is concurrently executed, bank shortage can be avoided as far as possible, thereby enabling thread performance drops consequent to access contention at the shared resource to be reduced.

Figure 1:
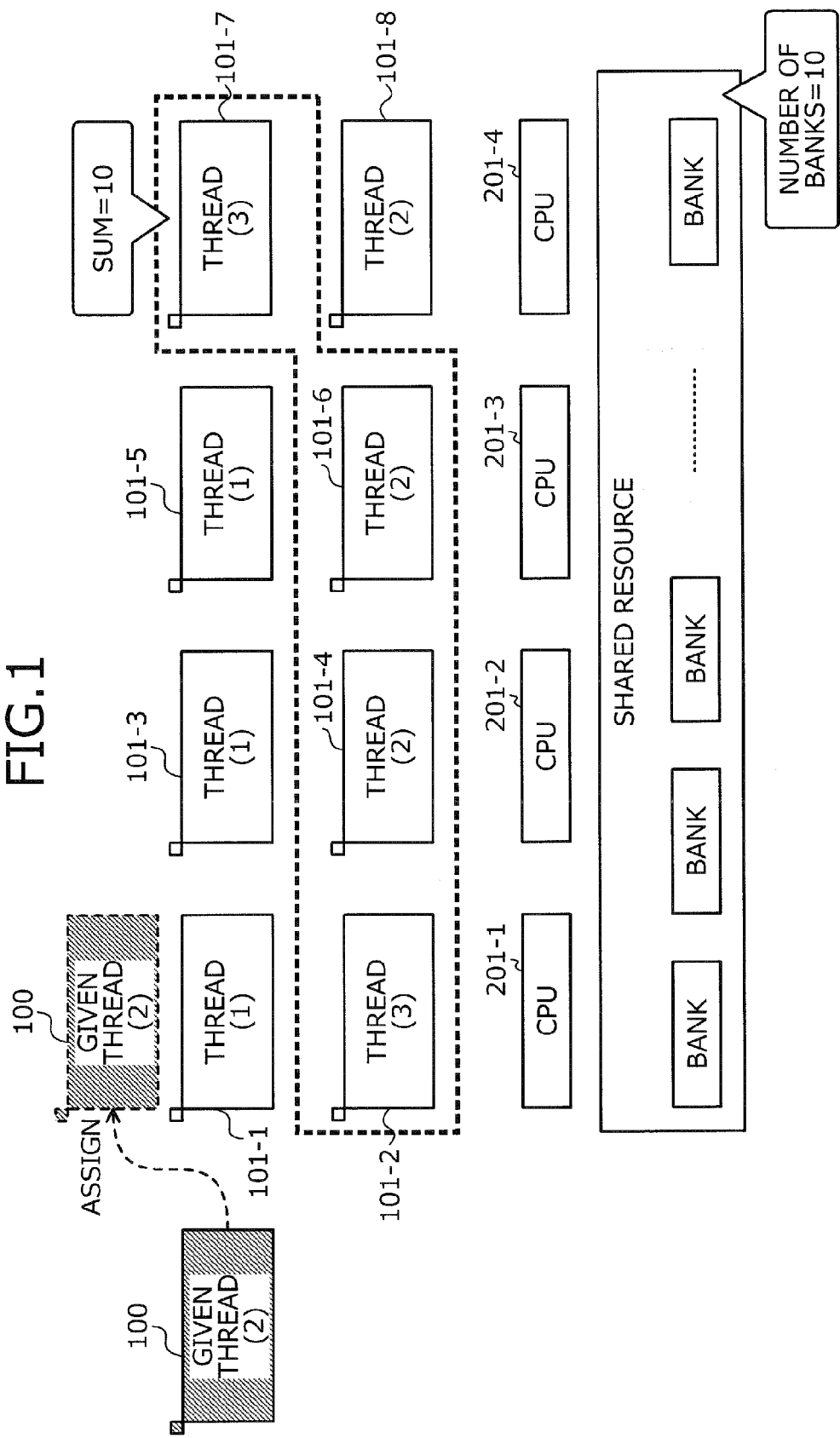
FIG. 1 is an explanatory diagram of an example of processing by a multi-core processor system.

FIG. 1 is an explanatory diagram of an example of processing by the multi-core processor system. The number of banks to be used of the shared resource, which is shared by the multi-core processor, is stored for each thread in a storage device. The CPU executes processing in units of "threads". The "storage device" and the "shared resource" may be the same component or may be different from each other. For example, the shared resource is random access memory (RAM) or a secondary cache, and the storage device is storage such as flash read only memory (ROM). The storage area of the shared resource is divided into plural banks. A "bank" is a unit of the storage area used when a controller of the shared resource manages the shared resource. The controller of the shared resource can simultaneously issue write instructions and read instructions from CPUs 201 to the plural banks using a memory interleaving function and therefore, access contention does not arise when banks that differ from one another are accessed. In FIG. 1, the number of banks of the shared resource is 10.

In FIG. 1, threads 101-1 to 101-8 are already assigned to the CPUs 201. The threads 101-1 and 101-2 are assigned to the CPU 201-1. The threads 101-3 and 101-4 are assigned to the CPU 201-2. The threads 101-5 and 101-6 are assigned to the CPU 201-3. The threads 101-7 and 101-8 are assigned to the CPU 201-4.

A master operating system (OS) executed by the CPU 201-1 identifies, as bank counts, the number of banks to be used by a given thread 100 and the number of banks used by each thread 101 already assigned to the CPUs 201, from the storage device. The given thread 100 is a thread that is to be assigned. For example, the given thread 100 is a thread whose startup instruction has been accepted by a master OS. The number of banks used by each thread is written in the parentheses "( )" of each thread in FIG. 1. For example, the number of banks to be used by the given thread 100 is two.

The master OS detects for each CPU 201, the highest value B of the bank counts identified for the threads 101 already assigned. For example, the highest value B1 of the number of banks used by the threads 101 already assigned to the CPU 201-1 is three, and the highest value B2 of the number of banks used by the threads 101 already assigned to the CPU 201-2 is two. The highest value B3 of the number of banks used by the threads 101 already assigned to the CPU 201-3 is two, and the highest value B4 of the number of banks used by the threads 101 already assigned to the CPU 201-4 is three.

The master OS selects the greater value of the highest value detected for the CPU 201 that has been selected as a candidate assignment destination in the multi-core processor, and the identified number of banks to be used by the given thread 100. In FIG. 1, the master OS selects the CPU 201-1 as the candidate assignment destination. The number of banks to be used by the given thread 100 is two and the highest value detected for the CPU 201-1 is three. Therefore, the master OS selects "three" as the greater value. In FIG. 1, the threads surrounded by a dotted line frame are the threads having the selected greater value and the threads having the detected highest value in the CPUs 201 other than the CPU 201-1. When the given thread 100 is assigned to the CPU 201-1, among combinations of the given thread 100 and the threads 101 already assigned, executed in parallel, the combination of the threads surrounded by the dotted line frame in FIG. 1 has the greatest total number of used banks.

For example, the master OS determines if the sum "SUM" of the selected greater value and the detected highest value for the CPUs 201 other than the CPU 201-1 is less than or equal to the number of banks of the shared resource. If the master OS determines that the sum SUM is less than or equal to the number of banks of the shared resource, the master OS assigns the given thread 100, to the selected CPU 201. The sum SUM is 10 and therefore, the master OS assigns the given thread 100, to the CPU 201-1. Thereby, in a case where the given thread 100 is assigned to the CPU 201-1, no bank shortage occurs even if the threads are executed in parallel and irrespectively of the combination thereof. The master OS may select a CPU 201 other than the CPU 201-1 as the candidate assignment destination or may sequentially select the CPUs 201. The selection of the candidate assignment destination will be described later in examples.

When plural threads are assigned to each of the CPUs 201-1 to 201-4, the threads are executed being switched thereamong based on the time slice and therefore, it is unknown in which combination the threads are executed in parallel. In the example depicted in FIG. 1, for any combination of threads, assignment is executed to prevent access contention at the shared resource and therefore, drops in thread performance occurring consequent to access contention can be reduced.

Figure 2:
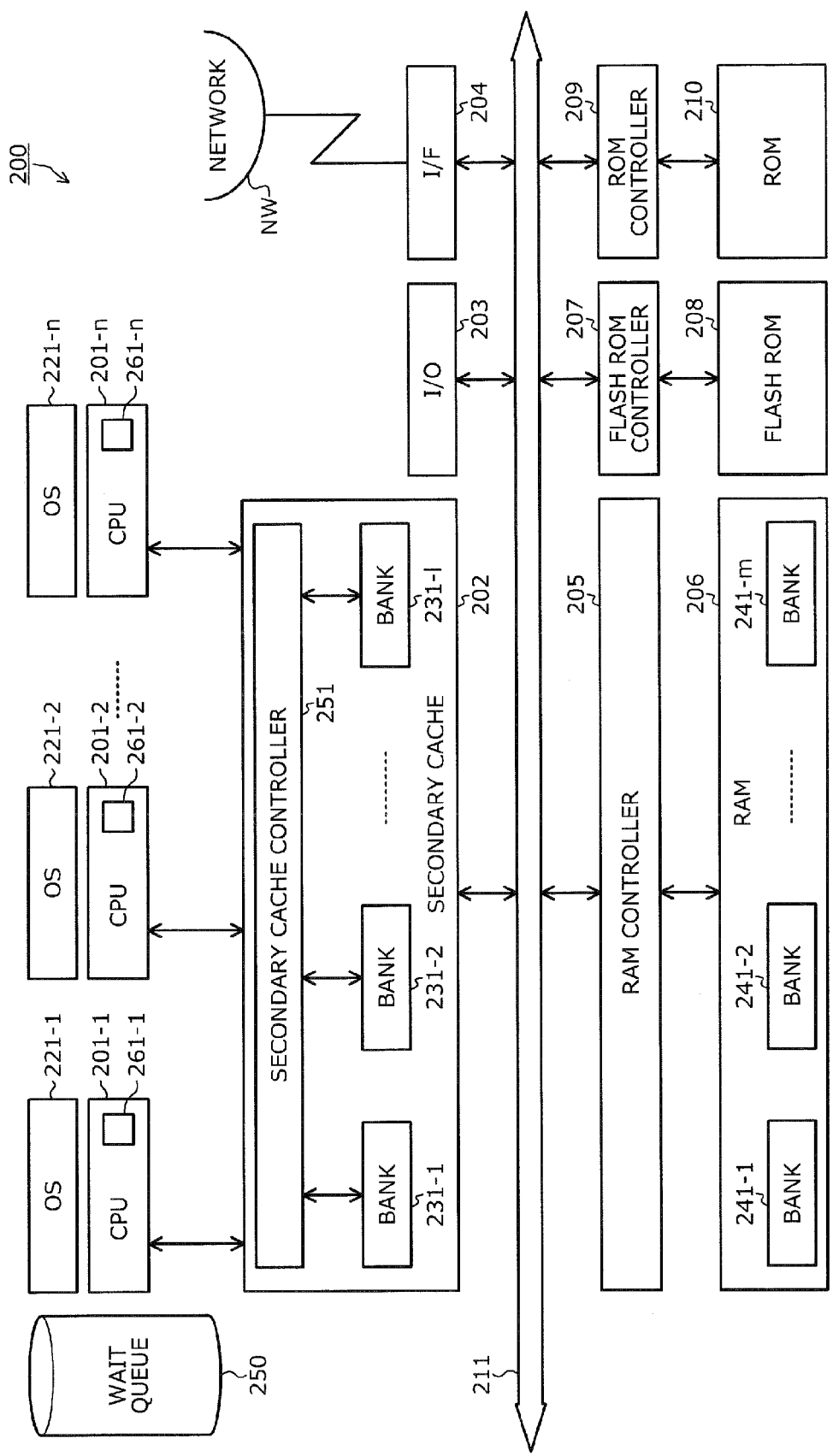
FIG. 2 is an explanatory diagram of an example of a hardware configuration of the multi-core processor system.

FIG. 2 is an explanatory diagram of an example of a hardware configuration of the multi-core processor system. The multi-core processor system 200 includes CPUs 201-1 to 201-$n$, a secondary cache 202, an I/O 203, an I/F 204, a RAM controller 205, RAM 206, a flash ROM controller 207, flash ROM 208, a ROM controller 209, and ROM 210.

The RAM controller 205, the flash ROM controller 207, the ROM controller 209, the secondary cache 202, the I/O 203, and the I/F 204 are connected to each other through a bus 211. The CPUs 201-1 to 201-$n$ ($n \geq 2$) are connected to the components through the secondary cache 202. The RAM 206 is connected to the components through the RAM controller 205. The flash ROM 208 is connected to the components through the flash ROM controller 207. The ROM 210 is connected to the components through the ROM controller 209.

The CPU 201-1 is a master CPU and controls the overall multi-core processor system 200. The CPUs 201-2 to 201-$n$ are slave CPUs. The CPUs 201-1 to 201-$n$ respectively include primary caches 261-1 to 261-$n$, and each includes a register, a core, and a memory management unit (MMU). When the MMU receives a write instruction or a read instruction from the CPU 201, the MMU converts the logical address included in the order into a physical address. The CPUs 201-1 to 201-$n$ respectively execute OSs 221-1 to 221-$n$.

The OS 221-1 is the master OS of the multi-core processor overall. The OS 221-1 includes a wait queue 250 and when a pointer to binary information of a thread is loaded on the wait queue 250, the OS 221-1 determines that the OS 221-1 has received a startup instruction for the thread.

Although not depicted, the OSs 221-1 to 221-$n$ each includes a run queue. Each run queue is loaded with a pointer for context information of the thread assigned to the CPU 201. The "context information" is, for example, information including the execution state of the loaded thread, variables in the thread, etc. Each of the OSs 221-1 to 221-$n$ acquires the pointer of the context information in the run queue, accesses the context information of the thread, and thereby, can immediately execute the thread.

The primary caches 261-1 to 261-$n$ respectively included in the CPUs 201-1 to 201-$n$ temporarily store data of a process of writing to the RAM 206 or the flash ROM 208 by a thread executed by the OS 221. Each primary cache 261 temporarily stores data that is read from the RAM 206 or the flash ROM 208, and is connected by a snoop circuit. When shared data in the primary cache 261 of a CPU 201 is updated, the snoop circuit detects the updating and also updates the data in the other primary caches 261 of the other CPUs 201.

The secondary cache 202 includes cache memory and a secondary cache controller 251. The secondary cache 202 stores data that has been pushed from the primary cache 261 of the CPU 201 and data that has been read from the RAM 206 or the flash ROM 208. The storage capacity of the secondary cache 202 is larger than that of the primary cache 261 and the speed of access of the secondary cache 202 by the CPU 201 is lower than that for the primary cache 261; and the storage capacity of the secondary cache 202 is smaller than that of the RAM 206 and the speed of access of the secondary cache 202 by the CPU 201 is higher than that for the RAM 206.

The cache memory of the secondary cache 202 is divided into banks 231-1 to 231-I, and the secondary cache controller 251 has a memory interleaving function and can issue a write instruction or a read instruction from the CPU 201 to the plural banks 231. Therefore, no contention occurs if different banks 231 are accessed.

The secondary cache controller 251 includes an access queue (not depicted), for each bank 231. The secondary cache controller 251 determines the bank 231 to which access is directed and thereafter, registers an access request (the write instruction or the read instruction) into the access queue for the bank 231 that is to be accessed (access destination). The secondary cache controller 251 accesses the banks 231 in order of access requests registered in the access queue.

For example, the banks 231-1 to 231-I may each include a flag indicating whether the bank is an empty area. When the secondary cache controller 251 receives a read instruction or a write instruction from the CPU 201, the secondary cache controller 251 determines whether a data group concerning the read instruction or the write instruction is stored in the banks 231.

For example, if the secondary cache controller 251 determines that the data group is not stored in any of the banks 231, the secondary cache controller 251 identifies the banks 231 having an empty area based on the flag indicating whether the bank 231-1 to 231-I is an empty area. For example, the secondary cache controller 251 causes the identified bank 231 to store the data group and changes the flag of the identified bank 231 to indicate a used area. For example, when data of the data group is stored in a bank 231, the remaining data of the data group may be caused to be stored in the same bank 231.

The banks 231-1 to 231-I may each have the time of day of the latest access to the bank 231-1 to 231-I. For example, when a data group concerning a read instruction or a write instruction is not stored in the banks 231, the secondary cache controller 251 identifies the bank 231 whose latest access time is the oldest; pushes the data group stored in the identified bank 231 therefrom to the RAM 206 or the flash ROM 203; causes the identified bank 231 to store the data group based on a new order; and updates the access time.

The banks 231 may each include a flag that indicates whether the bank 231 is an empty area, and a latest access time, for each cache line of the bank 231. Each OS 221 may manage flags each indicating whether the bank 231 is empty, correlating the thread and the bank 231.

The RAM 206 is used as, for example, a work area for the CPUs 201-1 to 201-$n$. The storage area of the RAM 206 is divided into banks 241-1 to 241-$m$. Therefore, the RAM controller 205 has a memory interleaving function, and can simultaneously issue write instructions and read instructions from the CPUs 201 to the plural banks 241 using the memory interleaving function. Therefore, no contention occurs when accesses are made each to the bank 241 that is different from each other.

The RAM controller 205 includes an access queue for each bank 241. The RAM controller 205 determines to which bank 241 an access is made and thereafter, registers an access request into the access queue for the bank 241 of the access destination. The RAM controller 205 accesses the banks 241 in order of the access requests registered in the access queue.

For example, the banks 241-1 to 241-$m$ may each include a flag that indicates whether the bank is an empty area. The CPU 201 causes the RAM 206 to store the context information to execute the thread. When the RAM controller 205 receives from the CPU 201, a write instruction for the context information of the thread, the RAM controller 205 identifies the bank 241 that is an empty area corresponding to the size of the context information and based on the flags that indicate whether the banks 241-1 to 241-$m$ are an empty area. The context information includes program code for the thread and variables, etc. to be used for the execution of the thread as above. For example, the RAM controller 205 causes the identified bank 241 to store the context information and changes the flag of the identified bank 241 to indicate the used area. Thereby, the RAM controller 205 can assign the bank 241 for each thread.

For example, when the RAM controller 205 cannot identify the bank 241 that is an empty area, the RAM controller 205 causes the data stored in an arbitrary bank 241 to by temporarily saved into the flash ROM 208 and causes the arbitrary bank 241 to store the context information.

For example, a thread currently under execution may dynamically increase storage areas to be used thereby, to cause the RAM 206 to store new data. In this case, the thread causes a storage area continued from the storage area already used (for example, the storage area for the context information) to store the new data and therefore, the new data is stored in the same bank 241 as the already used bank 241. Thus, even when plural threads are concurrently executed in parallel by the multi-core processor, the threads are assigned such that the number of banks used by the threads does not exceed the number of banks of the RAM 206 and thereby, the threads each can use a differing bank 241. The used storage areas are managed by the MMU included in each CPU 201 based on a conversion table used to convert the logical address into the physical address.

The banks 241-1 to 241-*m* may each include the latest access time of access to the bank 241. Thereby, the banks can be assigned to the threads based on the least recently used (LRU). For example, when the data group concerning the read instruction or the write instruction is not stored in the banks 241, the RAM 206 identifies the bank 241 whose latest access time is the oldest. The RAM 206 causes the identified bank 241 to store the data group and updates the access time. The RAM 206 causes the data group stored in the identified bank 241 to temporarily be swapped to the flash ROM 208, causes the identified bank 241 to store the data group according to a new order, and updates the access time. The data in the bank 241 whose time period without any access is the longest can be used as the data to be swapped.

The banks 241 may each include a flag indicating whether the bank is an empty area, and the latest access time, for each cache line of the bank 241. Even when the management is executed for each cache line, the data group is stored in consecutive storage areas and therefore, for example, for large data such as program code, the RAM controller 205 can assign such data entirely to the same bank 241. Each OS 221 may manage the flag indicating whether a bank 241 is an empty area, correlating the thread and the bank 241.

"m" is used herein as the number of banks of the RAM 206. However, the number is not limited hereto and an upper limit value of banks usable for the threads may be defined in advance as the number of banks of the RAM 206.

The ROM 210 has programs stored therein such as a boot program. The ROM controller 209 controls access of the ROM 210. The flash ROM 208 stores system software such as the OSs 221 and programs of applications. For example, the flash ROM 208 may be incorporated in the multi-core processor system 200 or may be a storage medium such as a memory card or an SD card. The flash ROM controller 207 controls access of the flash ROM 208.

FIG. 3 is an explanatory diagram of an example of a thread table according to first to fifth examples. Thread tables of sixth and seventh examples will be described later. The thread table 300 has fields for the thread ID, the processing time period, and the number of banks to be used. Thread information is stored as a record (for example, 301-1) by setting a value in each field.

Identification information of a thread is registered in the thread ID field. The processing time period of the thread is registered in the processing time period field. For example, the processing time period of each thread may be measured in advance by a simulation tool when the thread is designed. The number of banks to be used by the thread for execution, among the banks of the RAM 206 is registered in the number of banks to be used field. The number of banks to be used by each thread may be counted in advance by the simulation tool when the thread is designed, or may be a value measured when the thread is executed. The thread table 300 may be stored in the flash ROM 208.

FIG. 4 is an explanatory diagram of an example of an assignment table according to the first to the sixth examples. An assignment table of the seventh example will be described later. The assignment table 400 has fields for the CPU ID and the thread ID. Thread information is stored as a record (for example, 401-1) by setting a value in each field.

Identification information of the CPU 201 is registered in the CPU ID field. Identification information of the thread assigned to the CPU 201 is registered in the thread ID field. Each time the OS 221-1 that is the master OS assigns a thread to the CPU 201, the assignment result of the threads is set in the assignment table 400 and thereby, a new record is produced. When the execution of a thread by an OS 221-2 to 221-*n* comes to an end, the record that concerns the thread whose execution has ended is deleted from the assignment table 400. The assignment table 400 is stored in the flash ROM 208.

Figure 5:
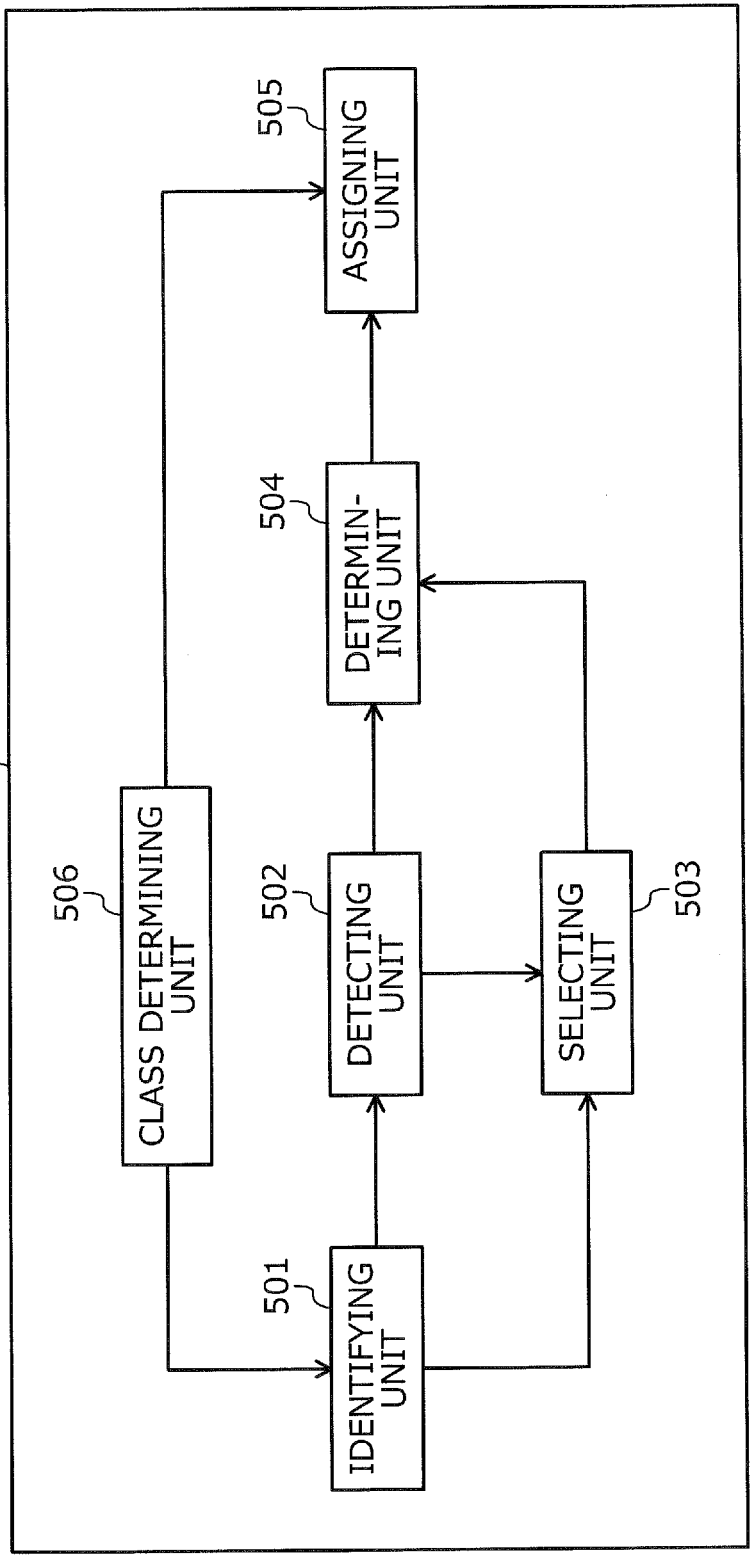
FIG. 5 is a block diagram of an example of functions of a master OS according to the first to the sixth examples.

FIG. 5 is a block diagram of an example of functions of the master OS according to the first to the sixth examples. A block diagram of an example of functions of the master OS according to the seventh example will be described later. The OS 221-1 that is the master OS includes an identifying unit 501, a detecting unit 502, a selecting unit 503, a determining unit 504, an assigning unit 505, and a class determining unit 506. Processes of the units from the identifying unit 501 to the class determining unit 506 are coded in the master OS. The CPU 201-1 reads the OS 221-1 stored in the flash ROM 208 and executes the process coded in the OS 221-1. Thereby, functions of the units from the identifying unit 501 to the class determining unit 506 are implemented. The units from the identifying unit 501 to the class determining unit 506 will be described in detail using the first to the sixth examples. In the first to the sixth examples, "n", "I", and "m" are assumed to be n=4, I=10, and m=10. The seventh example will be described with reference to a block diagram that encompasses the block diagram depicted in FIG. 5.

The first example will be described. Even when the thread group of the selected number of used banks is concurrently executed in parallel by the CPUs 201, the occurrence of bank shortages has to be prevented. Therefore, in the first example, the CPUs 201 are sequentially selected, and the CPU 201 for which the sum of the number of banks used by the threads for parallel execution does not exceed the number of banks of the shared resource, is detected as the assignment destination of the thread to be executed. Thereby, drops in performance of processing threads occurring consequent to access contention at the shared resource can be reduced.

FIGS. 6A, 6B, 6C, and 6D are explanatory diagrams of an example determining the CPUs 201 to be selected according to the first example. The identifying unit 501 identifies from the thread table 300, the number of banks to be used by a given thread 600 and the number of banks used by threads 601 (601-1 to 601-7) already assigned to the CPUs 201. The "given thread 600" is, for example, the thread for which the OS 221-1 depicted in FIG. 2 receives a startup instruction.

For example, the identifying unit 501 extracts from the assignment table 400, identification information concerning the threads 601 already assigned to the CPUs 201, based on the identification information concerning the CPUs 201. For example, from the thread table 300, the identifying unit 501 identifies the number of banks to be used by each thread, based on the identification information concerning the given thread 600 and the extracted identification information concerning the threads 601 already assigned to the CPUs 201. The number of banks of the RAM 206 used by each thread is written in parentheses "( )" of each thread in FIGS. 6A, 6B, 6C, and 6D.

The detecting unit 502 detects for each CPU 201, the highest value B among the identified numbers of banks to be used by the threads 601 already assigned. In FIGS. 6A, 6B, 6C, and 6D, the highest value B1 for the CPU 201-1 is three;

the highest value B2 for the CPU 201-2 is two; the highest value B3 for the CPU 201-3 is two; and the highest value B4 for the CPU 201-4 is three.

After the detection by the detecting unit 502, the selecting unit 503 sequentially selects the CPUs 201 as candidate assignment destinations. For example, the selecting unit 503 selects the CPUs 201 in order of identification information thereof. Therefore, the selecting unit 503 selects the CPUs 201 in order of the CPUs 201-1 to 201-2 to 201-3 to 201-4.

Each time the selecting unit 503 selects a CPU 201, the determining unit 504 selects the greater value of the detected highest value of the selected CPU 201 and the identified number of banks to be used by the given thread 600. The determining unit 504 determines if the sum SUM of the selected greater value and the detected highest value of a CPU 201 other than the selected CPU 201 is less than or equal to the number of banks m of the RAM 206. For example, the determining unit 504 calculates Eq. (1) below.

$$SUMi(i=1 \text{ to } n)=\Sigma B1,\ldots,MAX(Bi,c),\ldots,Bn \quad (1)$$

"MAX(Bi, c)" represents the greater value of the detected highest value of the selected CPU 201 and the identified number of banks to be used by the given thread 600. For example, the determining unit 504 determines if the sum SUM is less than or equal to the number of banks m of the RAM 206.

Figure 6A:
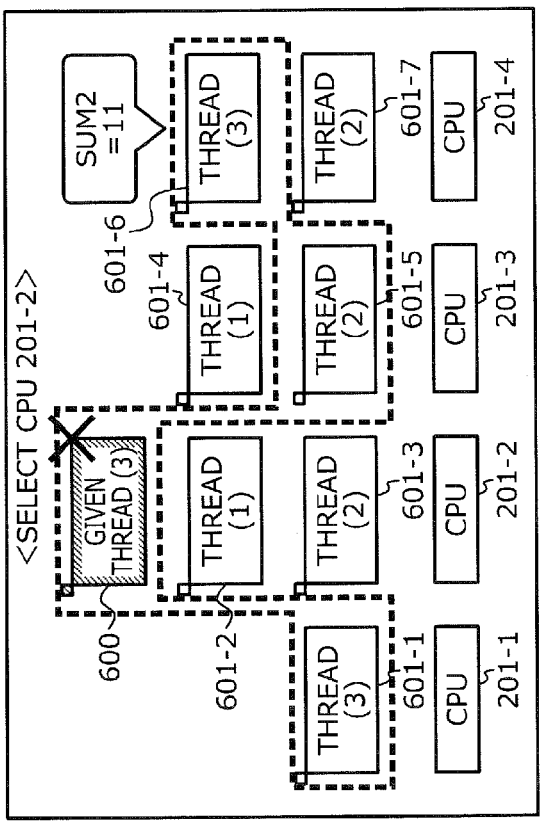
FIGS. 6A, 6B, 6C, and 6D are explanatory diagrams of an example determining CPUs 201 to be selected according to the first example.

As depicted in FIG. 6A, the selecting unit 503 selects the CPU 201-1. In this case, a sum SUM1 (the total number of banks used by the threads surrounded by a dotted line frame) is 10 and therefore, the determining unit 504 determines that the sum SUM1 is less than or equal to the number of banks m of the RAM 206.

Figure 6B:
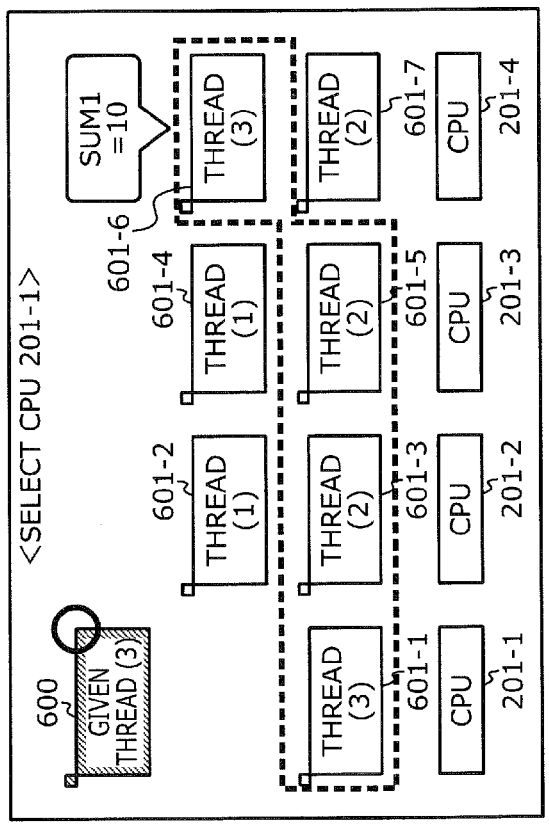

As depicted in FIG. 6B, the selecting unit 503 selects the CPU 201-2. In this case, a sum SUM2 (the total number of banks used by the threads surrounded by a dotted line frame) is 11 and therefore, the determining unit 504 determines that the sum SUM2 is not less than or equal to the number of banks m of the RAM 206.

Figure 6D:
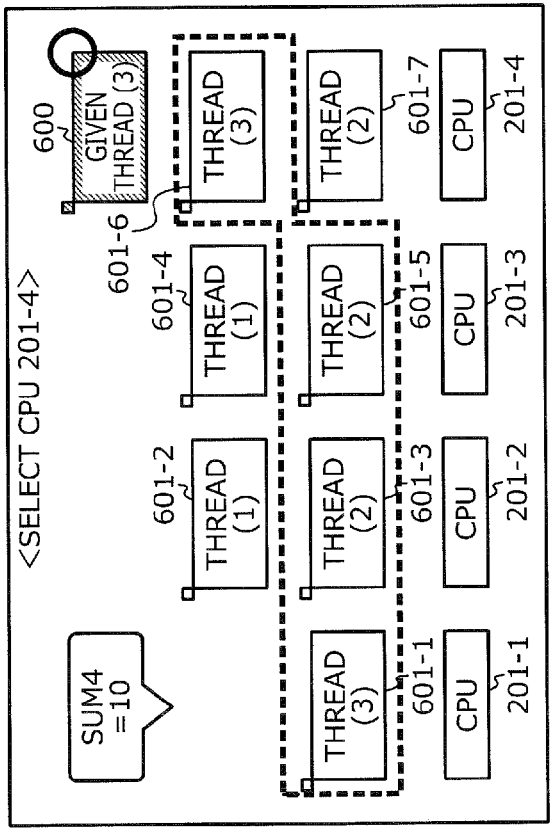
Figure 6C:
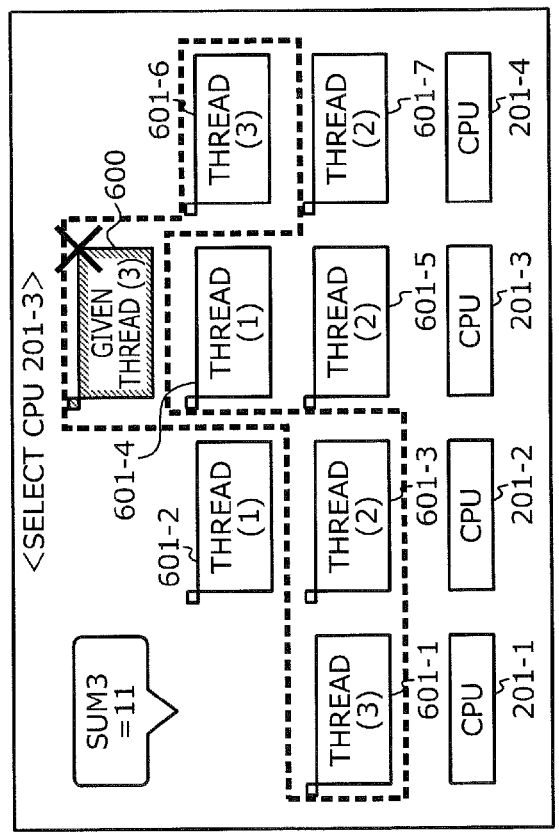

As depicted in FIG. 6C, the selecting unit 503 selects the CPU 201-3. In this case, a sum SUM3 (the total number of banks used by the threads surrounded by a dotted line frame) is 11 and therefore, the determining unit 504 determines that the sum SUM3 is not less than or equal to the number of banks m of the RAM 206.

As depicted in FIG. 6D, the selecting unit 503 selects the CPU 201-4. In this case, a sum SUM4 (the total number of banks used by the threads surrounded by a dotted line frame) is 10 and therefore, the determining unit 504 determines that the sum SUM4 is less than or equal to the number of banks m of the RAM 206.

The assigning unit 505 assigns the given thread 600, to the CPU 201 for which the determining unit 504 determines that the sum SUM is less than or equal to the number of banks m of the RAM 206. For example, the assigning unit 505 assigns the given thread 600, to the CPU 201-1 or 201-4. To which candidate assignment destination the assigning unit 505 assigns in the case where plural candidate assignment destinations are present for each of which the determining unit 504 determines that the sum SUM is less than or equal to the number of banks m of the RAM 206, will be described with reference to FIGS. 7A and 7B.

Figure 7B:
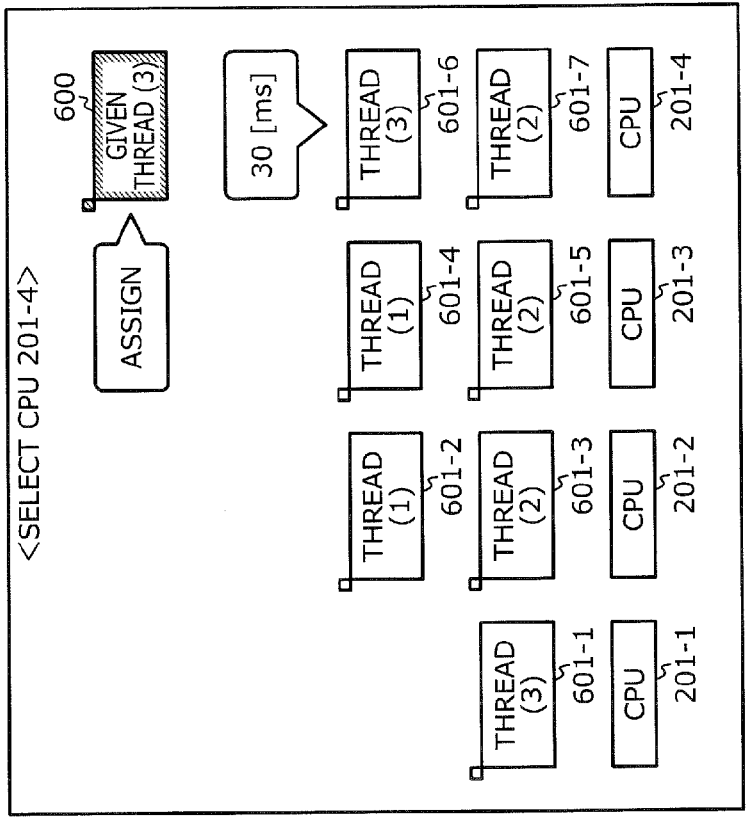
FIGS. 7A and 7B are explanatory diagrams of an example of assignment according to the first example.
Figure 7A:
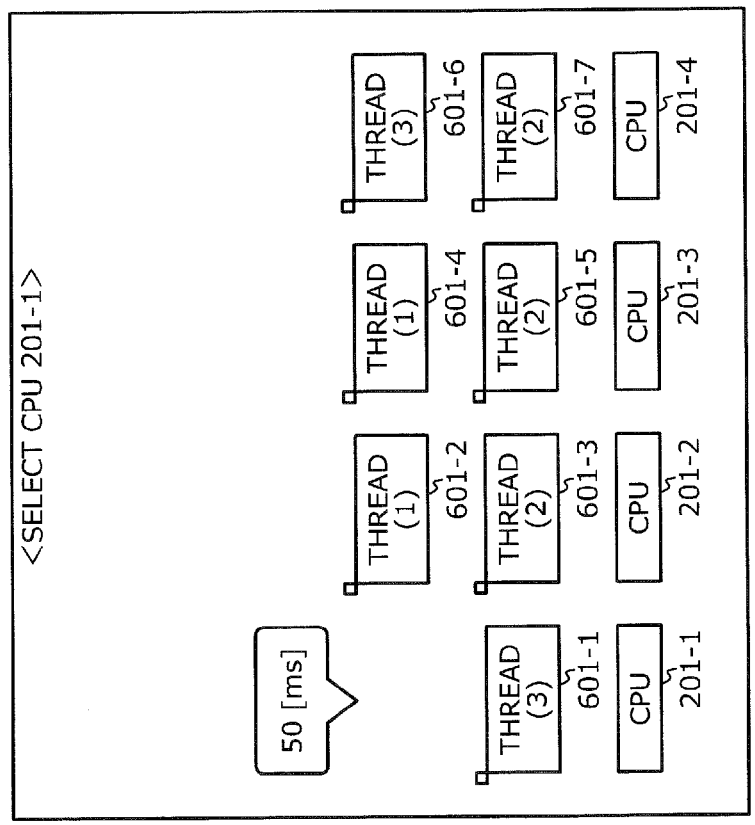

FIGS. 7A and 7B are explanatory diagrams of an example of assignment according to the first example. For example, the assigning unit 505 calculates the total value of the processing time periods of the threads 601 already assigned to each of the CPUs 201-1 and 201-4 for which the determining unit 504 determines that the sum SUM is less than or equal to the number of banks m of the RAM 206. For example, the assigning unit 505 refers to the thread table 300 and thereby, can identify the processing time periods of the threads 601 already assigned. In FIGS. 7A and 7B, the total value of processing time periods of the threads 601 already assigned to the CPU 201-1 is 50 [ms] and the total value of the processing time periods of the threads 601 already assigned to the CPU 201-4 is 30 [ms]. Therefore, the given thread 600 is assigned to the CPU 201-4.

FIG. 8 is a flowchart of a process executed by the master OS according to the first example. The master OS determines whether a startup instruction has been received for a thread (step S801). If the master OS determines that no startup instruction has been received for a thread (step S801: NO), the master OS returns to step S801.

If the master OS determines that a startup instruction has been received for a thread (step S801: YES), the identifying unit 501 identifies for each CPU 201, the number of banks used by the threads already assigned (step S802). The master OS identifies, using the identifying unit 501, the number of banks c to be used by the thread (given thread) for which the master OS has received the startup instruction (step S803). The detecting unit 502 detects the highest values B (1 to n) for each CPU 201, from the identified numbers of banks to be used (step S804).

The master OS sets "i" to be i=1 using the selecting unit 503 (step S805) and determines whether "i" is i≤the number of CPUs using the selecting unit 503 (step S806). If the master OS determines that "i" is i≤the number of CPUs (step S806: YES), the master OS selects the i-th CPU 201 (step S807). The master OS selects the greater value (MAX(Bi, c)) of the highest value Bi of the i-th CPU 201 and the number of banks c to be used by the given thread (step S808).

The master OS calculates SUMi=ΣB1, . . . , MAX(Bi, c), . . . , Bn (step S809) and determines whether the sum SUMi is SUMi≤the number of banks m of the RAM 206 (step S810). If the master OS determines that the sum SUMi is SUMi≤the number of banks m of the RAM 206 (step S810: YES), the master OS detects the i-th CPU 201 as a candidate assignment destination (step S811) and sets i to be i=i+1 (step S812), and the master OS returns to step S806. If the master OS determines that the sum SUMi is not SUMi≤the number of banks m of the RAM 206 (step S810: NO), the master OS progresses to step S812.

If the master OS determines at step S806 that "i" is not i≤the number of CPUs (step S806: NO), the master OS calculates for each detected CPU 201, the total value of the processing time periods of the threads already assigned (step S813). The master OS assigns the given thread to the CPU 201 whose calculated total value is the smallest among the detected CPUs 201 (step S814) and the master OS progresses to step S801. Although not depicted, the master OS outputs the assignment result to the assignment table 400.

According to the first example, among the CPUs 201, a given thread can be assigned to the CPU 201 by which performance drops consequent to access contention can be reduced. When plural candidate assignment destinations are present for which the sum SUM is less than or equal to the number of banks m of the RAM 206, the given thread is assigned to the core for which the processing time period of the threads already assigned is the shortest. Thus, performance drops consequent to access contention at the RAM 206 can be reduced and load balance can be executed.

The second example will be described. The CPUs are selected from the CPU at the head thereof in the first example. However, in the second example, the CPUs 201 are selected as candidate assignment destinations from among the CPUs 201 in descending order of the detected highest values. With a descending order of the highest values, the highest value is highly likely to be greater than the number of banks to be used by the thread to be executed and therefore, the sum of the number of banks to be used by the threads during parallel execution tends to vary compared to a case where the CPUs 201 are randomly selected. Therefore, the assignment destination of a given thread can be determined quickly, enabling performance drops consequent to access contention to be reduced.

Figure 9:
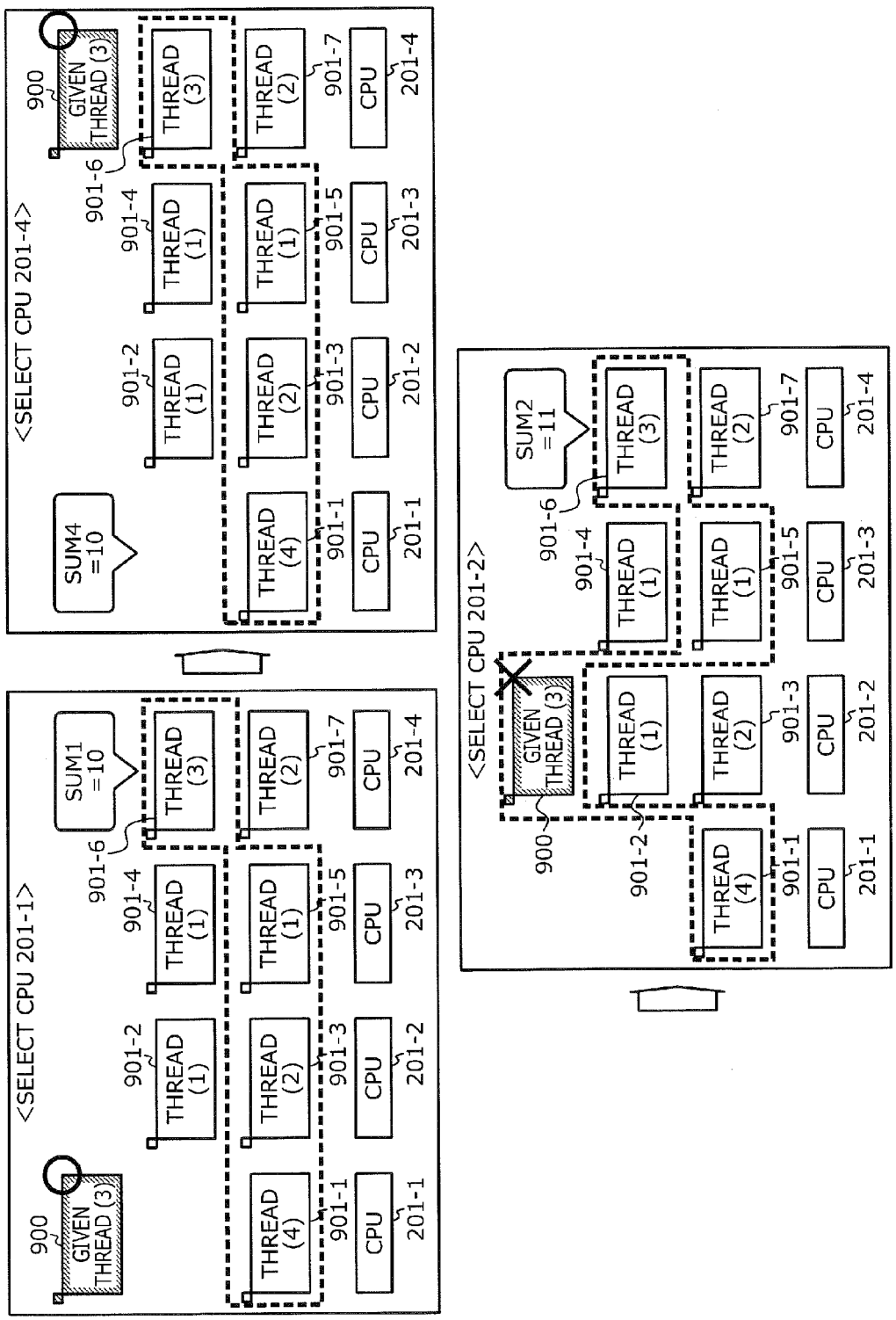
FIG. 9 is an explanatory diagram of an example of selection of the CPUs 201 according to the second example.

FIG. 9 is an explanatory diagram of an example of selection of the CPUs 201 according to the second example. In FIG. 9, threads 901-1 to 901-7 are already assigned to the CPUs 201. The number of banks of the RAM 206 used by each thread is written in the parentheses "( )" of each thread in FIG. 9.

The processes of the identifying unit 501 and the detecting unit 502 in the second example are the same as those described in the first example and therefore, will not again be described. In the example of FIG. 9, the highest value B1 for the CPU 201-1 is four; the highest value B2 for the CPU 201-2 is two; the highest value B3 for the CPU 201-3 is one; and the highest value B4 for the CPU 201-4 is three.

The selecting unit 503 selects the CPU 201 in descending order of the highest values B detected by the detecting unit 502. Therefore, the selecting unit 503 selects the CPUs 201 in the order of 201-1→201-4→201-2→201-3.

As depicted in the upper left of FIG. 9, the selecting unit 503 selects the CPU 201-1. In this case, the sum SUM1 (the total number of banks used by the threads surrounded by a dotted line frame) is 10 and therefore, the determining unit 504 determines that the sum SUM1 is less than or equal to the number of banks m of the RAM 206.

As depicted in the upper right of FIG. 9, the selecting unit 503 selects the CPU 201-4. In this case, the sum SUM4 (the total number of banks used by the threads surrounded by a dotted line frame) is 10 and therefore, the determining unit 504 determines that the sum SUM4 is less than or equal to the number of banks m of the RAM 206.

As depicted in the lower center of FIG. 9, the selecting unit 503 selects the CPU 201-2. In this case, the sum SUM2 (the total number of banks used by the threads surrounded by a dotted line frame) is 11 and therefore, the determining unit 504 determines that the sum SUM2 is not less than or equal to the number of banks m of the RAM 206.

The highest value of the CPU 201-3 detected by the detecting unit 502 is less than or equal to the highest value of the CPU 201-2 and therefore, the sum SUM3 is never smaller than the sum SUM2. Therefore, without calculating the sum SUM3, the determining unit 504 determines that the sum SUM3 is not less than or equal to the number of banks m of the RAM 206.

The assigning unit 505 assigns a given thread 900, to any one among the CPUs 201-1 and 201-4. The assigning unit 505 is a processing unit identical to that described in the first example and therefore, will not again be described.

For example, at the time when it is determined that the sum SUM is not less than or equal to the number of banks m of the RAM 206, the assigning unit 505 may determine the assignment destination of the given thread 900, from among the candidate assignment destinations whose sums SUM are each already determined to be less than or equal to the number of banks m of the RAM 206. Thereby, the CPU 201 for which the sum of the number of banks to be used by the threads for parallel execution does not exceed the number of banks of the shared resource can be detected without executing the process of the determining unit 504 for a case where all the CPUs 201 are selected, and the speed of the assignment process can be increased.

Figure 10:
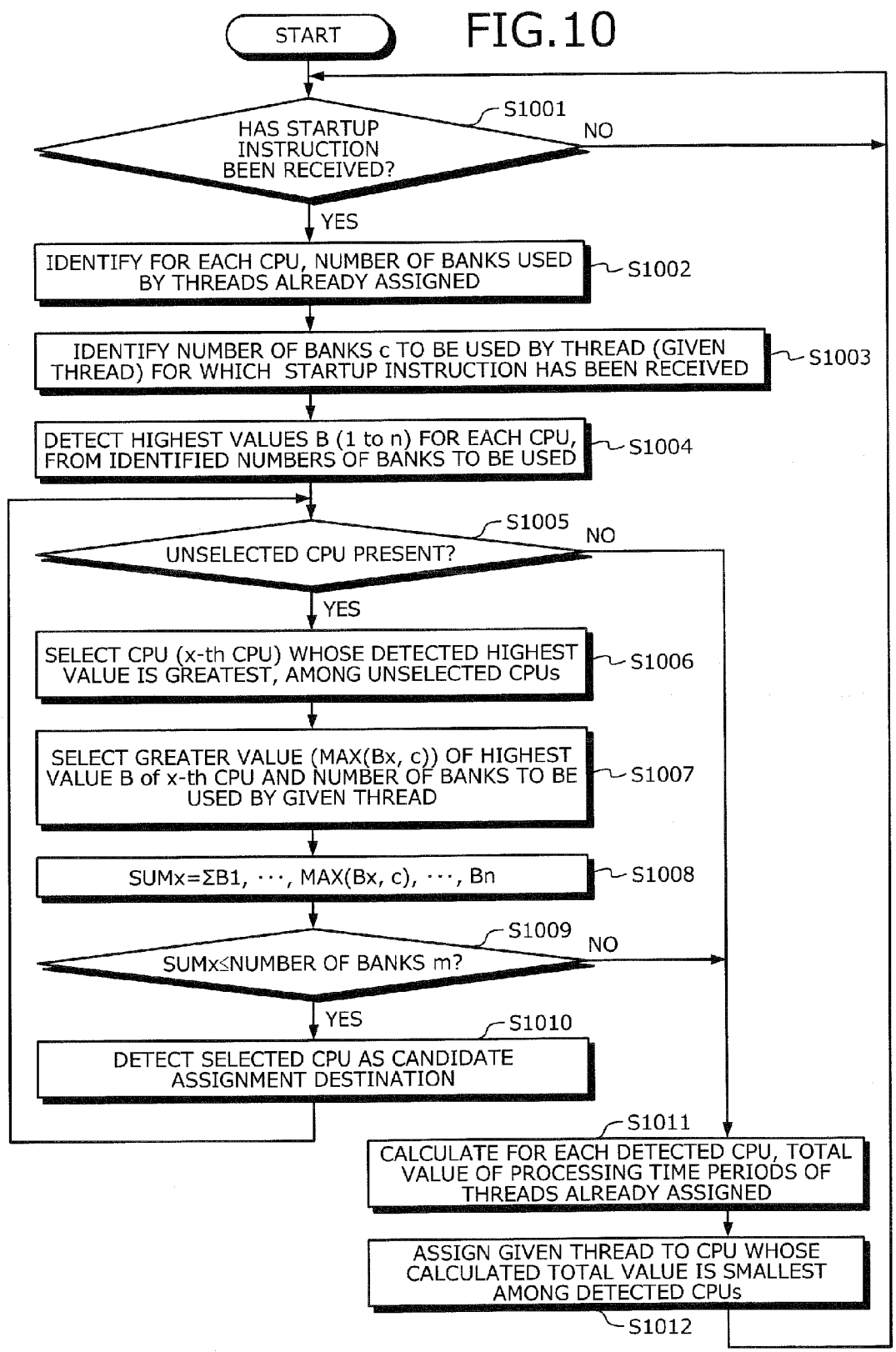
FIG. 10 is a flowchart of a process executed by the master OS according to the second example.

FIG. 10 is a flowchart of a process executed by the master OS according to the second example. The master OS determines whether a startup instruction has been received for a thread (step S1001). If the master OS determines that no startup instruction has been received for a thread (step S1001: NO), the master OS returns to step S1001.

If the master OS determines that a startup instruction has been received for a thread (step S1001: YES), the identifying unit 501 identifies for each CPU 201, the number of banks used by the threads already assigned (step S1002). The master OS identifies, using the identifying unit 501, the number of banks c to be used by the thread (given thread) for which the master OS has received the startup instruction (step S1003). The detecting unit 502 detects the highest values B (1 to n) for each CPU 201 from the identified numbers of banks to be used (step S1004).

The master OS determines, using the selecting unit 503, whether an unselected CPU 201 is present (step S1005). If the master OS determines that unselected CPUs 201 are present (step S1005: YES), the master OS selects the CPU 201 (the x-th CPU 201) whose detected highest value is the greatest, among the unselected CPUs 201 (step S1006).

The master OS selects the greater value (MAX(Bx, c)) of the highest value B of the x-th CPU 201 and the number of banks to be used by the given thread (step S1007). The master OS calculates SUMx=ΣB1, . . . , MAX(Bx, c), . . . , Bn (step S1008) and determines whether the sum SUMx is SUMx≤the number of banks m of the RAM 206 (step S1009). If the master OS determines that the sum SUMx is SUMx≤the number of banks m of the RAM 206 (step S1009: YES), the master OS detects a selected CPU 201 as a candidate assignment destination (step S1010), and the master OS progresses to step S1005.

If the master OS determines that the sum SUMx is not SUMx≤the number of banks m of the RAM 206 (step S1009: NO), the master OS progresses to step S1011. If the master OS determines at step S1005 that no unselected CPU 201 is present (step S1005: NO), the master OS progresses to step S1011.

The master OS calculates for each detected CPU 201, the total value of the processing time periods of the threads already assigned (step S1011) and assigns the given thread, to the CPU 201 whose calculated total value is the shortest, among the detected CPUs 201 (step S1012) and the master OS returns to step S1001. Although not depicted, the master OS outputs the assignment result to the assignment table 400.

According to the second example, the CPU to be the assignment destination of a given thread can quickly be determined, enabling performance drops consequent to access contention to be reduced, by selecting the CPU from the CPUs whose sum of the banks to be used tends not to vary.

The third example will be described. In the first and the second example, the CPUs are sequentially selected. However, in the third example, only the CPU 201 whose detected highest value is the greatest is selected. For the CPU 201 whose detected highest value is the greatest, the highest value is most highly likely to be greater than the number of banks to be used by a given thread 1100 and therefore, the sum of the numbers of banks to be used by the threads tends not to vary during parallel execution. Therefore, the assignment destination of the given thread 1100 can be determined quickly, enabling performance drops that occur consequent to access contention to be reduced.

Figure 11:
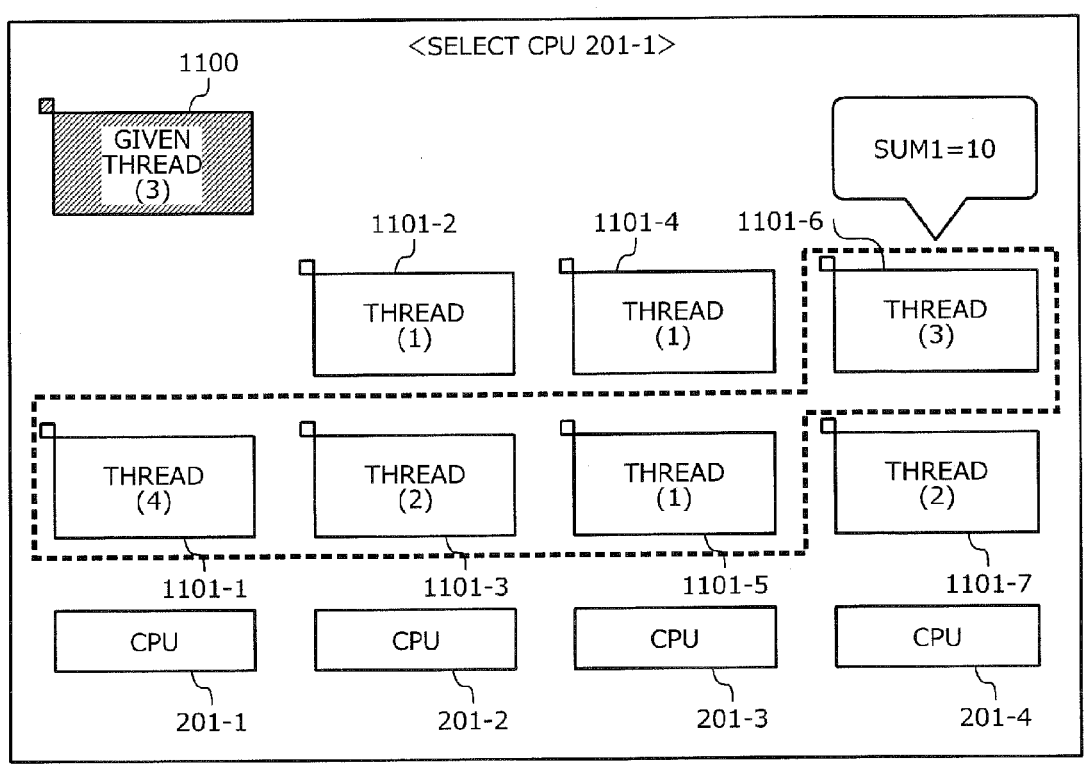
FIG. 11 is an explanatory diagram of an example of selection of the CPU 201 according to the third example.

FIG. 11 is an explanatory diagram of an example of selection of the CPU 201 according to the third example. In FIG. 11, threads 1101-1 to 1101-7 are already assigned to the CPUs 201. The number of banks of the RAM 206 used by each thread is written in the parentheses "( )" of the thread in FIG. 11. The processes of the identifying unit 501 and the detecting unit 502 in the third example are identical to those described in the first example and therefore, will not again be described.

The selecting unit 503 selects the CPU 201 whose highest value B detected by the detecting unit 502 is the greatest. In the example of FIG. 11, the highest value B1 of the CPU 201-1 is four; the highest value B2 of the CPU 201-2 is two; the highest value B3 of the CPU 201-3 is one; and the highest value B4 of the CPU 201-4 is three. Therefore, the selecting unit 503 selects the CPU 201-1.

In FIG. 11, the sum SUM1 is 10 and therefore, the determining unit 504 determines that the sum SUM1 is less than or equal to the number of banks m of the RAM 206. The assigning unit 505 assigns the given thread 1100 to the CPU 201-1. Thereby, reductions in performance drops consequent to access contention at the RAM 206 can be facilitated and the speed of the assignment process can be increased.

FIG. 12 is a flowchart of a process executed by the master OS according to the third example. The master OS determines whether a startup instruction has been received for a thread (step S1201). If the master OS determines that no startup instruction has been received for a thread (step S1201: NO), the master OS returns to step S1201.

If the master OS determines that a startup instruction has been received for a thread (step S1201: YES), the identifying unit 501 identifies for each CPU 201, the number of banks used by the threads already assigned (step S1202). The master OS identifies, using the identifying unit 501, the number of banks c to be used by the thread (given thread) for which the master OS has received the startup instruction (step S1203). The detecting unit 502 detects the highest values B (1 to n) for each CPU 201 from the identified numbers of banks to be used (step S1204).

The master OS, using the selecting unit 503, selects the CPU 201 (the x-th CPU 201) whose detected highest value B is the greatest (step S1205) and selects the greater value (MAX(Bx, c)) of the highest value Bx of the x-th CPU 201 and the number of banks c to be used by the given thread (step S1206).

The master OS calculates SUMx=ΣB1, . . . , MAX(Bx, c), . . . , Bn (step S1207) and determines whether the sum SUMx is SUMx≤the number of banks m of the RAM 206 (step S1208). If the master OS determines that the sum SUMx is SUMx≤the number of banks m of the RAM 206 (step S1208: YES), the master OS assigns the given thread to the x-th CPU 201 (step S1209) and the master OS returns to step S1201.

If the master OS determines at step S1208 that the sum SUMx is not SUMx≤the number of banks m of the RAM 206 (step S1208: NO), the master OS calculates for each CPU 201, the total value of the processing time periods of the threads already assigned (step S1210) and assigns the given thread to the CPU 201 whose total value is the shortest (step S1211) and the master OS returns to step S1201. Although not depicted, the master OS outputs the assignment result to the assignment table 400.

According to the third example, the speed of the determination of the assignment destination CPU of a given thread can be increased, enabling performance drops consequent to access contention to be reduced, by selecting the CPU 201 whose sum of the number of banks to be used by the threads for the parallel execution is most highly likely to not vary.

The fourth example will be described. In the fourth example, when even a CPU 201 is selected and a bank shortage occurs, a given thread is assigned to the CPU 201 whose sum of the number of banks used by the threads during the parallel processing is the smallest. Thereby, the occurrence of access contention can be minimized.

FIGS. 13A, 13B, 13C, and 13D are explanatory diagrams of an example of assignment according to the fourth example. In the fourth example, a case will be described where irrespective of the CPU 201 that the selecting unit 503 selects, the determining unit 504 determines that the sum SUM is not less than or equal to the number of banks m of the RAM 206. In FIGS. 13A, 13B, 13C, and 13D, threads 1301-1 to 1301-7 are already assigned to the CPUs 201. The number of banks of the RAM 206 used by each thread is written in the parentheses "( )" of each thread in FIGS. 13A, 13B, 13C, and 13D.

Figure 13A:
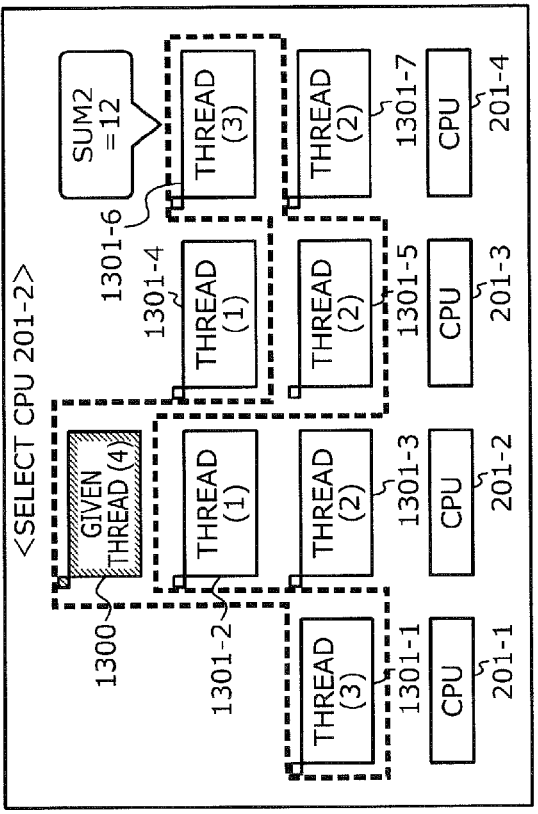

As depicted in FIG. 13A, the selecting unit 503 selects the CPU 201-1. In this case, SUM1 (the total number of banks used by the threads surrounded by a dotted line frame) is 11 and therefore, the determining unit 504 determines that SUM1 is not less than or equal to the number of banks m of the RAM 206.

Figure 13B:
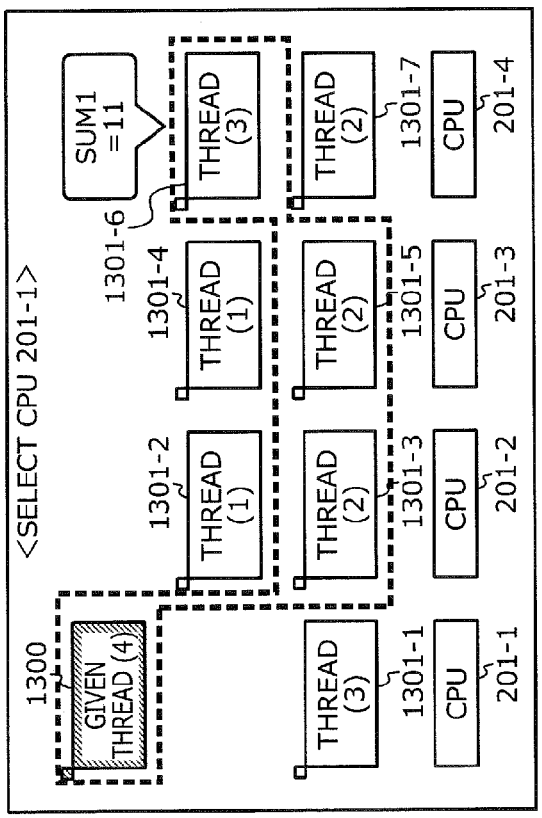

As depicted in FIG. 13B, the selecting unit 503 selects the CPU 201-2. In this case, SUM2 (the total number of banks used by the threads surrounded by a dotted line frame) is 12 and therefore, the determining unit 504 determines that SUM2 is not less than or equal to the number of banks m of the RAM 206.

As depicted in FIG. 13C, the selecting unit 503 selects the CPU 201-3. In this case, SUM3 (the total number of banks used by the threads surrounded by a dotted line frame) is 12 and therefore, the determining unit 504 determines that SUM3 is not less than or equal to the number of banks m of the RAM 206.

As depicted in FIG. 13D, the selecting unit 503 selects the CPU 201-4. In this case, SUM4 (the total number of banks used by the threads surrounded by a dotted line frame) is 11 and therefore, the determining unit 504 determines that SUM4 is not less than or equal to the number of banks m of the RAM 206.

In the case where the determining unit 504 determines that the sum SUM is not less than or equal to the number of banks m of the RAM 206 irrespective of the CPU 201 that the selecting unit 503 selects, the assigning unit 505 assigns the given thread to the CPU 201 whose sum SUM is the smallest. In FIG. 13, the sums SUM1 and SUM4 of the CPUs 201-1 and 201-4 are each 11, which is the smallest sum, and therefore, the assigning unit 505 assigns a given thread 1300 to the CPU 201-1 or 201-4. When plural CPUs 201 are present whose sums SUMs are each the smallest, for example, the assigning unit 505 may assign the given thread 1300 to the CPU 201 whose total value of the processing time periods of already assigned threads 1301 is the shortest.

FIG. 14 is a flowchart of a process executed by the master OS according to the fourth example. The master OS determines whether a startup instruction has been received for a thread (step S1401). If the master OS determines that no startup instruction has been received for a thread (step S1401: NO), the master OS returns to step S1401.

If the master OS determines that a startup instruction has been received for a thread (step S1401: YES), the identifying unit 501 identifies for each CPU 201, the number of banks used by the threads already assigned (step S1402). The master OS identifies, using the identifying unit 501, the number of banks c to be used by the thread (given thread) for which the master OS has received the startup instruction (step S1403). The detecting unit 502 detects the highest values B (1 to n) for each CPU 201 from the identified numbers of banks to be used (step S1404).

The master OS sets "i" to be i=1 using the selecting unit 503 (step S1405) and determines whether "i" is i≤the number of CPUs using the selecting unit 503 (step S1406). If the master OS determines that "i" is i≤the number of CPUs (step S1406: YES), the master OS selects the i-th CPU 201 (step S1407). The master OS selects the greater value (MAX(Bi, c)) of the highest value Bi of the i-th CPU 201 and the number of banks c to be used by the given thread (step S1408).

The master OS calculates SUMi=ΣB1, . . . , MAX(Bi, c), . . . , Bn (step S1409) and determines whether the sum SUMi is SUMi≤the number of banks m of the RAM 206 (step S1410). If the master OS determines that the sum SUMi is SUMi≤the number of banks m of the RAM 206 (step S1410: YES), the master OS detects the i-th CPU 201 as a candidate assignment destination (step S1411) and sets i to be i=i+1 (step S1412), and the master OS returns to step S1406. If the master OS determines that the sum SUMi is not SUMi≤the number of banks m of the RAM 206 (step S1410: NO), the master OS progresses to step S1412.

If the master OS determines at step S1406 that "i" is not i≤the number of CPUs (step S1406: NO), the master OS determines whether a candidate assignment destination has been detected whose sum SUM is less than or equal to the number of banks (step S1413).

If the master OS determines that a candidate assignment destination has been detected whose sum SUM is less than or equal to the number of banks (step S1413: YES), the master OS assigns the given thread to the detected CPU 201 (step S1414), and returns to step S1401. If the master OS determines that no candidate assignment destination has been detected whose sum SUM is less than or equal to the number of banks (step S1413: NO), the master OS assigns the given thread to the CPU 201 whose SUM is the smallest (step S1415) and the master OS returns to step S1401. Although not depicted, the master OS outputs the assignment result to the assignment table 400.

According to the fourth example, when even a CPU 201 is selected as the candidate assignment destination and a bank shortage occurs, the occurrence of access contention can be minimized by assigning the thread to be executed, to the CPU 201 whose sum SUM is the smallest. The number of swapping sessions of data in the RAM 206 can be reduced and thread performance drops can be reduced by reducing the occurrence of access contention.

The fifth example will be described. When the total value of the number of banks used by the thread already assigned and the number of banks to be used by a thread to be executed is less than or equal to the number of banks m of the RAM 206, no bank shortage occurs with any combination of the threads for parallel processing. Therefore, in the fifth example, prior to the execution of the processes described in the first to the fourth examples, the thread is assigned regardless of the number of banks used by the threads. Therefore, when the above condition is satisfied, the processes described in the first to the fourth examples are not executed and therefore, an increase of the speed of the assignment process can be facilitated.

Figure 15:
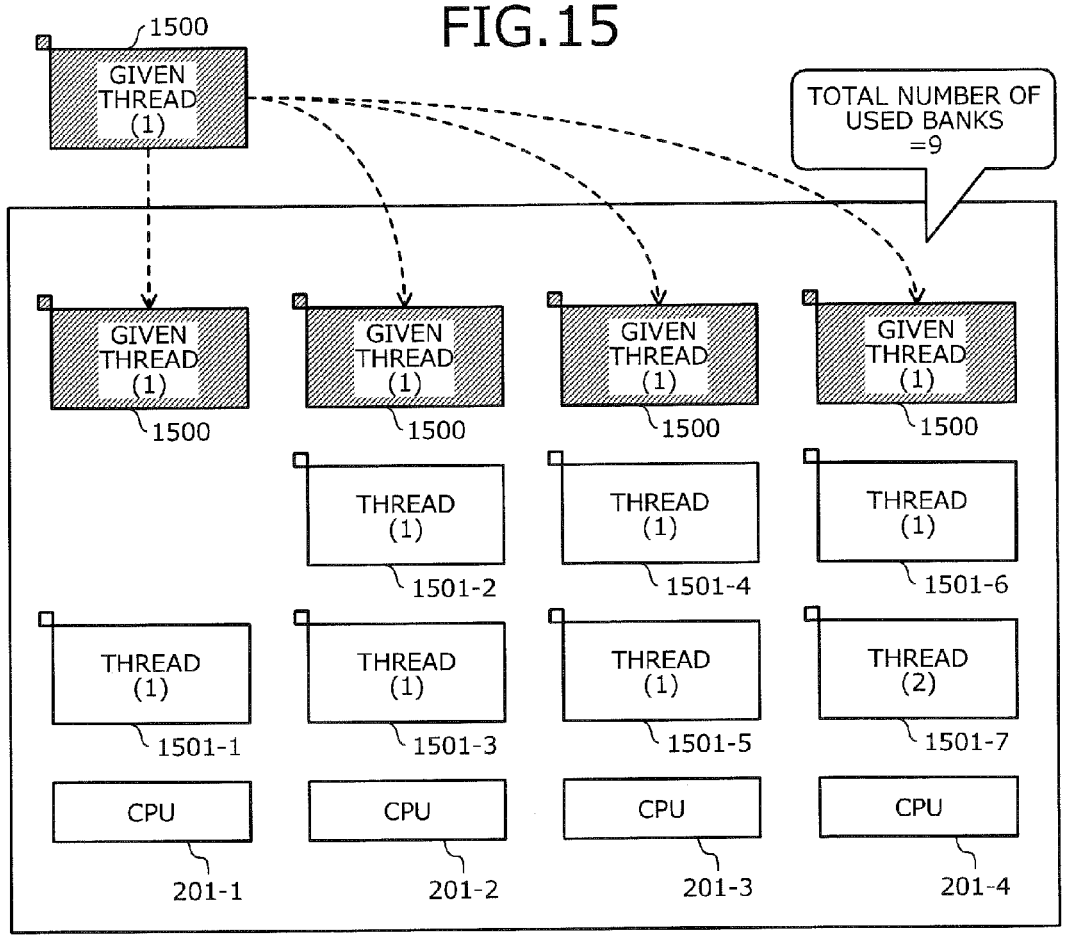
FIG. 15 is an explanatory diagram of an example of assignment according to the fifth example.

FIG. 15 is an explanatory diagram of an example of assignment according to the fifth example. In the fifth example, when the total of the number of banks to be used by a given thread 1500 and the number of banks used by threads 1501-1 to 1501-7 is less than or equal to the number of used banks of the RAM 206, no access contention occurs with an assignment of the given thread 1500 to any CPU 201. Therefore, the assigning unit 505 assigns the given thread 1500, to any CPU 201 prior to the processes to be executed by the selecting unit 503 and the determining unit 504. The number of banks of the RAM 206 used by each thread is written in the parentheses "( )" of each thread in FIG. 15.

For example, the assigning unit 505 calculates the total value of the number of banks to be used by the given thread 1500 identified by the identifying unit 501 and the number of banks used by the threads already assigned to the CPUs 201. For example, the assigning unit 505 determines if the calculated total value is less than or equal to the number of banks m of the RAM 206. In the example of FIG. 15, the total number of used banks is nine. If the assigning unit 505 determines that the calculated total value is less than or equal to the number of banks m of the RAM 206, the assigning unit 505 assigns the given thread 1500 to any CPU 201 without executing the processes of the detecting unit 502 and the determining unit 504.

Figure 16:
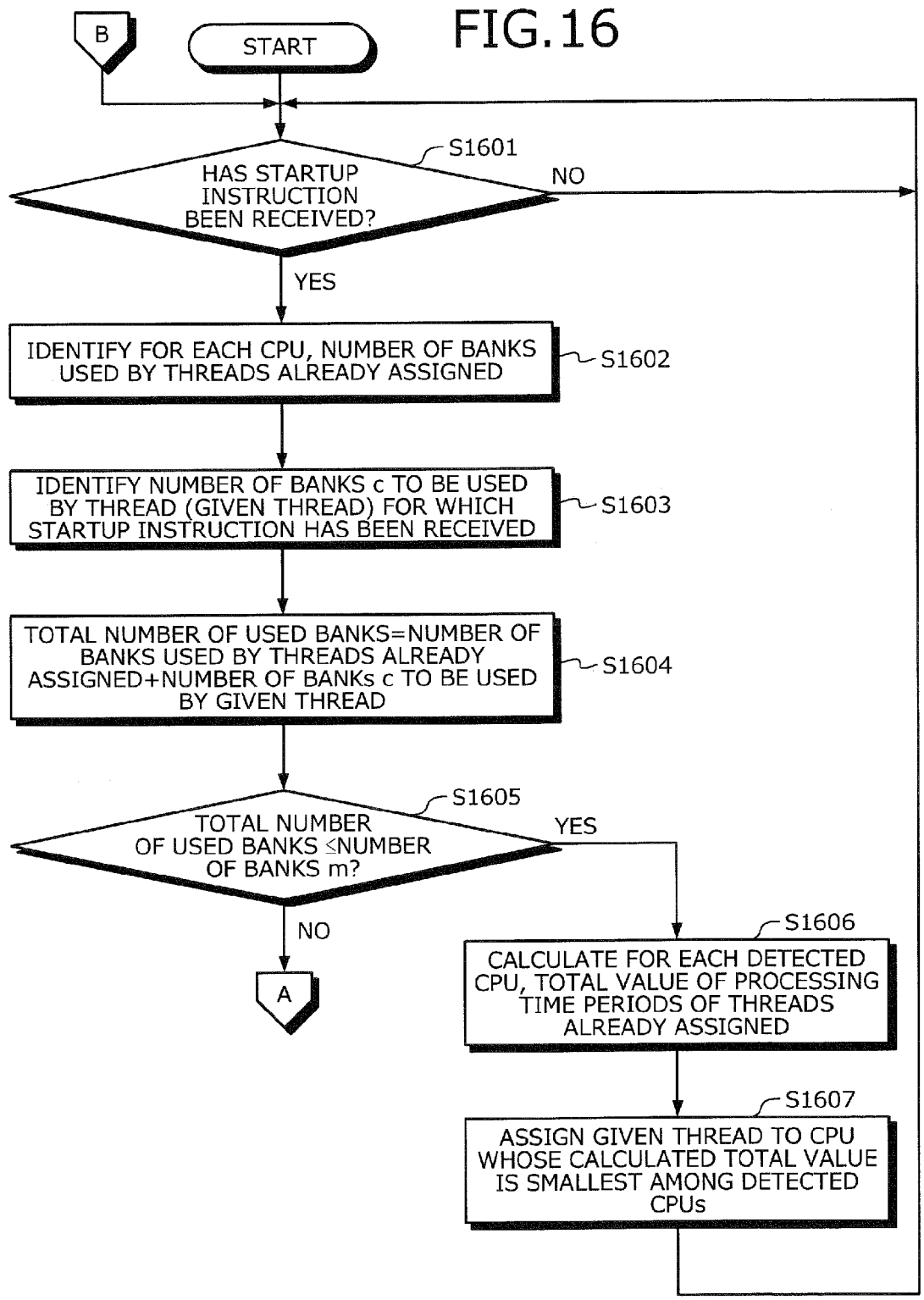
FIGS. 16 and 17 are flowcharts of a process executed by the master OS according to the fifth example.
Figure 17:
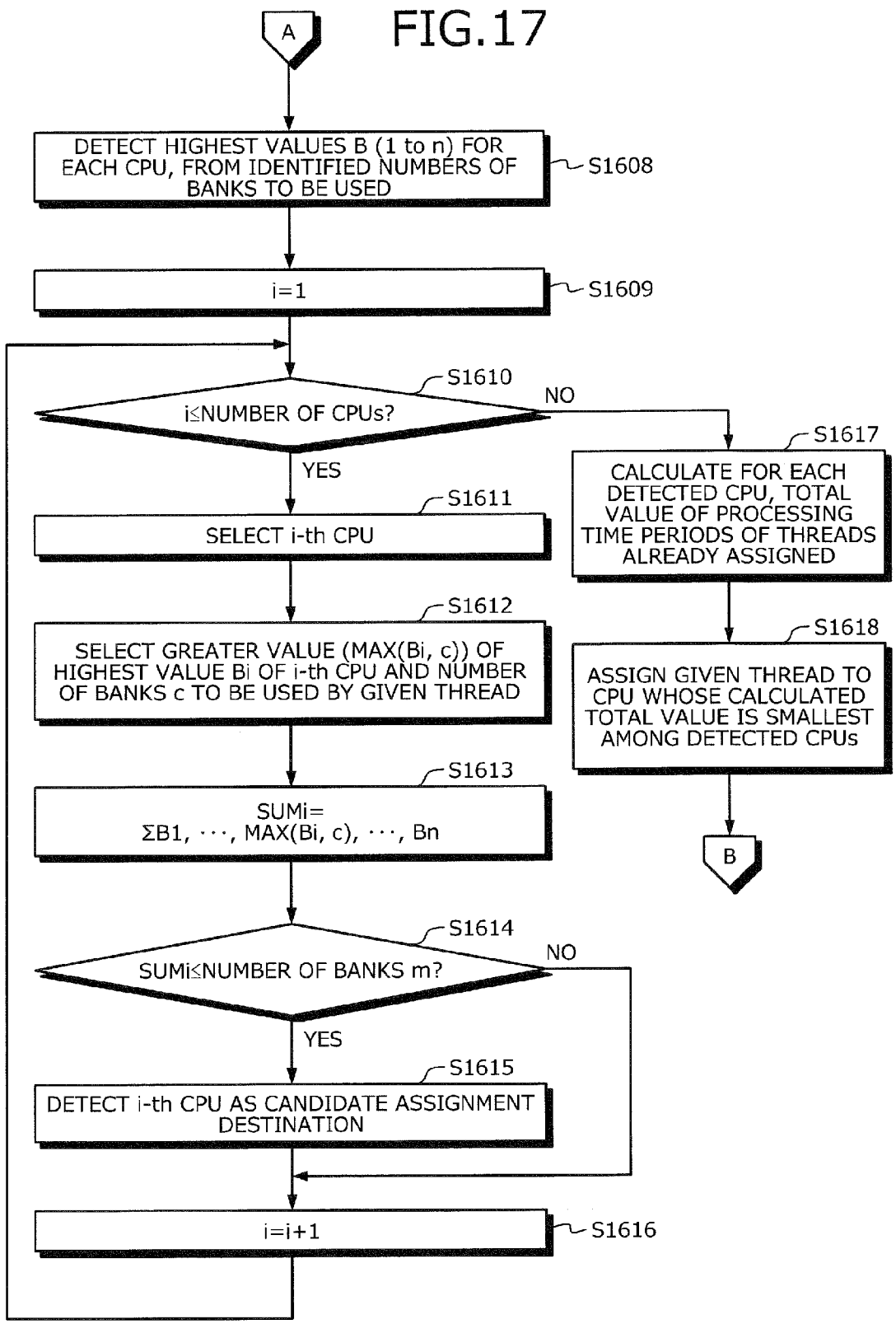

FIGS. 16 and 17 are flowcharts of a process executed by the master OS according to the fifth example. The master OS determines whether a startup instruction has been received for a thread (step S1601). If the master OS determines that no startup instruction has been received for a thread (step S1601: NO), the master OS returns to step S1601.

If the master OS determines that a startup instruction has been received for a thread (step S1601: YES), the identifying unit 501 identifies for each CPU 201, the number of banks used by the threads already assigned (step S1602). The master OS identifies, using the identifying unit 501, the number of banks c to be used by the thread (given thread) for which the master OS has received the startup instruction (step S1603). The master OS calculates "the total number of used banks=the number of banks used by the threads already assigned+the number of banks c to be used by the given thread" using the assigning unit 505 (step S1604) and determines whether "the calculated total number of banks≤the number of banks m of the RAM 206" (step S1605).

If the master OS determines that "the calculated total number of banks≤the number of banks m of the RAM 206" (step S1605: YES), the master OS calculates for each CPU 201, the total value of the processing time periods of the threads already assigned (step S1606) and assigns the given thread to the CPU 201 whose calculated total value is the shortest (step S1607), and the master OS returns to step S1601.

If the master OS determines that the calculated total number of banks is not "the calculated total number of banks≤the number of banks m of the RAM 206" (step S1605: NO), the detecting unit 502 detects the highest value B (1 to n) for each CPU 201 from the identified number of used banks (step S1608).

The master OS sets "i" to be i=1 using the selecting unit 503 (step S1609) and determines whether "i" is i≤the number of CPUs using the selecting unit 503 (step S1610). If the master OS determines that "i" is i≤the number of CPUs (step S1610: YES), the master OS selects the i-th CPU 201 (step S1611). The master OS selects the greater value (MAX(Bi, c)) of the highest value Bi of the i-th CPU 201 and the number of banks c to be used by the given thread (step S1612).

The master OS calculates SUMi=ΣB1, . . . , MAX(Bi, c), . . . , Bn (step S1613) and determines whether the sum SUMi is SUMi≤the number of banks m of the RAM 206 (step S1614). If the master OS determines that the sum SUMi is SUMi≤the number of banks m of the RAM 206 (step S1614: YES), the master OS detects the i-th CPU 201 as a candidate assignment destination (step S1615) and sets i to be i=i+1 (step S1612), and the master OS returns to step S1610.

If the master OS determines that the sum SUMi is not SUMi≤the number of banks m of the RAM 206 (step S1614: NO), the master OS progresses to step S1616.

If the master OS determines at step S1610 that "i" is not i≤the number of CPUs (step 511610: NO), the master OS calculates for each detected CPU 201, the total value of the processing time periods of the threads already assigned (step S1617). The master OS assigns the given thread to the CPU 201 whose calculated total value is the smallest among the detected CPUs 201 (step S1618) and the master OS progresses to step S1601. Although not depicted, the master OS outputs the assignment result to the assignment table 400.

According to the fifth example, when parallel processing is executed with any combination of threads, no bank shortage occurs and therefore, an increase of the speed of the assignment process can be facilitated.

The sixth example will be described. The frequency of access of the shared resource to be an access destination may differ depending on the threads currently executed. When the assignment process is evenly executed for the threads each having a nature different from that of one another, assignment not matching with the nature of the thread may be executed and therefore, access contention due to a bank shortage may occur. Therefore, in the sixth example, the threads are classified in advance by type and the assignment is executed for each classified thread group and thereby, performance drops occurring consequent to the occurrence of access contention can be reduced corresponding to the natures of the threads.

In the sixth example, the threads are classified into "A" to "C". The threads classified as C are, for example, the threads classified into a first condition concerning the access of the RAM 206 depicted in FIG. 2. The "first condition" is, for example, a condition as to whether the frequency of access of the RAM 206 is high. The threads classified as B are, for example, the threads that do not satisfy the first condition and that are classified in a second condition concerning the access of the secondary cache 202 depicted in FIG. 2. The "second condition" is, for example, a condition as to whether the frequency of access of the secondary cache 202 is high. The threads classified as A are, for example, threads that each frequently access the primary cache 261 and that do not satisfy the first and the second conditions.

The threads classified as C each have a high frequency of access of the RAM 206 and therefore, each also have high frequencies of access of the secondary cache 202 and a primary cache 261-1. The threads classified as B each have a low frequency of access of the RAM 206 while each have a high frequency of access of the secondary cache 202 and therefore, each also has a high frequency of access of the primary cache 2611.

The classification of the threads into A to C will be described. It is assumed that items of the multi-core processor system 200 are known in advance such as the capacity of the secondary cache 202, the capacity of the RAM 206, the number of banks I of the secondary cache 202, the number of banks m of the RAM 206, and the size of each of the banks. The memory access area of each thread is measured by the simulation tool using a model of the multi-core processor system 200 and thereby, the bank amount used by each thread is calculated. The bank amount used by each thread may be a value calculated during the execution thereof. Thus, a design engineer of each thread classifies the thread into A to C, based on the calculated bank amount used thereby. For example, the first condition may be that the frequency of access of the RAM 206 is several hundred or higher and the number of banks of the RAM 206 to be used is two or more. For example, the second condition may be that the first condition is not satisfied; the frequency of access of the secondary cache 202 is several hundred or higher; the number of banks of the secondary cache 202 to be used is two or more; etc. The processing time period necessary for executing the thread may be measured simultaneously with the bank amount used by the thread.

FIG. 18 is an explanatory diagram of an example of a thread table according to the sixth example. The thread table 1800 has fields for the thread ID, the class, the processing time period, the number of used banks 1, and the number of used banks 2. Thread information is stored as a record (for example, 1801-1) by setting a value in each field.

The identification information of a thread is registered in the thread ID field. To which one of A to C the thread is classified is registered in the class field. The processing time period of the thread is registered in the processing time period field. The number of banks to be used by the thread, among the plural banks of the RAM 206 is registered in the number of used banks 1 field. The number of banks to be used by the thread, among the plural banks of the secondary cache 202 is registered in the number of used banks 2 field. The thread table 1800 is stored, for example, in the flash ROM 208.

FIG. 19 is an explanatory diagram of an example of the case where a thread to be executed is classified as A. The class determining unit 506 identifies the class of a given thread 1900. For example, the class determining unit 506 identifies from the thread table 1800, information registered in the class field of the thread information concerning the given thread 1900, based on the identification information of the given thread 1900. FIG. 19 depicts a state where the given thread 1900 is classified as A.

When the class determining unit 506 determines that the class of the given thread 1900 is A, the assigning unit 505 identifies the CPU 201 to which no thread has been assigned, from the multi-core processor without executing the processes of the identifying unit 501, the detecting unit 502, and the determining unit 504. The assigning unit 505 assigns the given thread 1900 to the identified CPU 201.

For example, when the class of the given thread 1900 is A, the assigning unit 505 refers to the assignment table 400 based on the identification information of each CPU 201 and thereby, identifies the CPU 201 to which no thread is assigned. For example, the assigning unit 505 assigns the given thread 1900 to the identified CPU 201. In the example of FIG. 19, the assigning unit 505 identifies the CPU 201-4 as a CPU 201 to which no thread has been assigned, and assigns the given thread 1900 to the CPU 201-4.

In the example of FIG. 19, the access frequency of the given thread 1900 is low. Therefore, even when the assigning unit 505 assigns the given thread 1900 to the CPU 201-4 to which no thread has been assigned, the influence is weak on access of the RAM 206 and the secondary cache 202 by assigned threads 1901. The given thread 1900 is assigned to the CPU 201-4 to which no thread is assigned and therefore, the CPU 201-4 needs no switching process to switch to any other thread. Therefore, the primary cache 261 of the CPU 201-4 can be caused to have a large amount of data stored therein concerning the given thread 1900 and therefore, the cache hit ratio of the given thread 1900 can be improved.

FIG. 20 is an explanatory diagram of an example of a case where a thread to be executed is classified as C. The class determining unit 506 identifies the class of a given thread 2000 to be executed. For example, the class determining unit 506 identifies from the thread table 1800, information registered in the class field of the thread information concerning the given thread 2000 based on the identification information of the given thread 2000.

When the class determining unit 506 determines that the given thread 2000 is classified in C, the identifying unit 501 identifies the number of banks of the RAM 206 to be used by the given thread 2000, and also identifies the number of banks of the RAM 206 used by threads 2001 already assigned. The number of banks of the RAM 206 used by each thread is written in the parentheses "( )" of each thread in FIG. 20.

The processes of the detecting unit 502, the selecting unit 503, the determining unit 504, and the assigning unit 505 are the same as those described in the first to the fifth examples and therefore, will be described in this example taking a simple example. In FIG. 20, for example, the selecting unit 503 selects the CPU 201-1 as the candidate assignment destination. The sum SUM1 (the total number of banks of the RAM 206 used by the threads surrounded by a dotted line frame) is 10 and the determining unit 504 determines that SUM1 is less than or equal to the number of banks of the RAM 206. The assigning unit 505 assigns the given thread 2000 to the CPU 201-1.

Figure 21:
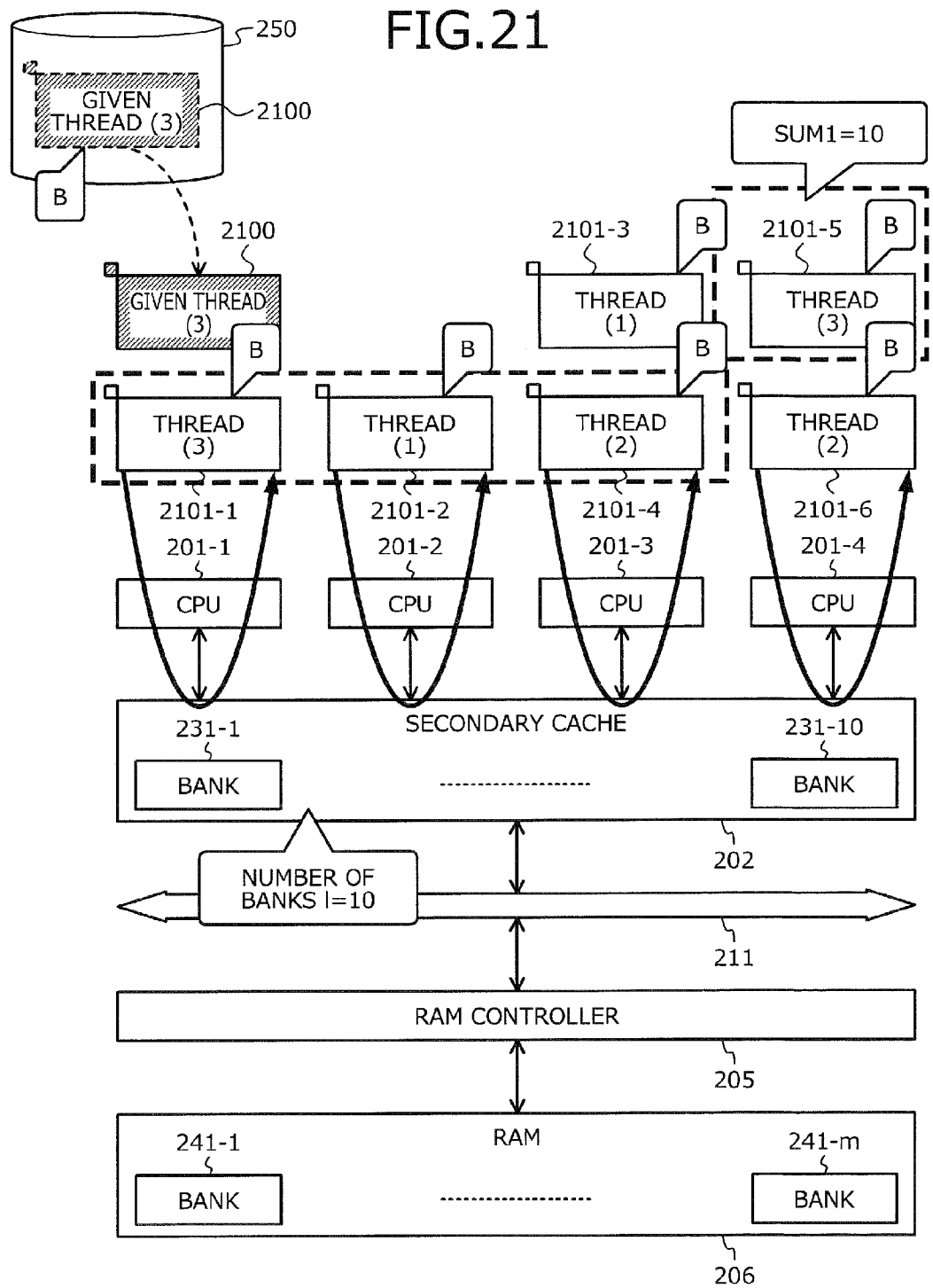
FIG. 21 is an explanatory diagram of an example 1 of a case where the thread to be executed is classified as B.

FIG. 21 is an explanatory diagram of an example 1 of a case where the thread to be executed is classified as B. In the example 1 of FIG. 21, a case will be described where the class of a given thread 2100 to be executed is B and the class of all the threads 2101 already assigned is B. The class determining unit 506 identifies the class of the given thread 2100. For example, the class determining unit 506 identifies from the thread table 1800, the information registered in the class field of the thread information concerning the given thread 2100, based on the identification information concerning the given thread 2100. When the class determining unit 506 determines that the class of the given thread 2100 is B, the class determining unit 506 identifies the class of the threads 2101 already assigned. For example, the class determining unit 506 identifies information set in the class field of the thread information concerning the threads 2101 already assigned based on the identification information concerning the threads 2101 already assigned, from the thread table 1800.

When the class determining unit 506 determines that the class of the given thread 2100 is B and no thread classified in C is included in the threads 2101 already assigned, the identifying unit 501 identifies the number of banks of the secondary cache 202 to be used by the given thread 2100, and identifies the number of banks of the secondary cache 202 used by the threads 2101 already assigned. The number of used banks of the secondary cache 202 is written in the parentheses "( )" of each thread in FIG. 21.

The processes of the detecting unit 502, the selecting unit 503, the determining unit 504, and the assigning unit 505 are the same as those described in the first to the fifth examples and therefore, will be described taking a simple example. In FIG. 21, the selecting unit 503 selects, for example, the CPU 201-1 as the candidate assignment destination. The sum SUM1 (the total number of banks of the secondary cache 202 used by the threads surrounded by a dotted line frame) is 10, and the determining unit 504 determines that, for example, SUM1 is less than or equal to the number of banks I of the secondary cache 202. The assigning unit 505 assigns, for example, the given thread 2100 to the CPU 201-1.

Figure 22:
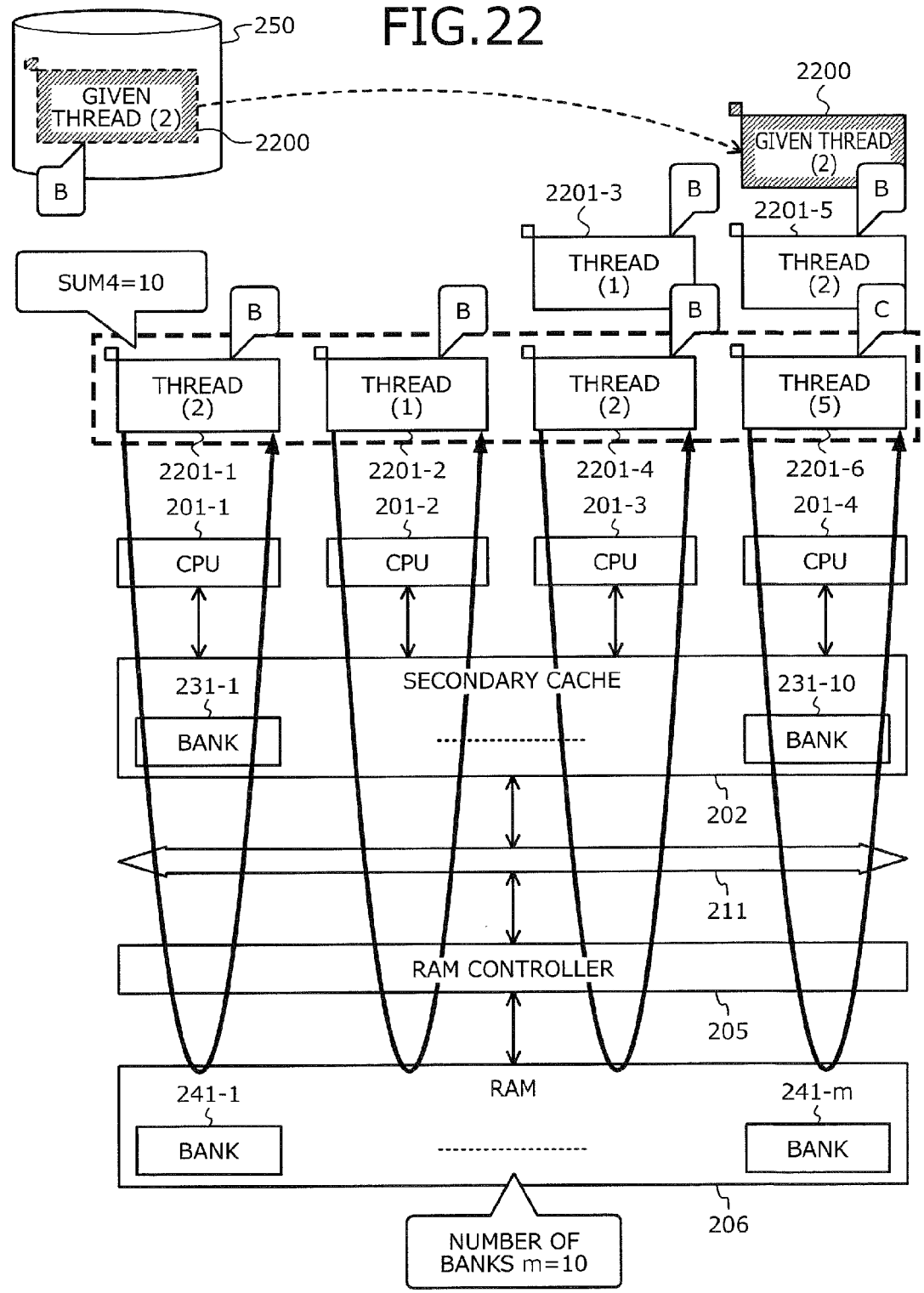
FIG. 22 is an explanatory diagram of an example 2 for a case where the thread to be executed is classified as B.

FIG. 22 is an explanatory diagram of an example 2 for a case where the thread to be executed is classified as B. In the example 2 of FIG. 22, a case will be described where, even when the class of the given thread 2100 is B, a thread classified as C is included among threads 2201 already assigned. When a thread classified in C and a thread classified in B are executed in parallel and a bank shortage occurs in the RAM 206, another bank shortage also occurs in the secondary cache 202 because the capacity of the RAM 206 is larger than that of the secondary cache 202. Therefore, in example 2 of FIG. 22, even when the class of a given thread 2200 to be executed is B, the given thread 2200 is assigned to avoid the bank shortage of the RAM 206.

For example, the class determining unit 506 identifies from the thread table 1800, the information registered in the class field of the thread information concerning the given thread 2200, based on the identification information concerning the given thread 2200. When the class determining unit 506 determines that the class of the given thread 2200 is B, the class determining unit 506 identifies the class of the threads 2201 already assigned. For example, the class determining unit 506 identifies from the thread table 1800, the information set in the class field of the thread information concerning the threads 2201 already assigned, based on the identification information concerning the threads 2201 already assigned.

For example, even in a case where the class of the given thread 2200 is B, when a thread classified in C is included among the threads 2201 already assigned, the identifying unit 501 identifies the number of banks of the RAM 206 to be used by the given thread 2200, from the thread table 1800.

The identifying unit 501 identifies the number of banks of the RAM 206 used by the threads 2201 already assigned, from the thread table 1800. The number of banks of the secondary cache 202 used by each thread is written in the parentheses "( )" of each thread in FIG. 22.

The processes of the detecting unit 502, the selecting unit 503, the determining unit 504, and the assigning unit 505 are the same as those described in the first to the fifth examples and therefore, will be described taking a simple example. In FIG. 22, the selecting unit 503 selects, for example, the CPU 201-4 as the candidate assignment destination. The sum SUM4 (the total number of banks of the RAM 206 used by the threads surrounded by a dotted line frame) is 10 and therefore, the determining unit 504 determines, for example, that the sum SUM4 is less than or equal to the number of banks m of the RAM 206. The assigning unit 505 assigns the given thread 2200 to, for example, the CPU 201-4.

Although not depicted, when the classes of the threads to be executed are B and C, the frequency of access of the shared resource of the thread classified as A among the threads already assigned is low and therefore, the thread may be excluded from the threads to be identified concerning the number of used banks of the shared resource by the identifying unit 501.

Figure 23:
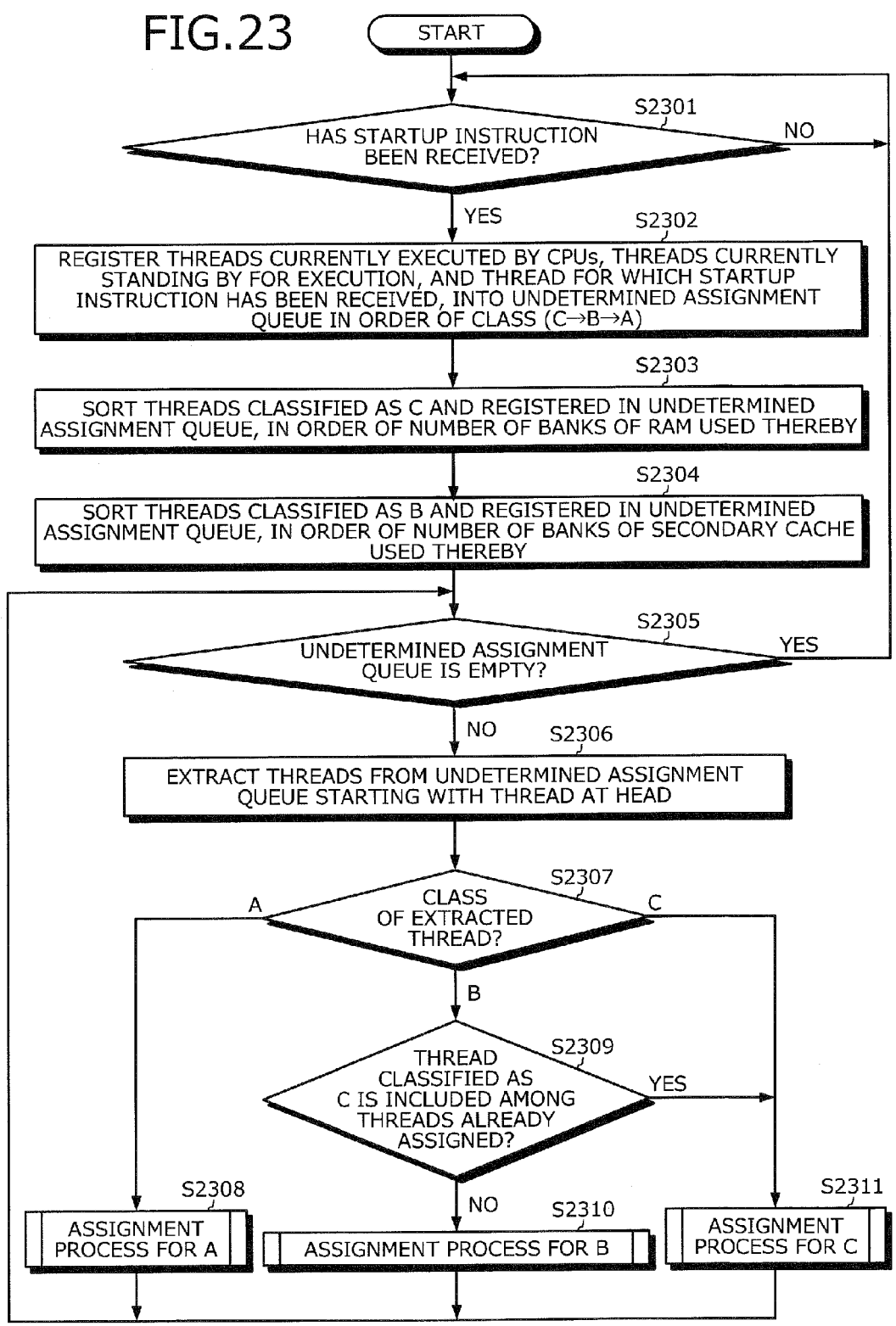
FIG. 23 is a flowchart of an example of a process executed by the master OS according to the sixth example.

FIG. 23 is a flowchart of an example of a process executed by the master OS according to the sixth example. The master OS determines whether a startup instruction for a thread has been received (step S2301). If the master OS determines that no startup instruction for a thread has been received (step S2301: NO), the master OS returns to step S2301.

If the master OS determines that a startup instruction for a thread has been received (step S2301: YES), the master OS registers the threads currently executed by the CPUs 201, the threads currently standing by for execution, and the thread for which the startup instruction has been received, into the undetermined assignment queue in order of class (step S2302). Thereby, the master OS can again assign even threads currently under execution and the threads currently standing by for execution.

The master OS identifies the number of banks of the RAM 206 to be used by the threads classified as C and registered in the undetermined assignment queue, and sorts the threads classified as C and registered in the undetermined assignment queue in order of the number of banks of the RAM 206 used thereby (step S2303). Thereby, the assignment destination CPU can be determined earlier for a thread whose number of banks of the RAM 206 to be used is greater.

The master OS identifies the number of banks of the secondary cache 202 used by the threads classified in B and registered in the undetermined assignment queue and sorts the threads classified as B and registered in the undetermined assignment queue in order of the number of banks of the secondary cache 202 used thereby (step S2304). Thus, the assignment destination CPU can be determined earlier for the thread whose number of banks of the secondary cache 202 to be used thereby is greater.

The master OS determines whether the undetermined assignment queue is empty (step S2305). If the master OS determines that the undetermined assignment queue is empty (step S2305: YES), the master OS returns to step S2301. If the master OS determines that the undetermined assignment queue is not empty (step S2305: NO), the master OS extracts the threads from the undetermined assignment queue starting with the thread at the head thereof (step S2306).

The master OS determines the class of the extracted thread (step S2307). If the master OS determines that the class of the extracted thread is A (step S2307: A), the master OS executes the assignment process for A (step S2308), and returns to step S2305.

If the master OS determines that the class of the extracted thread is B (step S2307: B), the master OS determines whether a thread classified as C is included among the threads already assigned (step S2309). If the master OS determines that no thread classified as C is included among the threads already assigned (step S2309: NO), the master OS executes the assignment process for B (step S2310), and returns to step S2305.

If the master OS determines at step S2307 that the class of the extracted thread is C (step S2307: C), the master OS progresses to step S2311. If the master OS determines at step S2309 that a thread classified as C is included among the threads already assigned (step S2309: YES), the master OS progresses to step S2311. After the case of "C" at step S2307 or the case of "YES" at step S2309, the master OS executes the assignment process for C (step S2311), and returns to step S2305.

Figure 24:
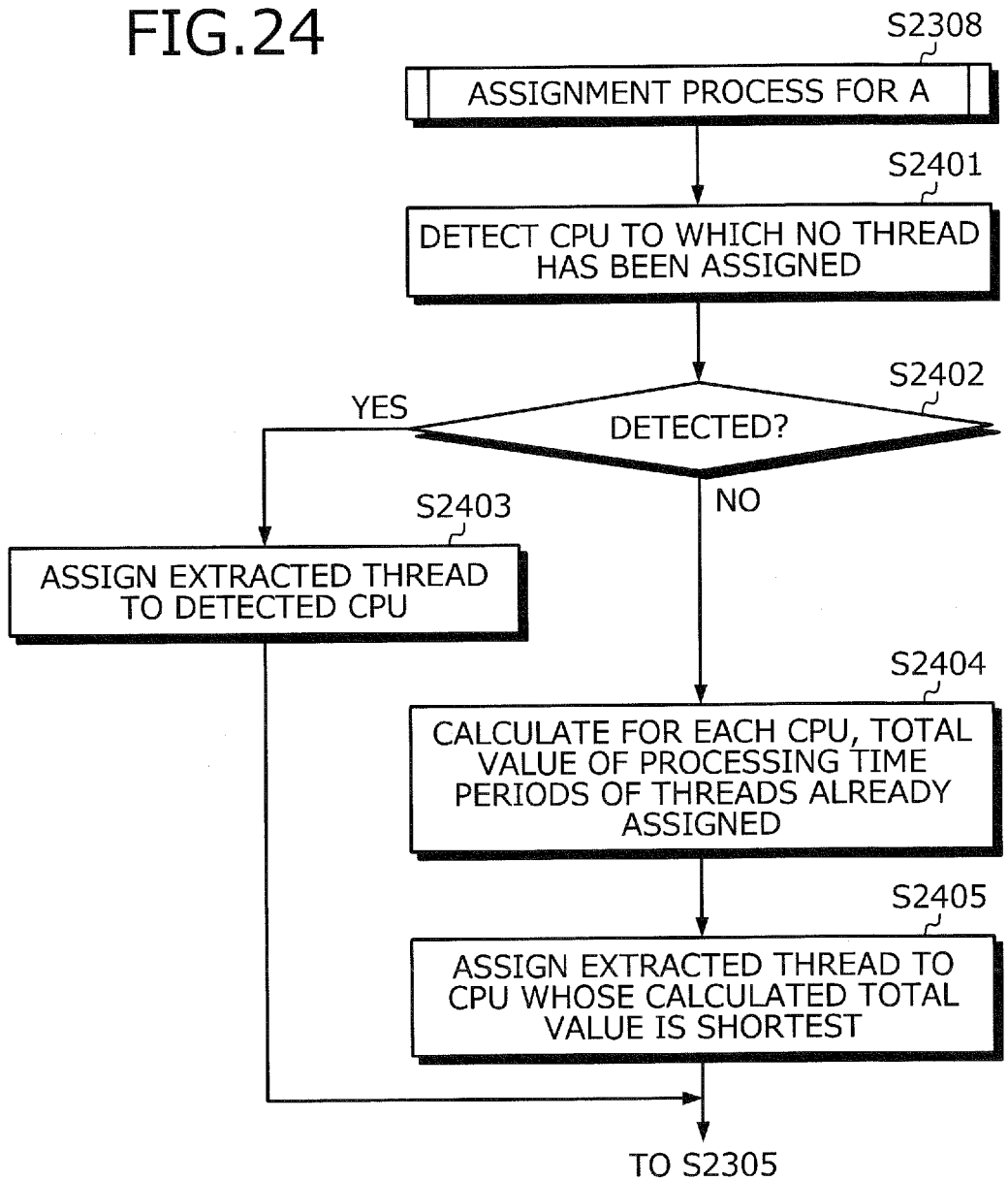
FIG. 24 is a flowchart of a detailed description of an assignment process for A (step S2308) depicted in FIG. 23.

FIG. 24 is a flowchart of a detailed description of the assignment process for A (step S2308) depicted in FIG. 23. The master OS detects a CPU 201 to which no thread has been assigned (step S2401) and determines whether a CPU 201 has been detected (step S2402).

If the master OS determines that a CPU 201 to which no thread is assigned has been detected (step S2402: YES), the master OS assigns the extracted thread to the detected CPU 201 (step S2403), and returns to step S2305.

If the master OS determines that no CPU 201 to which no thread is assigned has been detected (step S2402: NO), the master OS calculates for each CPU 201, the total value of the processing time periods of the threads already assigned (step S2404) and assigns the extracted thread to the CPU 201 whose calculated total value is the shortest (step S2405), and progresses to step S2305. Although not depicted, the master OS outputs the assignment result to the assignment table 400. When the extracted thread is currently under execution or standing by for execution, and the assignment destination changes, the master OS executes migration.

Figure 25:
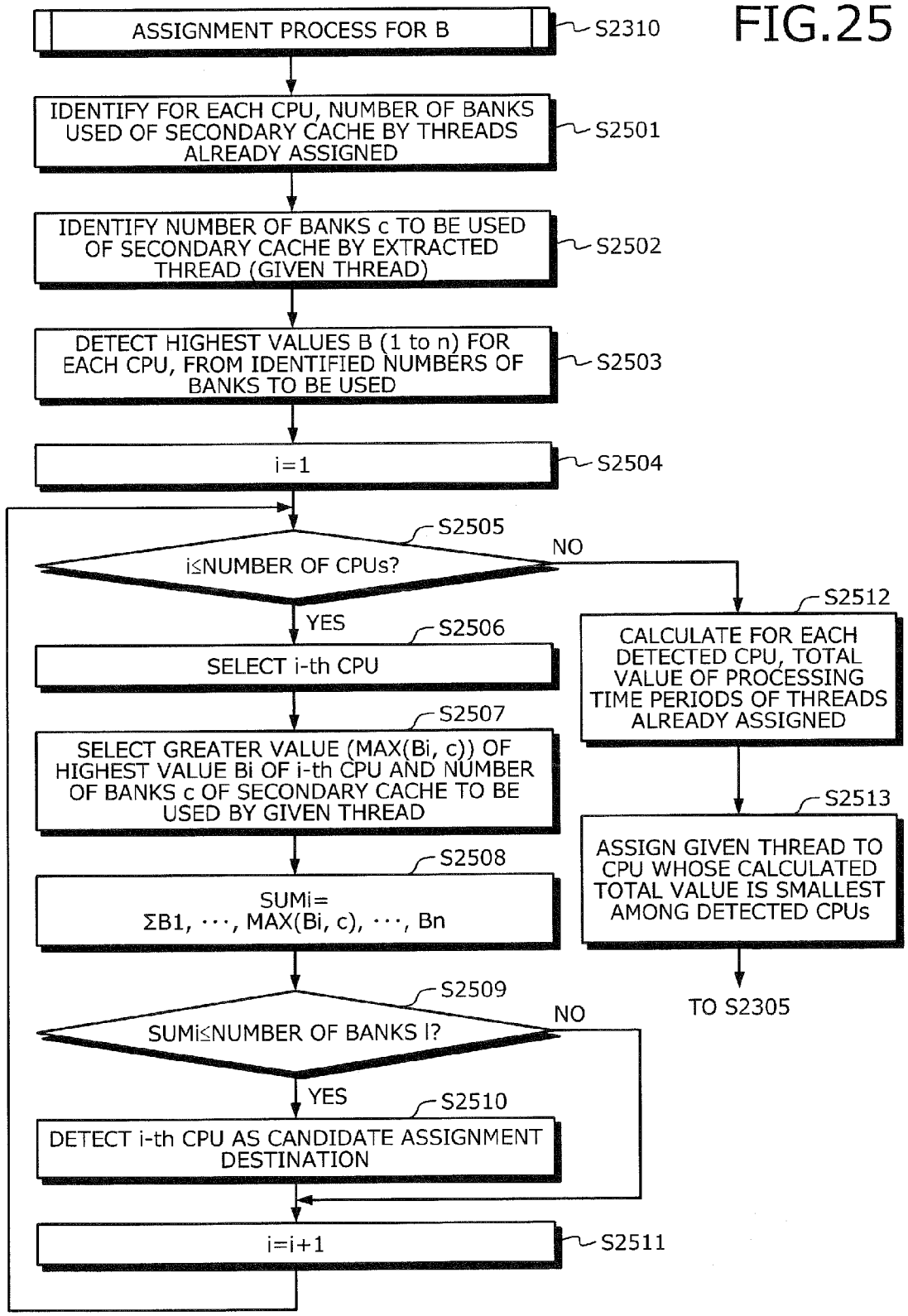
FIG. 25 is a flowchart of an assignment process for B (step S2310) depicted in FIG. 23.

FIG. 25 is a flowchart of the assignment process for B (step S2310) depicted in FIG. 23. The master OS, using the identifying unit 501, identifies for each CPU 201, the number of banks used of the secondary cache 202 by the threads already assigned (step S2501). The master OS, using the identifying unit 501, identifies the number of banks c to be used of the secondary cache 202 by the extracted thread (given thread) (step S2502). The detecting unit 502 detects the highest values B (1 to n) for each CPU 201, from the identified numbers of banks to be used (step S2503).

The master OS sets "i" to be i=1 using the selecting unit 503 (step S2504) and determines whether "i" is i≤the number of CPUs using the selecting unit 503 (step S2505). If the master OS determines that "i" is i≤the number of CPUs (step S2505: YES), the master OS selects the i-th CPU 201 (step S2506). The master OS selects the greater value (MAX(Bi, c)) of the highest value Bi of the i-th CPU 201 and the number of banks c of the secondary cache 202 to be used by the given thread (step S2507).

The master OS calculates SUMi=ΣB1, . . . , MAX(Bi, c), . . . , Bn (step S2508) and determines whether the sum SUMi is SUMi≤the number of banks I of the secondary cache 202 (step S2509). If the master OS determines that the sum SUMi is SUMi≤the number of banks I of the secondary cache 202 (step S2509: YES), the master OS detects the i-th CPU 201 as a candidate assignment destination (step S2510) and sets i to be i=i+1 (step S2511), and the master OS returns to step S2505. If the master OS determines that the sum SUMi is not SUMi≤the number of banks I of the secondary cache 202 (step S2509: NO), the master OS progresses to step S2511.

If the master OS determines at step S2505 that "i" is not i≤the number of CPUs (step S2505: NO), the master OS calculates for each detected CPU 201, the total value of the processing time periods of the threads already assigned (step S2512). The master OS assigns the given thread to the CPU 201 whose calculated total value is the smallest among the detected CPUs 201 (step S2513) and the master OS progresses to step S2305. Although not depicted, the master OS outputs the assignment result to the assignment table 400. Further, if the given thread is under execution or standing by for execution, or the assignment destination has changed, the master OS performs migration.

Figure 26:
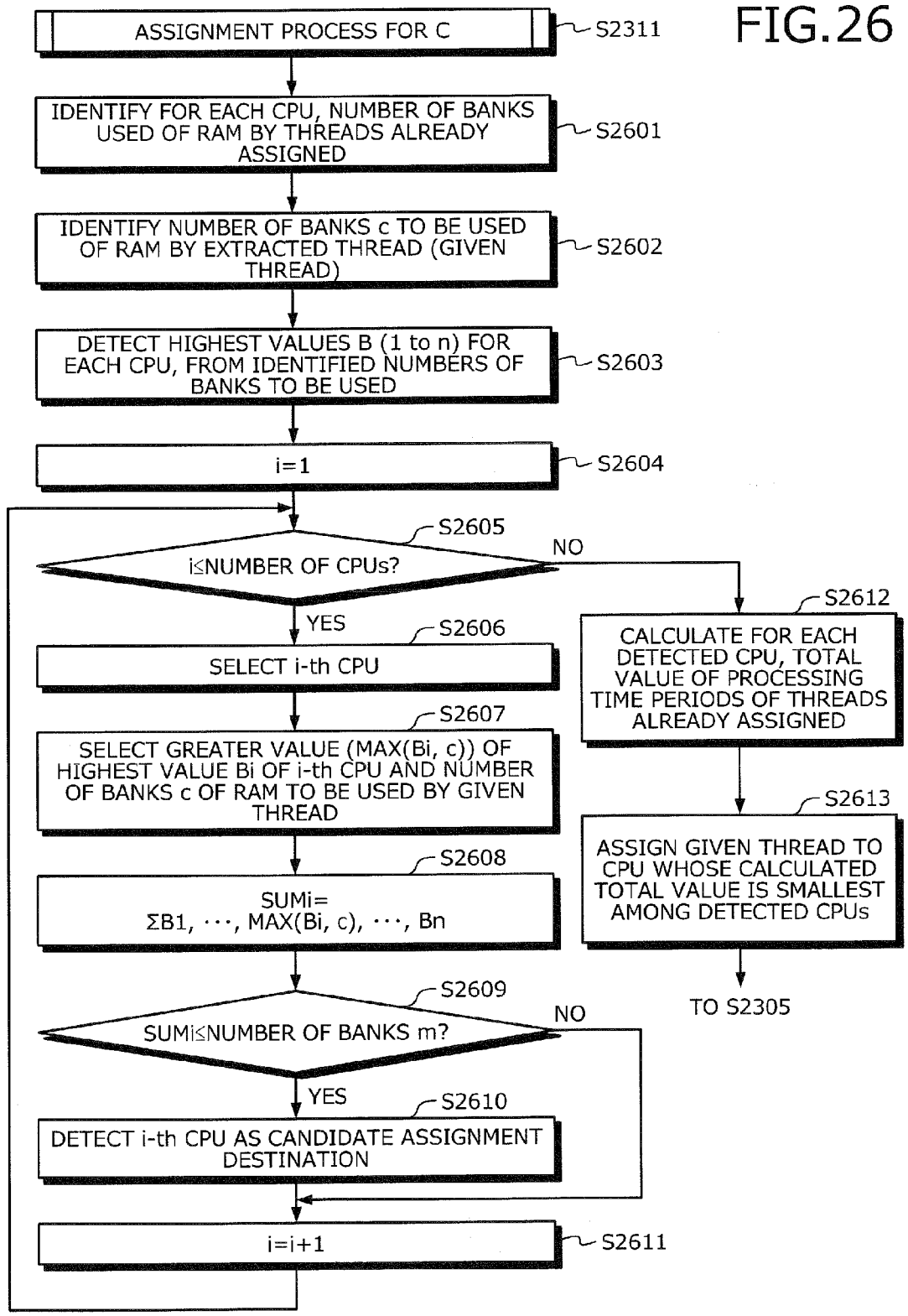
FIG. 26 is a flowchart of an assignment process for C (step S2311) depicted in FIG. 23.

FIG. 26 is a flowchart of the assignment process for C (step S2311) depicted in FIG. 23. The master OS, using the identifying unit 501, identifies for each CPU 201, the number of banks used of the RAM 206 by the threads already assigned (step S2601). The master OS, using the identifying unit 501, identifies the number of banks c to be used of the RAM 206 by the extracted thread (given thread) (step S2602). The detecting unit 502 detects the highest values B (1 to n) for each CPU 201, from the identified numbers of banks to be used (step S2603).

The master OS sets "i" to be i=1 using the selecting unit 503 (step S2604) and determines whether "i" is i≤the number of CPUs using the selecting unit 503 (step S2605). If the master OS determines that "i" is i≤the number of CPUs (step S2605: YES), the master OS selects the i-th CPU 201 (step S2606). The master OS selects the greater value (MAX(Bi, c)) of the highest value Bi of the i-th CPU 201 and the number of banks c of the RAM 206 to be used by the given thread (step S2607).

The master OS calculates SUMi=ΣB1, . . . , MAX(Bi, c), . . . , Bn (step S2608) and determines whether the sum SUMi is SUMi≤number of banks m of the RAM 206 (step S2609). If the master OS determines that the sum SUMi is SUMi≤number of banks m of the RAM 206 (step S2609: YES), the master OS detects the i-th CPU 201 as a candidate assignment destination (step S2610) and sets i to be i=i+1 (step S2611), and the master OS returns to step S2605. If the master OS determines that the sum SUMi is not SUMi≤number of banks m of the RAM 206 (step S2609: NO), the master OS progresses to step S2611.

If the master OS determines at step S2605 that "i" is not i≤the number of CPUs (step S2605: NO), the master OS calculates for each detected CPU 201, the total value of the processing time periods of the threads already assigned (step S2612). The master OS assigns the given thread to the CPU 201 whose calculated total value is the smallest among the detected CPUs 201 (step S2613) and the master OS progresses to step S2305. Although not depicted, the master OS outputs the assignment result to the assignment table 400. Further, if the given thread is under execution or standing by for execution, or the assignment destination has changed, the master OS performs migration.

According to the sixth example, the threads are classified in advance by type and the assignment is executed for each classified thread group and thereby, performance drops consequent to the occurrence of access contention can be reduced according to the nature of the thread.

The seventh example will be described. When the threads are assigned placing importance on access contention, the processing time periods of the threads may be longer than those in a case where the threads are assigned ignoring access contention, depending on the assignment state of the threads. Therefore, in the seventh example, it is determined which scheduling is optimal among a first scheduling of assigning the threads to prevent the occurrence of access contention and a second scheduling that is different from the first scheduling. Thus, when the first scheduling is selected, drops in thread performance consequent to access contention can be reduced. When the second scheduling is selected, drops in the performance of the thread to be executed, consequent to the threads assigned to the same CPU 201 can be reduced.

In the seventh example, scheduling based on load balance is taken as an example of the second scheduling. It is assumed that "n", "I", and "m" are n=2, I=2, and m=3.

FIG. 27 is an explanatory diagram of an example of a thread table according to the seventh example. The thread table 2700 has fields for the thread ID, the class, the processing time period, the rate of the access time period, the number of used banks 1, and the number of used banks 2. Thread information is stored as a record (for example, 2701-1) by setting a value in each field.

The identification information of a thread is registered in the thread ID field. To which of A to C the thread is classified is registered in the class field. The processing time period of the thread is registered in the processing time period field. The proportion of the time period necessary for accessing the RAM 206 with respect to the processing time period of the thread is registered in the rate of the access time period field. It is assumed that the rate of the access time period is measured in advance by the simulation tool during the design of each thread. The rate of the access time period of each thread may be measured during the execution of the thread. In the seventh example, the RAM 206 and the secondary cache 202 use the rates that are common thereto as the rates of the accessing time period. However, the rates of the time periods necessary for accessing the secondary cache 202 may be measured in advance to more accurately estimate the overhead.

The number of banks to be used by the thread, among the banks of the RAM 206 is registered in the number of used banks 1 field. The number of banks to be used by the thread, among the banks of the secondary cache 202 is registered in the number of used banks 2 field. The thread table 2700 is stored in, for example, the flash ROM 208.

FIG. 28 is an explanatory diagram of an example of an assignment table according to the seventh example. The assignment table 2800 has fields for the CPU ID, the thread ID, and the elapsed time period for processing. Thread information is stored as a record (for example, 2801-1) by setting a value in each field.

The identification information concerning a CPU 201 is registered in the CPU ID field. The identification information concerning the threads assigned to the CPU 201 is registered in the thread ID field. The time period elapsing for the thread currently under execution is registered in the elapsed time period for processing field. The assignment table 2800 is stored in the flash ROM 208.

FIG. 29 is an explanatory diagram of an example of overhead information concerning access contention. Overhead information 2900 concerning access contention has fields for the contention occurrence layer and the overhead rate. Rate information is stored as records (for example, 2901-1 and 2901-2) by setting a value in each field.

The secondary cache 202 and the RAM 206 are registered in the contention occurrence layer field. An increased rate RL2 of the processing time period used when access contention occurs for the secondary cache 202 and an increased rate RM of the processing time period used when access contention occurs for the RAM 206 are registered in the overhead rate field.

It is assumed that the increase rates RM and RL2 are measured in advance by the simulation tool during the design of each thread. For example, the design engineer executes simulations in patterns 1 to 3. For example, in pattern 1, no access contention is caused to occur for the secondary cache 202 and the RAM 206 during the execution of the threads. For example, in pattern 2, access contention is caused to always occur for the secondary cache 202 during the execution of the threads. For example, in pattern 3, access contention is caused to always occur for the RAM 206 during the execution of the threads. For example, the design engineer compares the simulation results for patterns 1 and 2 and thereby, determines the increased rate RL2. For example, the design engineer compares the simulation results for patterns 1 and 3 and thereby, determines the increased rate RM.

Figure 30:
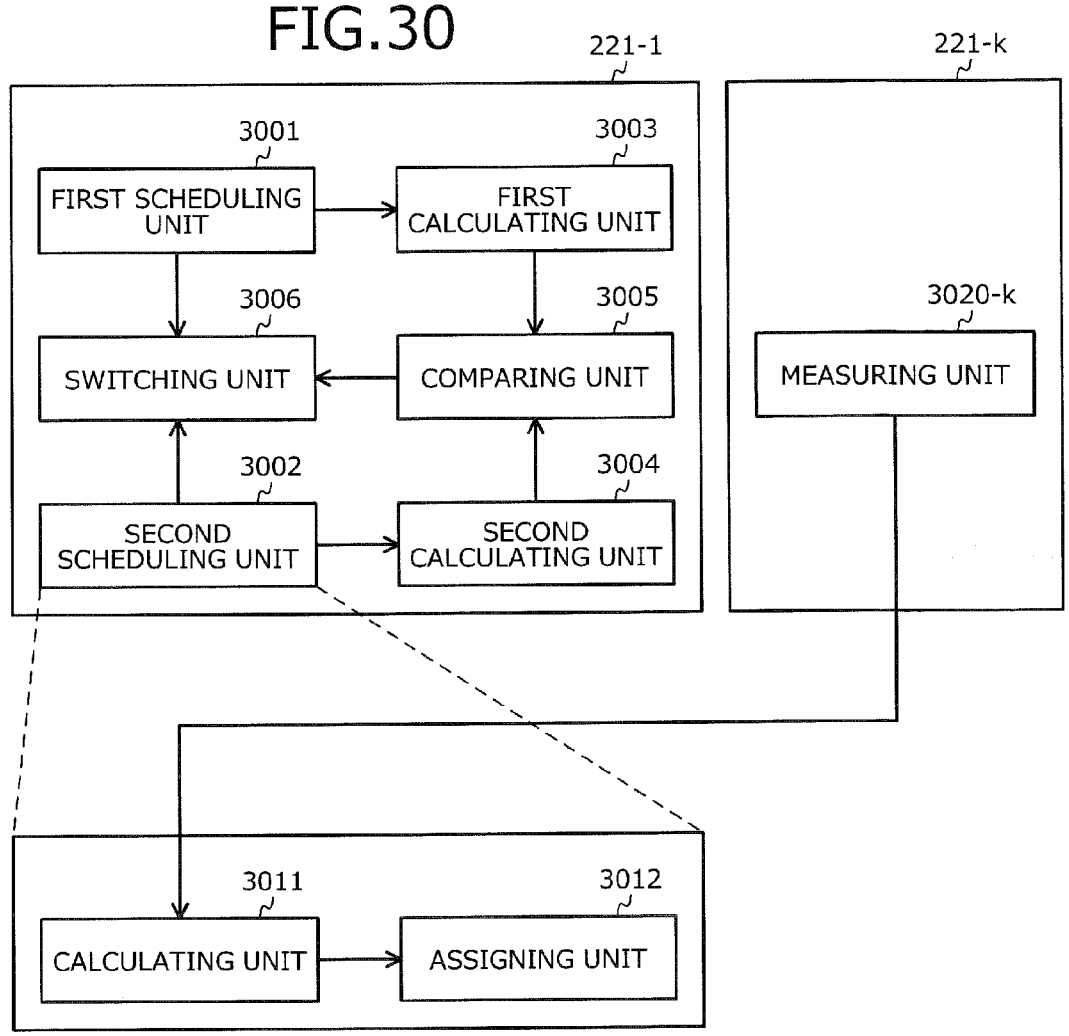
FIG. 30 is a block diagram of an example of functions of an OS 221 according to the seventh example.

FIG. 30 is a block diagram of an example of functions of the OS 221 according to the seventh example. FIG. 30 depicts the an example of functions of the OS 221-1 according to the seventh example and an example of functions of the OS 221-k (k=1 to n). The OS 221-1 includes a first scheduling unit 3001, a second scheduling unit 3002, a switching unit 3006, a first calculating unit 3003, a second calculating unit 3004, and a comparing unit 3005. The OS 221-k (k=1 to n) includes a measuring unit 3020-k.

Processes of the units from the first scheduling unit 3001 to the comparing unit 3005 are coded in the OS 221-1, which is the master OS. The CPU 201-1 reads the OS 221-1 stored in the flash ROM 208 and executes the processes coded in the OS 221-1. Thereby, functions of the units from the first scheduling unit 3001 to the comparing unit 3005 are implemented. The process of the measuring unit 3020-k is implemented in the OS 221-k and the CPU 201-k reads the OS 221-k stored in the flash ROM 208 and executes the process implemented in the OS 221-k. Thereby, a function of the measuring unit 3020-k is implemented. The units from the first scheduling unit 3001 to the comparing unit 3005 will be described in detail with reference to FIGS. 31 to 33.

FIG. 31 is an explanatory diagram of an example of assignment based on the first scheduling and the second scheduling. In FIG. 31, threads 3101 and 3102 are respectively assigned to the CPUs 201-1 and 201-2. Threads 3103 and 3104 are loaded on the wait queue 250 and thereby, the OS 221-1 receives startup instructions for the threads 3101 and 3104. The classes of the threads 3101, 3102, 3103, and 3104 respectively are B, C, C, and C.

It is assumed that the first scheduling unit 3001 includes the units from the identifying unit 501 to the class determining unit 506 depicted in FIG. 5. The first scheduling unit 3001 is performs the same processes described in the first to the sixth examples and will not again be described in detail. In the first scheduling executed by the first scheduling unit 3001, the threads 3101 and the 3104 are assigned to the CPU 201-1 and the threads 3103 and the 3102 are assigned to the CPU 201-2.

The second scheduling unit 3002 executes the second scheduling that is different from the scheduling executed by the first scheduling unit 3001. Scheduling based on the load balance will be described as an example of the second scheduling. For example, the second scheduling unit 3002 registers into the undetermined assignment queue, all of the threads for which a startup instruction has been received, the threads currently executed by the CPUs 201, and the threads standing by for execution, and in ascending order of processing time period or ascending order of remaining processing time period, selects the threads registered in the undetermined assignment queue as the thread to be executed. The "remaining processing time period" is a differential value of the elapsed time period for processing registered in the assignment table 2800 and the processing time period registered in the thread table 2700.

For example, the second scheduling unit 3002 includes a calculating unit 3011 and an assigning unit 3012. The calculating unit 3011 of the second scheduling unit 3002 calculates for each CPU 201, the total value of the processing time periods or the remaining processing time periods of the threads already assigned by the second scheduling unit 3002. The assigning unit 3012 of the second scheduling unit 3002 assigns the thread to be executed to the CPU 201 whose total value calculated by the calculating unit 3011 is the shortest. In the second scheduling executed by the second scheduling unit 3002, the threads 3101 and 3102 are assigned to the CPU 201-1 and the threads 3104 and 3103 are assigned to the CPU 201-2.

For example, the measuring unit 3020-$k$ ($k$=1 to n) measures the elapsed time period for processing of a thread, from the starting time of the execution of the thread, each time dispatch of a thread occurs. The measurement result is set in the elapsed time period for processing field in the assignment table 2800.

Figure 32:
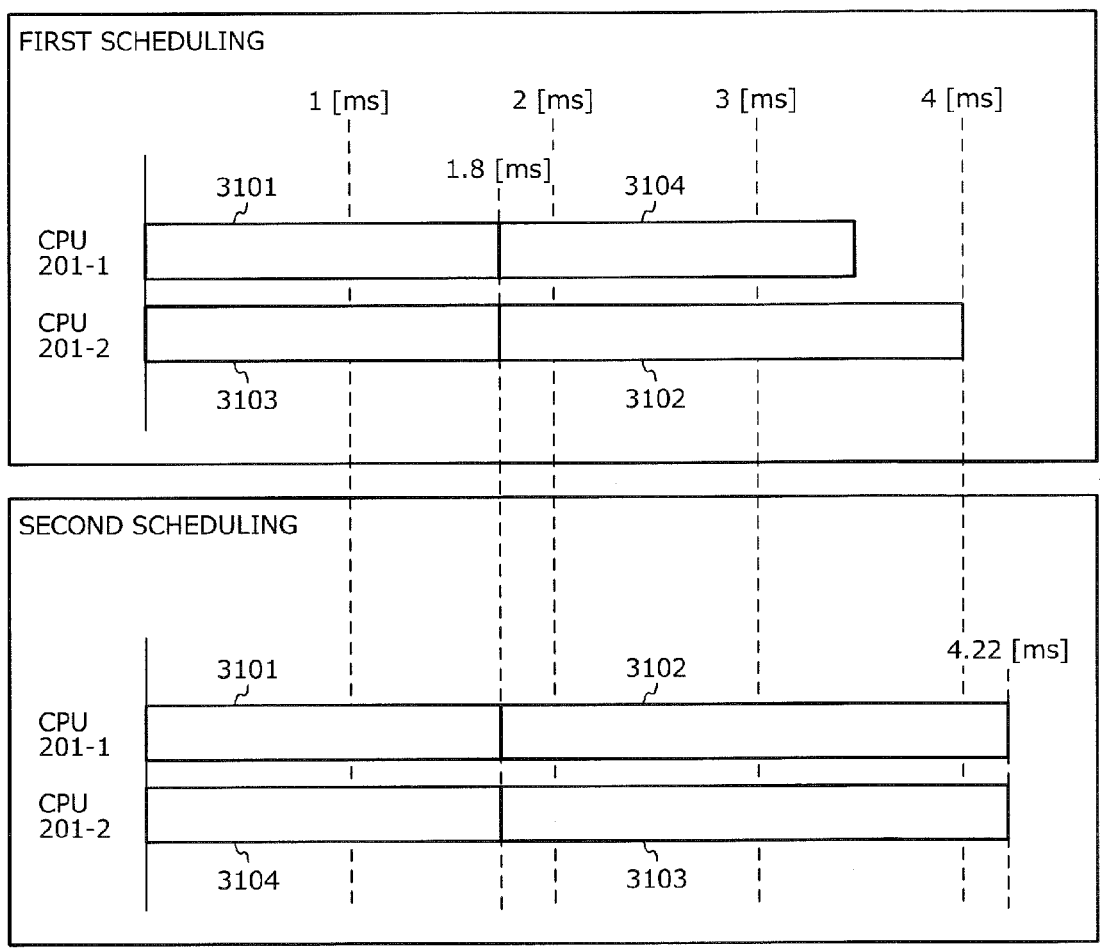
FIG. 32 is an explanatory diagram of an example of calculation.

FIG. 32 is an explanatory diagram of an example of the calculation. In the first scheduling executed by the first scheduling unit 3001, the first calculating unit 3003 calculates for each CPU 201, the total value of the processing time periods or the remaining processing time periods of the threads already assigned. The remaining processing time period is a value acquired by subtracting the elapsed time period for processing measured by the measuring unit 3020-$k$ from the processing time period.

For each of the currently executed threads 3101 and 3102, an example of items will be presented, such as the remaining processing time period, the number of used banks of the secondary cache 202, and the number of used banks of the RAM 206. For each of the threads 3103 and 3104 for which startup instructions have been issued, an example of items will be presented, such as the processing time period, the number of used banks of the secondary cache 202, and the number of used banks of the RAM 206.

For the thread 3101, the remaining processing time period is 1.8 [ms]; the number of banks of the secondary cache 202 used thereby is one; and the number of banks of the RAM 206 used thereby is one.

For the thread 3102, the remaining processing time period is 2 [ms]; the number of banks of the secondary cache 202 used thereby is two; and the number of banks of the RAM 206 used thereby is two.

For the thread 3103, the remaining processing time period is 2 [ms]; the number of banks of the secondary cache 202 used thereby is two; and the number of banks of the RAM 206 used thereby is two.

For the thread 3104, the remaining processing time period is 1.8 [ms]; the number of banks of the secondary cache 202 used thereby is two; and the number of banks of the RAM 206 used thereby is one.

In the first scheduling executed by the first scheduling unit 3001, the first calculating unit 3003 calculates for each CPU 201, the total value of the processing time periods or the remaining processing time periods of the threads already assigned. For example, the CPU 201-1 is assigned with the threads 3101 and 3104 and therefore, the total value is 3.6 [ms]. The threads 3103 and 3102 are assigned to CPU 201-2 and therefore, the total value is 4 [ms]. The first calculating unit 3003 determines, as a first calculation result, the highest value among the calculated total values of the processing time periods or the calculated total values of the remaining processing time periods of the threads already assigned.

In the second scheduling executed by the second scheduling unit 3002, the second calculating unit 3004 calculates for each CPU 201, the total value of the processing time periods or the remaining processing time periods of the threads already assigned. For example, the CPU 201-1 is assigned with the threads 3101 and 3102 and therefore, the total value is 3.8 [ms]. The threads 3104 and 3103 are assigned to CPU 201-2 and therefore, the total value is 3.8 [ms].

For example, the second calculating unit 3004 calculates the overheads caused by access contention at the RAM 206 and at the secondary cache 202. In the seventh example, the overhead caused by access contention at the RAM 206 is calculated for a case where the threads classified as C are executed in parallel; and the overhead caused by access contention at the secondary cache 202 is calculated for a case where the threads classified as B are executed in parallel.

For example, the second calculating unit 3004 predicts the threads to be executed in parallel. For example, when the total value of the number of banks of the RAM 206 to be used by the predicted threads that are to be executed in parallel, is greater than the number of banks m of the RAM 206, the second calculating unit 3004 determines that contention occurs at the RAM 206. In this case, although the thread combination for parallel execution are not limited, for example, the combination may be determined according to the order of assignment or may be determined according to the number of banks of the RAM 206 to be used thereby. For example, the second calculating unit 3004 calculates an overhead Ocx based on Eq. (2) below.

$$Ocx(x=1 \text{ to } n) = \Sigma(SBpx \times Apx \times RL2) + \Sigma(SCpx \times Apx \times RM) \qquad (2)$$

"$\Sigma(SBpx \times Apx \times RL2)$" represents the total value of the overheads caused by contention for the secondary cache 202 in a case where it is determined that contention occurs for the secondary cache 202. "SBpx" represents the processing time period of a thread Bp (or the remaining processing time period when the thread Bp is under execution) that is assigned to the CPU 201-$x$ and for which it is predicted that access contention will occur for the secondary cache 202 consequent to parallel processing. "Apx" represents the rate of the access time period of the thread Bp currently under execution by the CPU 201-x. The rate of the access time period is registered in the thread table 2700. The increased rate RL2 is registered in the overhead information 2900 concerning access contention.

"Σ(SCpx×Apx×RM)" represents the total value of the overheads caused by access contention for the RAM 206 in a case where it is determined that contention occurs for the RAM 206. "SCpx" represents the processing time period of a thread Cp (or the remaining processing time period when the thread Cp is under execution) that is assigned to the CPU 201-x and for which it is predicted that access contention will occur for the secondary cache 202 consequent to parallel processing. "Apx" represents the rate of the access time period of the thread Cp under execution by the CPU 201-x. The rate of the access time period is registered in the thread table 2700. The increased rate RM is registered in the overhead information 2900 on the access contention.

In the example of FIG. 31, the total number of banks of the RAM 206 used by the threads 3102 and 3103 is four and the number of banks m of the RAM 206 is three. Therefore, the second calculating unit 3004 determines that the threads 3102 and 3103 cause access contention for the RAM 206, and calculates for each CPU 201, the overhead caused by the access contention. The second calculating unit 3004 calculates the overhead caused by the access contention for the RAM 206 of each CPU 201, based on Eq. (2).

The increased rate RM is 0.3. The rates of the accessing time periods Ap of the threads 3102 and 3103 are each 0.7. Therefore, Oc1 is Oc1=2 [ms]×0.7×0.3=0.42 and Oc2 is Oc2=2 [ms]×0.7×0.3=0.42.

For example, the second calculating unit 3004 adds the overhead Oc1 (0.42 [ms]) to the total value (3.8 [ms]) of the processing time periods of the CPU 201-1 and adds the overhead Oc2 (0.42 [ms]) to the total value (3.8 [ms]) of the processing time periods of the CPU 201-2. The addition result for the CPU 201-1 is 4.22 [ms] and that for the CPU 201-2 is 4.22 [ms].

The first calculating unit 3003 determines, as a first calculation result, the highest value among the calculation results calculated for the CPUs 201 and the second calculating unit 3004 determines, as a second calculation result, the highest value among the calculation results calculated for the CPUs 201. The comparing unit 3005 determines whether the relation between the first and the second calculation results satisfies a predetermined condition. For example, the comparing unit 3005 determines whether the first calculation result is smaller than the second calculation result.

The switching unit 3006 switches between the first scheduling and the second scheduling according to the comparison result acquired by the comparing unit 3005. For example, if the first calculation result is smaller than the second calculation result, the switching unit 3006 performs control such that the first scheduling executed by the first scheduling unit 3001 is executed and, for example, if the first calculation result is not smaller than the second calculation result, the switching unit 3006 performs control such that the second scheduling executed by the second scheduling unit 3002 is executed. In the example of FIG. 32, the first and the second calculation results respectively are 4 [ms] and 4.22 [ms] and therefore, the switching unit 3006 performs control such that the first scheduling unit 3001 executes the first scheduling.

In the example, when it is determined that access contention is caused at the RAM 206 with a combination of threads each classified as C, the second calculating unit 3004 does not calculate the overhead generated by the access contention at the secondary cache 202. The overhead generated by the access contention at the secondary cache 202 is smaller than that generated by the access contention at the RAM 206 and therefore, in this case, the calculation is not executed to increase the speed of the assignment process. For example, even when it is determined that the access contention is caused for the RAM 206 with a combination of threads each classified as C, the second calculating unit 3004 calculates the overhead generated by the access contention for the secondary cache 202 and thereby, more precise processing time period can be calculated.

Figure 33:
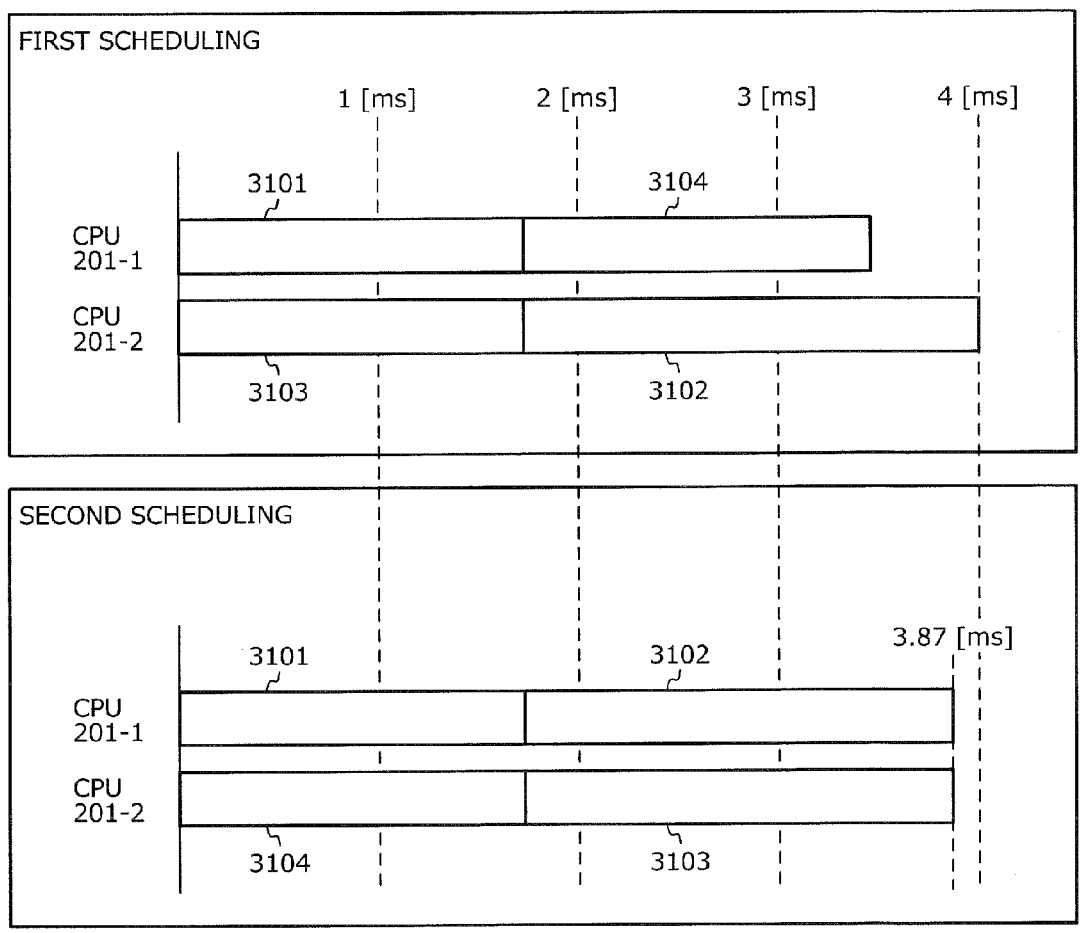
FIG. 33 is an explanatory diagram of another example of calculation.

FIG. 33 is an explanatory diagram of another example of the calculation. With reference to FIG. 33, description will be made taking an example of the increased rate RM that is 0.05. Calculation processes executed by the first and the second calculating units 3003 and 3004 are the same as those described with reference to FIG. 32 and will not again be described in detail.

The increased rate RM is 0.05. The rates of the accessing time periods Ap of the threads 3102 and 3103 are each 0.7. Therefore, Oc1 is Oc1=2 [ms]×0.7×0.05=0.07 and Oc2 is Oc2=2 [ms]×0.7×0.05=0.07.

For example, the second calculating unit 3004 adds the overhead Oc1 to the total value of the processing time periods of the CPU 201-1 and adds the overhead Oc2 to the total value of the processing time periods of the CPU 201-2. The addition result for the CPU 201-1 is 3.87 [ms] and that for the CPU 201-2 is 3.87 [ms].

In the example of FIG. 33, the first and the second calculation results respectively are 4 [ms] and 3.87 [ms] and the first calculation result is equal to or longer that the second calculation result. Therefore, the switching unit 3006 performs control such that the second scheduling unit 3002 executes the second scheduling.

The influence of the overhead generated by the access contention becomes stronger as the increased rates RM and RL2 become higher. Furthermore, the overhead is increased as the access contention occurs more heavily due to the combination of the threads for parallel processing.

Figure 34:
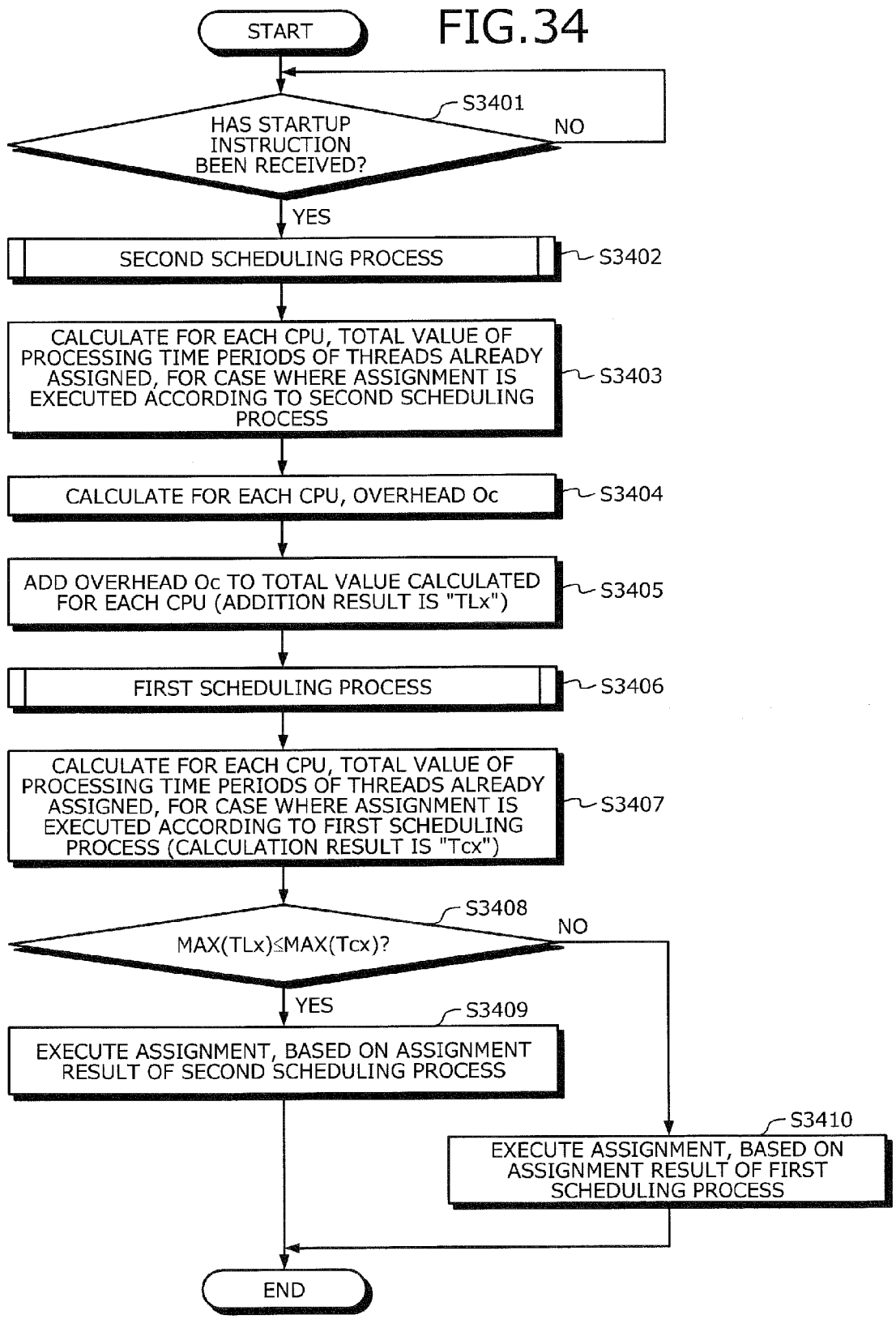
FIG. 34 is a flowchart of an example of a process executed by the master OS according to the seventh example.

FIG. 34 is a flowchart of an example of the process executed by the master OS according to the seventh example. The master OS determines whether a startup instruction for a thread has been received (step S3401). If the master OS determines that no startup instruction for a thread has been received (step S3401: NO), the master OS returns to step S3401.

If the master OS determines that a startup instruction for a thread has been received (step S3401: YES), the second scheduling unit 3002 executes a second scheduling process (step S3402). Although the second scheduling process is executed, the master OS does not reflect the assignment result obtained from the second scheduling process. The master OS calculates, for each CPU 201 and using the second calculating unit 3004, the total value of the processing time periods of the threads already assigned, for a case where the assignment is executed according to the second scheduling process (step S3403). The master OS calculates, for each CPU 201 and using the second calculating unit 3004, the overhead Oc (step S3404), and using the second calculating unit 3004, adds the overhead Oc to the total value calculated for each CPU 201 (the addition result is "TLx") (step S3405).

The master OS executes, using the first scheduling unit 3001, a first scheduling process (step S3406). The first scheduling process is the same as the example described in the first to the sixth examples and therefore, will not again be described in detail. Although the first scheduling process is executed, the master OS does not reflect the assignment result obtained from the first scheduling process. The master OS calculates, for each CPU 201 and using the first calculating unit 3003, the total value of the processing time periods of the threads already assigned, for a case where the assignment is executed according to the first scheduling process (the calculation result is "Tcx") (step S3407).

The master OS determines, using the comparing unit 3005, whether MAX(TLx) and MAX(Tcx) are MAX(TLx)≤MAX(Tcx) (step S3408). "MAX(Tcx)" is the highest value among the total values (TLx) calculated for the CPUs 201. "MAX(TLx)" is the highest value among the total values (Tcx) calculated for the CPUs 201.

Although the second scheduling process is executed in this example when MAX(TLx) and MAX(Tcx) are equal values, the first scheduling process may be executed. In a case where the threads currently under execution and the threads standing by for execution are reassigned according to the first scheduling process and no reassignment is executed according to the second scheduling process, the second scheduling process is executed when MAX(TLx) and MAX(Tcx) are equal values. When no reassignment is executed according to the second scheduling, the time period can be reduced for the master OS to rewrite the assignment table 400 for the reassignment. For example, in a case where the threads currently under execution and the threads standing by for execution are not reassigned according to the first scheduling process and the reassignment is executed according to the second scheduling process, the first scheduling process is executed when MAX(TLx) and MAX(Tcx) are equal values.

When the master OS determines that MAX(TLx) and MAX(Tcx) are MAX(TLx)≤MAX(Tcx) (step S3408: YES), the switching unit 3006 executes the assignment, based on the assignment result of the second scheduling process (step S3409) and a series of operations comes to an end. In the assignment according to the second scheduling process, not only the assignment of the thread for which the startup instruction has been received but also the threads currently under execution are reassigned and therefore, processes to move the threads currently under execution also arise. The master OS updates the assignment table 2800 according to the assignment result.

If the master OS determines that MAX(TLx) and MAX(Tcx) are not MAX(TLx)≤MAX(Tcx) (step S3408: NO), the switching unit 3006 executes the assignment based on the assignment result of the first scheduling process (step S3410) and a series of operations comes to an end. In the assignment according to the first scheduling process, not only the assignment of the thread for which the startup instruction has been received but also the threads currently under execution are reassigned and therefore, processes to move the threads currently under execution also arise. The master OS updates the assignment table 2800 according to the assignment result.

Figure 35:
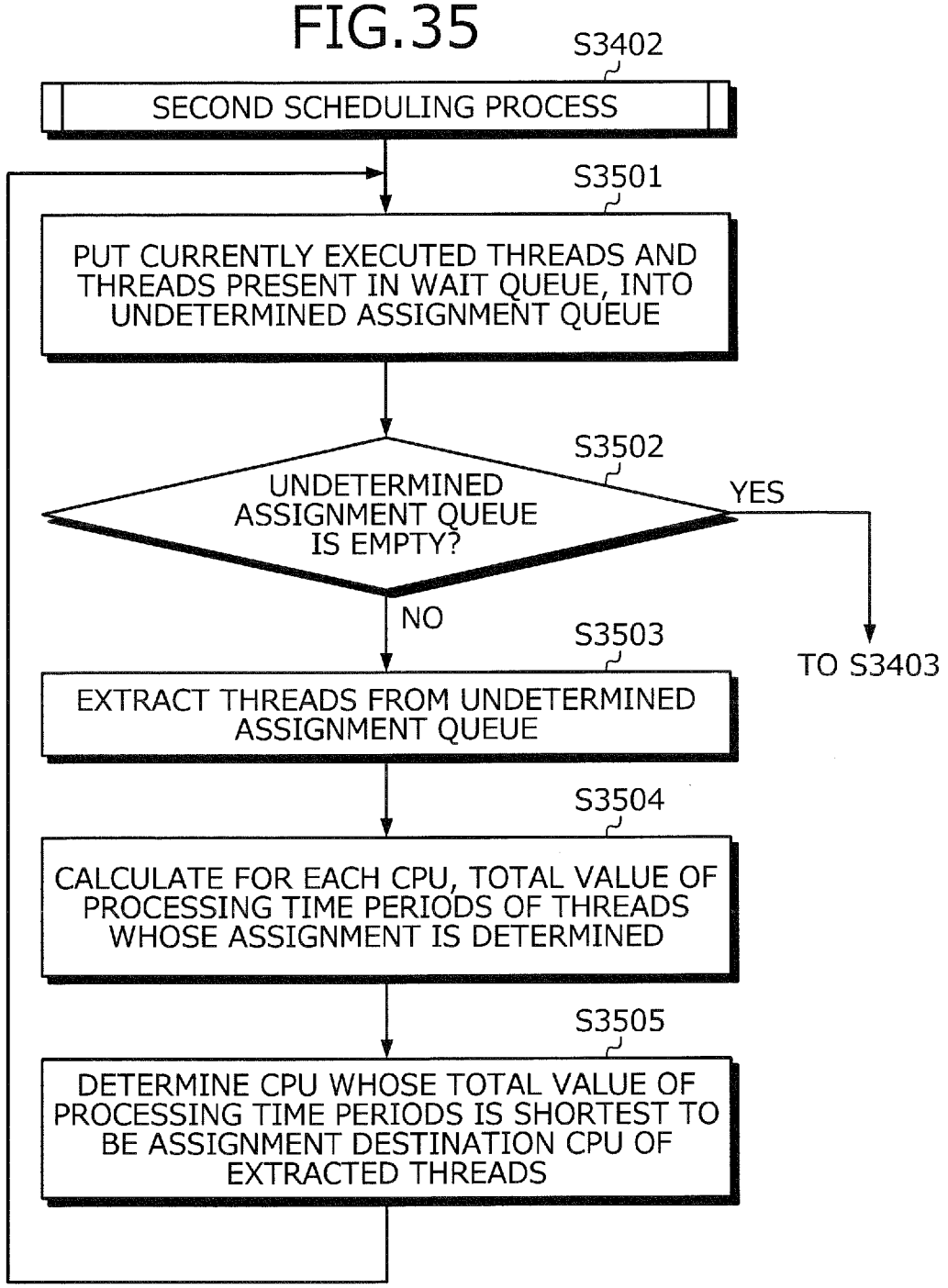
FIG. 35 is a flowchart of a second scheduling process (step S3402) depicted in FIG. 34.

FIG. 35 is a flowchart of the second scheduling process (step S3402) depicted in FIG. 34. The master OS puts the currently executed threads and the threads present in the wait queue 250, into the undetermined assignment queue (step S3501), and determines whether the undetermined assignment queue is empty (step S3502). Thereby, the master OS can reassign even the threads currently under execution and the threads standing by for execution. If the master OS determines that the undetermined assignment queue is empty (step S3502: YES), the master OS returns to step S3403.

If the master OS determines that the undetermined assignment queue is not empty (step S3502: NO), the master OS extracts threads from the undetermined assignment queue (step S3503), calculates for each CPU 201, the total value of the processing time periods of the threads whose assignment is determined (step S3504), and determines the CPU 201 whose total value of the processing time periods is the shortest to be the assignment destination CPU of the extracted threads (step S3505), and returns to step S3501.

According to the seventh example, the processing time period is estimated respectively for the first scheduling of assigning threads to prevent the occurrence of access contention and the second scheduling that is different from the first scheduling, and the scheduling is switched to the optimal scheduling method. Thereby, even when access contention occurs, the optimal scheduling method whose processing time period is short can be executed and drops in thread performance can be reduced.

Figure 36:
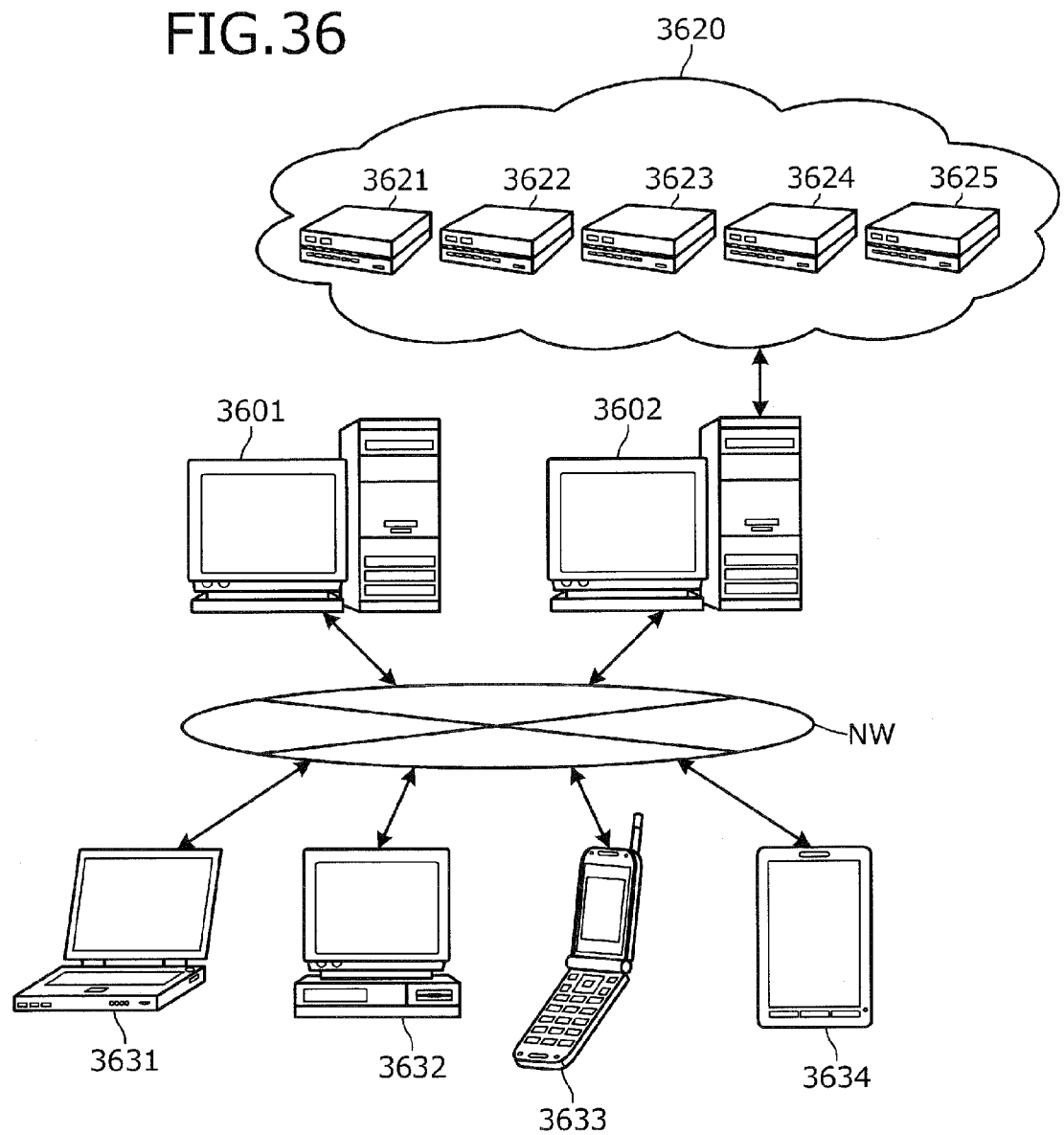
FIG. 36 is a diagram of an example of application of a multi-core processor system 200.

FIG. 36 is a diagram of an example of application of the multi-core processor system 200. In FIG. 36, a network NW enables servers 3601 and 3602, and clients 3631 to 3634 to communicate with each other; and is configured by, for example, a local area network (LAN), a wide area network (WAN), the Internet, or a mobile telephone network.

The server 3602 is a managing server of a server group (servers 3621 to 3625) forming a cloud 3620. Among the clients 3631 to 3634, the client 3631 is a notebook personal computer; the client 3632 is a desktop personal computer; the client 3633 is a mobile telephone (or may be a smartphone, a personal handyphone system (PHS)); and the client 3634 is a tablet terminal. The servers 3601, 3602, and 3621 to 3625, and the clients 3631 to 3634 are each implemented by, for example, the computer depicted in FIG. 1.

This embodiment is also applicable to a configuration according to which the CPUs 201 and the shared resource depicted in FIG. 1 are each equipped on a computer different from each other (for example, the mobile telephone or the server of FIG. 36) and the computers execute distributed parallel processing through the network NW.

As described, according to the assignment method and the multi-core processor system, the thread to be executed is assigned to the CPU with which the sum of the number of the banks used by the threads for the parallel processing by the multi-core processor does not exceed the number of banks of the shared resource. Thereby, according to the assignment method and the multi-core processor system, drops in thread performance occurring consequent to access contention at the shared resource can be reduced.

The thread to be executed is assigned such that, in a case where a given CPU of the multi-core processor system sequentially selects CPUs and the threads are assigned to the selected CPU, even when multiple cores execute the threads in parallel, the total number of used banks does not exceed the number of banks of the shared resource. Thus, the given CPU can reduce drops in thread performance occurring consequent to access contention at the shared resource.

When plural candidate assignment destinations are present whose sums each are less than or equal to the number of banks of the shared resource, the given CPU assigns the thread to be executed to the CPU whose processing time period of the threads already assigned thereto is the shortest. Thus, the given CPU can distribute the load on the CPUs, thereby reducing drops in thread performance occurring consequent to access contention at the shared resource.

The given CPU selects, from the multi-core processor and as a candidate assignment destination, CPUs in descending order of the detected highest values; and selects, from among the CPUs and as the candidate assignment destination, CPUs in descending order of the detected highest values. When the given CPU selects the CPUs in descending order of the highest values, the highest value of a selected CPU is highly likely to be larger than the number of banks to be used by the thread to be executed. Therefore, the sum of the number of banks to be used by the threads for parallel processing tends not to vary compared to a case where the CPUs are randomly selected. Therefore, the given CPU can quickly determine an assignment destination for the thread to be executed, enabling drops in performance occurring consequent to access contention to be reduced.

The given CPU selects, as the candidate assignment destination, only the CPU whose detected highest value is the greatest. For the CPU whose detected highest value is the greatest, the highest value is most highly likely to be greater than the number of banks to be used by the thread to be executed and therefore, the sum of the number of banks to be used by the threads for parallel processing tends not to vary. Therefore, the given CPU can quickly determine an assignment destination for the thread to be executed, enabling performance drops occurring consequent to access contention to be reduced.

In a case where bank shortage occurs irrespective of CPU to which the given CPU assigns the thread to be executed, the given CPU assigns the thread to be executed to the CPU with which the sum of the number of banks used by the threads for parallel processing is the smallest. Thereby, the given CPU can minimize the occurrence of access contention.

When the total value of the identified number of banks used by the threads already assigned and the identified number of banks to be used by the thread to be executed is less than or equal to the number of banks of the shared resource, no bank shortage occurs with any combination of threads for parallel processing. Therefore, the given CPU immediately assigns the thread to be executed to a CPU, whereby an increase of the speed of the assignment process can be facilitated.

The thread to be executed and the threads already assigned are given threads in the thread group. A thread is classified, in advance, according to whether the thread frequently accesses the shared resource and thereby, the given CPU can determine assignment, excluding the threads whose frequencies to access the shared resource is low.

When the thread to be executed is not the given thread in the thread group, the given CPU assigns the thread to be executed to the CPU to which no thread has been assigned. A "thread that is not the given thread" means a thread whose access of the shared resource does not frequently occur. In the sixth example, the thread is a thread classified as A. The threads classified as A frequently access the primary cache. A mixing of data of the plural threads can be prevented in the primary cache by assignment of the thread to be executed and the other threads to the same CPU. Thereby, the number of swapping sessions of data can be reduced in the primary cache and thread performance drops can be facilitated.

It is assumed that the threads are classified in advance into those for the first condition of the first shared resource and those for the second condition of the second shared resource whose access speed is higher than that of the first shared resource. When a first thread classified for the first condition and a second thread classified for the second condition are processed in parallel, access failures by the second thread may increase due to the influence of the first thread. Therefore, when the first thread is assigned to a CPU, the given CPU determines the assignment destination of a thread to be executed classified for the second condition, corresponding to the number of used banks of the first shared resource. Thereby, the given CPU can reduce drops in thread performance occurring consequent to access contention at the primary shared resource.

If the first thread is not assigned to a CPU, the given CPU determines the assignment destination of a thread to be executed classified for the second condition, corresponding to the number of used banks of the second shared resource. Thereby, the given CPU can reduce drops in thread performance occurring consequent to access contention at the second shared resource.

In a case where the thread to be executed is a thread classified for the first condition, even when a thread classified for either of the conditions is assigned to a CPU, the given CPU determines the assignment destination of the thread to be executed, corresponding to the number of used banks of the first shared resource. Thereby, the given CPU can reduce drops in thread performance occurring consequent to access contention at the second shared resource.

Depending on the assignment state of the threads, when the threads are assigned placing importance on access contention, the processing time period of the threads becomes longer than in a case where the threads are assigned ignoring access contention. Therefore, the given CPU dynamically switches the scheduling for thread assignment between the first scheduling to perform assignment preventing the occurrence of access contention and the second scheduling that is different from the first scheduling. Thereby, when the first scheduling is selected, drops in thread performance occurring consequent to access contention can be prevented. When the second scheduling is selected, drops in thread performance occurring consequent to the performance of the threads assigned to the same CPU 201 can be reduced.

The given CPU adds the load time period generated by access contention to the processing time period in the second scheduling and thereby, can determine the scheduling including the influence of drops in performance occurring consequent to access contention.

The given CPU calculates the load time period corresponding to the processing time period of the threads already assigned and the rate of the load due to the contention at the shared resource. Thereby, the given CPU can more accurately reproduce the influence of the access contention.

The given CPU determines whether a predetermined condition is satisfied by the relation of the calculation result of the processing time periods according to the first scheduling and the calculation result of the processing time periods according to the second scheduling and, according to the determination result, determines which scheduling is to be executed. Thereby, the design engineer of the multi-core processor system can determine the predetermined conditions corresponding to the scheduling method of the second scheduling.

The assignment method described in the present embodiment may be implemented by executing a prepared program on a computer such as a personal computer and a workstation. The program is stored on a non-transitory, computer-readable recording medium such as a hard disk, a flexible disk, a CD-ROM, an MO, and a DVD, read out from the computer-readable medium, and executed by the computer. The program may be distributed through a network such as the Internet.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An assignment method comprising:

identifying from a storage device that stores for each thread of a thread group, number of used storage areas of a shared resource of a multi-core processor and identifying for each core of the multi-core processor, the number of storage areas to be used by a thread to be executed and the number of storage areas used by threads already assigned;

detecting for each of the cores, a highest value, from the identified number of storage areas used by the threads already assigned;

determining whether a sum of a greater value of the detected highest value of a core selected as a candidate assignment destination of the multi-core processor and the identified number of storage areas to be used by the thread to be executed, and the detected highest value of the cores excluding the selected core, is at most the number of storage areas of the shared resource; and assigning the thread to be executed to the selected core, when the sum is determined to be at most the number of storage areas of the shared resource, wherein the assignment method is executed by a given core of the multi-core processor.

2. The assignment method according to claim 1, further comprising selecting sequentially from the multi-core processor, a core as the candidate assignment destination, after the detection at the detecting, wherein the determining includes determining, each time a core is selected, whether the sum of the greater value of the detected highest value of the selected core and the number of storage areas to be used by the thread to be executed, and the detected highest value of the cores excluding the selected core, is at most the number of storage areas, and the assigning includes assigning the thread to be executed to the core for which the sum is determined to be at most the number of storage areas.

3. The assignment method according to claim 2, wherein the assigning includes assigning the thread to be executed to the core to which the threads already assigned have a processing time period that is shortest, when the candidate assignment destination for which the sum is determined to be at most the number of storage areas is present in plural.

4. The assignment method according to claim 2, wherein the selecting includes selecting from the multi-core processor and in descending order of the highest values detected, the core as the candidate assignment destination.

5. The assignment method according to claim 1, wherein the selected core is a core whose detected highest value is greatest in the multi-core processor.

6. The assignment method according to claim 1, wherein the assigning includes assigning the thread to be executed to the core for which the sum is least, when the sum is determined to exceed the number of storage areas irrespective of the core selected.

7. The assignment method according to claim 1, wherein the assigning includes, after the identification at the identifying and when a total value of the identified number of storage areas used by the threads already assigned and the number of storage areas to be used by the thread to be executed is at most the number of storage areas, assigning the thread to be executed to any core of the multi-core processor without executing the detection step and the determination step.

8. The assignment method according to claim 1, wherein the thread to be executed and the threads already assigned are specific threads of the thread group.

9. The assignment method according to claim 1, wherein the assigning includes assigning the thread to be executed to a core of the multi-core processor and to which no thread is assigned, without executing the identifying, the detecting, or the determining, when the thread to be executed is not a specific thread of the thread group.

10. The assignment method according to claim 1, wherein the storage device stores for each thread of the thread group, the number of used storage areas of a first shared resource and the number of used storage areas of a second shared resource whose access speed is higher than that of the first shared resource, and the identifying includes identifying from the storage device, the number of storage areas of the first shared resource to be used by the thread to be executed and the number of storage areas of the first shared resource used by the threads already assigned, when the thread to be executed is a thread of the thread group and classified for a first condition concerning access of the first shared resource.

11. The assignment method according to claim 1, wherein the storage device stores for each thread of the thread group, the number of used storage areas of a first shared resource and the number of used storage areas of a second shared resource whose access speed is higher than that of the first shared resource, and the identifying includes identifying from the storage device, the number of storage areas of the second shared resource to be used by the thread to be executed and the number of storage areas of the second shared resource used by the threads already assigned, when the thread to be executed is a thread of the thread group and classified for a second condition concerning access of the second shared resource, and the threads already assigned do not include any thread classified for a first condition concerning access of the first shared resource.

12. The assignment method according to claim 1, wherein the storage device stores for each thread of the thread group, the number of used storage areas of a first shared resource and the number of used storage areas of a second shared resource whose access speed is higher than that of the first shared resource, and the identifying includes identifying from the storage device, the number of storage areas of the first shared resource to be used by the thread to be executed and the number of storage areas of the first shared resource used by the threads already assigned, when the threads already assigned include a thread classified for a first condition concerning access of the first shared resource, irrespective of the thread to be executed being a thread of the thread group and classified for a second condition concerning access of the second shared resource.

13. The assignment method according to claim 1, further comprising:

first calculating for each core, a total value of processing time periods of the threads already assigned and consumed when assignment is executed according to a first scheduling at the assigning;

second calculating for each core, the total value of the processing time periods of the threads already assigned and consumed when the assignment is executed according to a second scheduling different from the first scheduling;

comparing a calculation result obtained at the first calculating and a calculation result obtained at the second calculating; and switching between the first scheduling and the second scheduling according to a comparison result obtained at the comparing.

14. The assignment method according to claim 13, wherein the second calculating includes adding a load time period generated by contention at the shared resource to the total value of the processing time period of the threads already assigned.

15. The assignment method according to claim 14, wherein the load time period is calculated corresponding to the processing time periods of the threads already assigned and a rate of load generated by contention at the shared resource.

16. The assignment method according to claim 13, wherein the comparing includes determining whether a predetermined condition is satisfied by a relation between the calculation result obtained at the first calculating and a calculation result obtained at the second calculating, and the switching includes executing the first scheduling when the comparison result obtained at the comparing satisfies the predetermined condition, and executing the second scheduling when the comparison result obtained at the comparing does not satisfy the predetermined condition.

17. A multi-core processor system comprising:

a multi-core processor; and a storage device that stores for each thread of a thread group, number of used storage areas of a shared resource of the multi-core processor, wherein a given core of the multi-core processor comprises a processor that is configured to:

identify for each core of the multi-core processor and from the storage device, the number of storage areas to be used by a thread to be executed, and the number of storage areas used by threads already assigned;

detect for each of the cores, a highest value, from the identified number of storage areas used by the threads already assigned;

determine whether a sum of a greater value of the detected highest value of a core selected as a candidate assignment destination of the multi-core processor and the identified number of storage areas to be used by the thread to be executed, and a detected highest value of the cores excluding the selected core, is at most the number of storage areas of the shared resource; and assign the thread to be executed to the selected core, when the sum is determined to be at most the number of storage areas of the shared resource.

* * * * *